(12) United States Patent
Ikefuji

(10) Patent No.: US 9,819,213 B2
(45) Date of Patent: Nov. 14, 2017

(54) POWER RECEPTION APPARATUS, POWER TRANSMISSION APPARATUS, NON-CONTACT POWER SUPPLY SYSTEM, POWER RECEPTION METHOD, AND POWER TRANSMISSION METHOD

(71) Applicant: Rohm Co., Ltd., Kyoto (JP)

(72) Inventor: Yoshihiro Ikefuji, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 214 days.

(21) Appl. No.: 14/672,553

(22) Filed: Mar. 30, 2015

(65) Prior Publication Data

US 2015/0280453 A1 Oct. 1, 2015

(30) Foreign Application Priority Data

Mar. 31, 2014 (JP) ................................. 2014-073095
Sep. 18, 2014 (JP) ................................. 2014-189760

(51) Int. Cl.
| | |
|---|---|
| *H01M 10/44* | (2006.01) |
| *H01M 10/46* | (2006.01) |
| *H02J 7/02* | (2016.01) |
| *H04B 5/00* | (2006.01) |
| *H02J 50/12* | (2016.01) |
| *H02J 50/60* | (2016.01) |
| *H02J 50/80* | (2016.01) |

(52) U.S. Cl.
CPC .............. *H02J 7/025* (2013.01); *H02J 50/12* (2016.02); *H02J 50/60* (2016.02); *H04B 5/0037* (2013.01); *H04B 5/0093* (2013.01); *H02J 50/80* (2016.02)

(58) Field of Classification Search
CPC .......... H02J 7/0042; H02J 7/355; H02J 7/025; H02J 7/0045; H02J 5/005
USPC .......................... 320/107, 108, 132; 307/104
See application file for complete search history.

(56) References Cited

U.S. PATENT DOCUMENTS

| | | | |
|---|---|---|---|
| 2012/0112555 A1* | 5/2012 | Toshimitsu | H02J 5/005 307/104 |
| 2014/0035521 A1 | 2/2014 | Endo | |
| 2014/0159501 A1* | 6/2014 | Kanno | H02J 17/00 307/104 |
| 2015/0008755 A1* | 1/2015 | Sone | H02J 7/025 307/104 |
| 2015/0236518 A1* | 8/2015 | Matsumoto | H02J 17/00 307/104 |
| 2015/0318710 A1* | 11/2015 | Lee | H02J 5/005 307/104 |

FOREIGN PATENT DOCUMENTS

JP 2014-033504 2/2014

* cited by examiner

*Primary Examiner* — Edward Tso
(74) *Attorney, Agent, or Firm* — Fish & Richardson P.C.

(57) ABSTRACT

A power reception apparatus includes a power receiving circuit to be connected to a power reception side resonance circuit including a power reception side coil and a power reception side capacitance, for generating an output power based on power received by the power reception side coil utilizing magnetic resonance, a changing/short-circuiting circuit configured to change a resonance frequency of the power reception side resonance circuit from a reference frequency that is the resonance frequency when receiving the power, or to short-circuit the power reception side coil, before receiving the power.

19 Claims, 38 Drawing Sheets

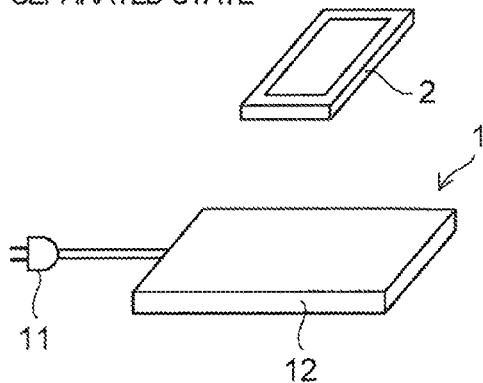
FIG.1A  FIG.1B
FIG.2
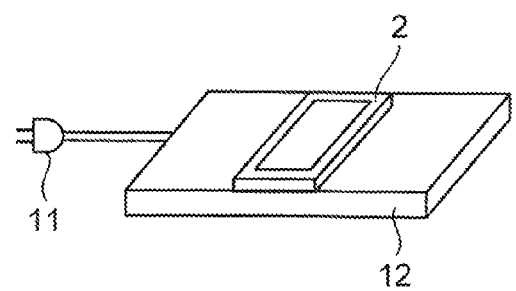
FIG.3
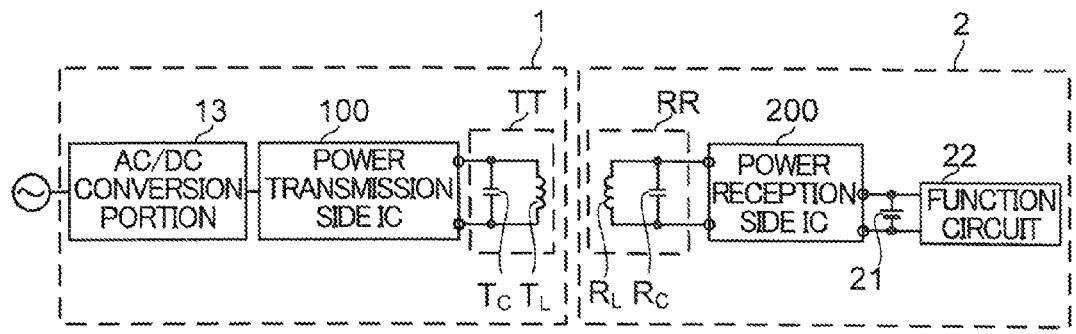
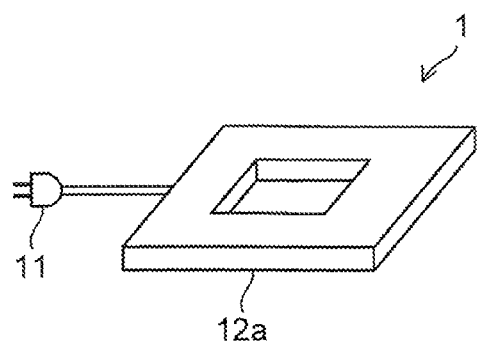

VOLTAGE DROP OF SENSE RESISTOR

BASIC POSITION STATE | SEPARATED STATE | BASIC POSITION STATE

FIG.10
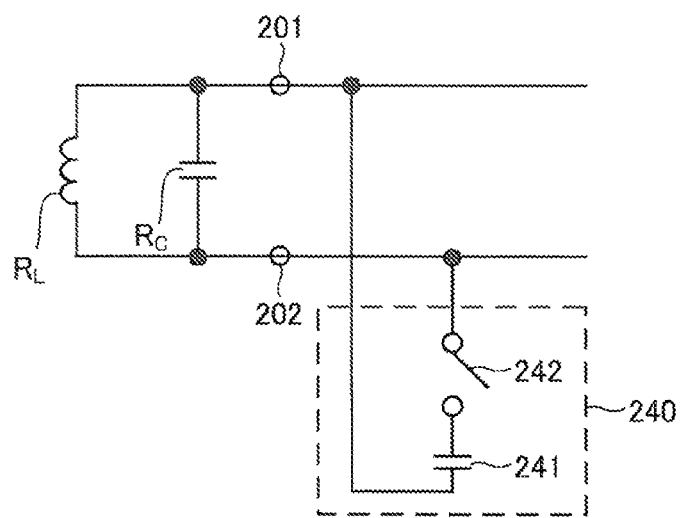
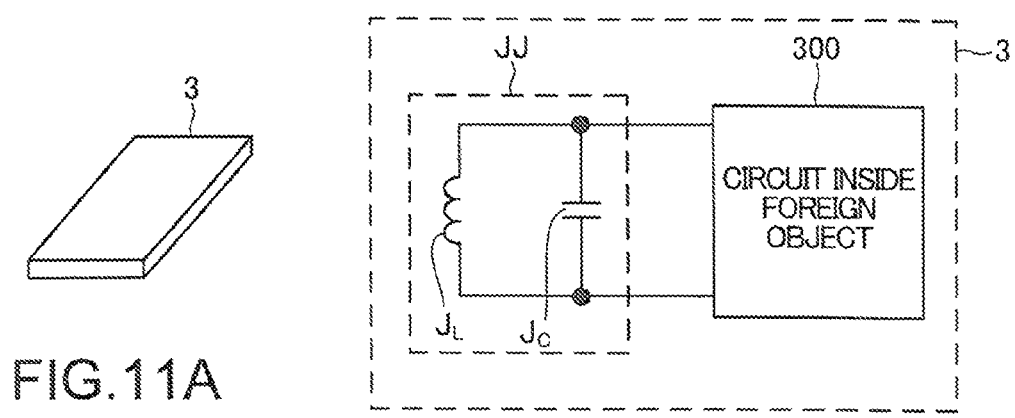
FIG.11A  FIG.11B

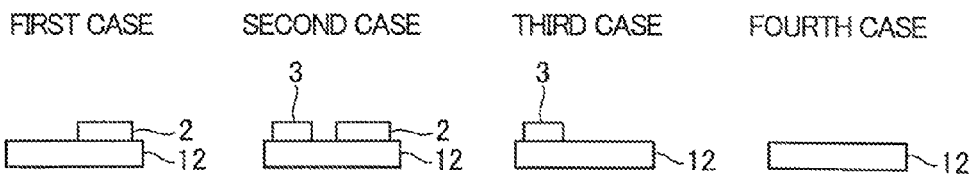
FIG.14A  FIG.14B  FIG.14C  FIG.14D
FIG.15
FIG.16
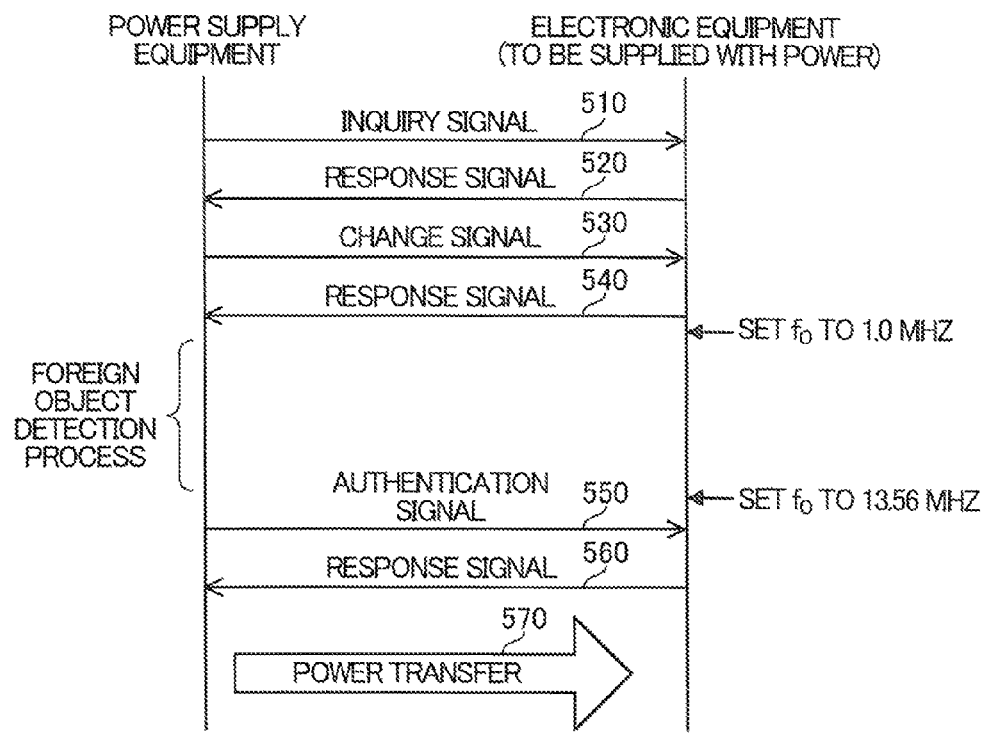

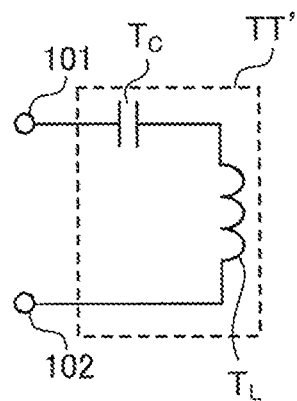
FIG.24A
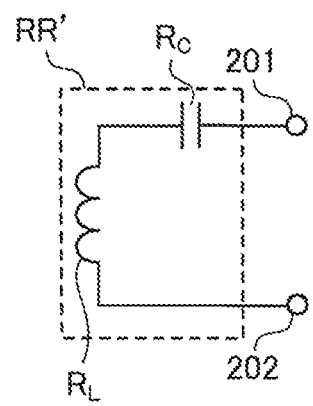
FIG.24B
FIG.25
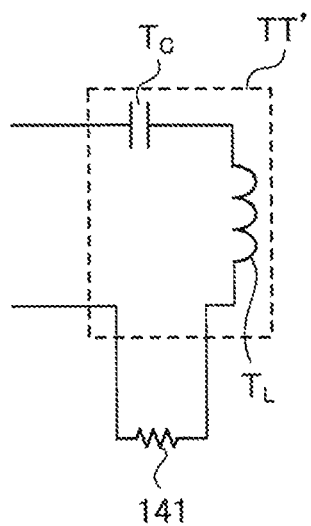

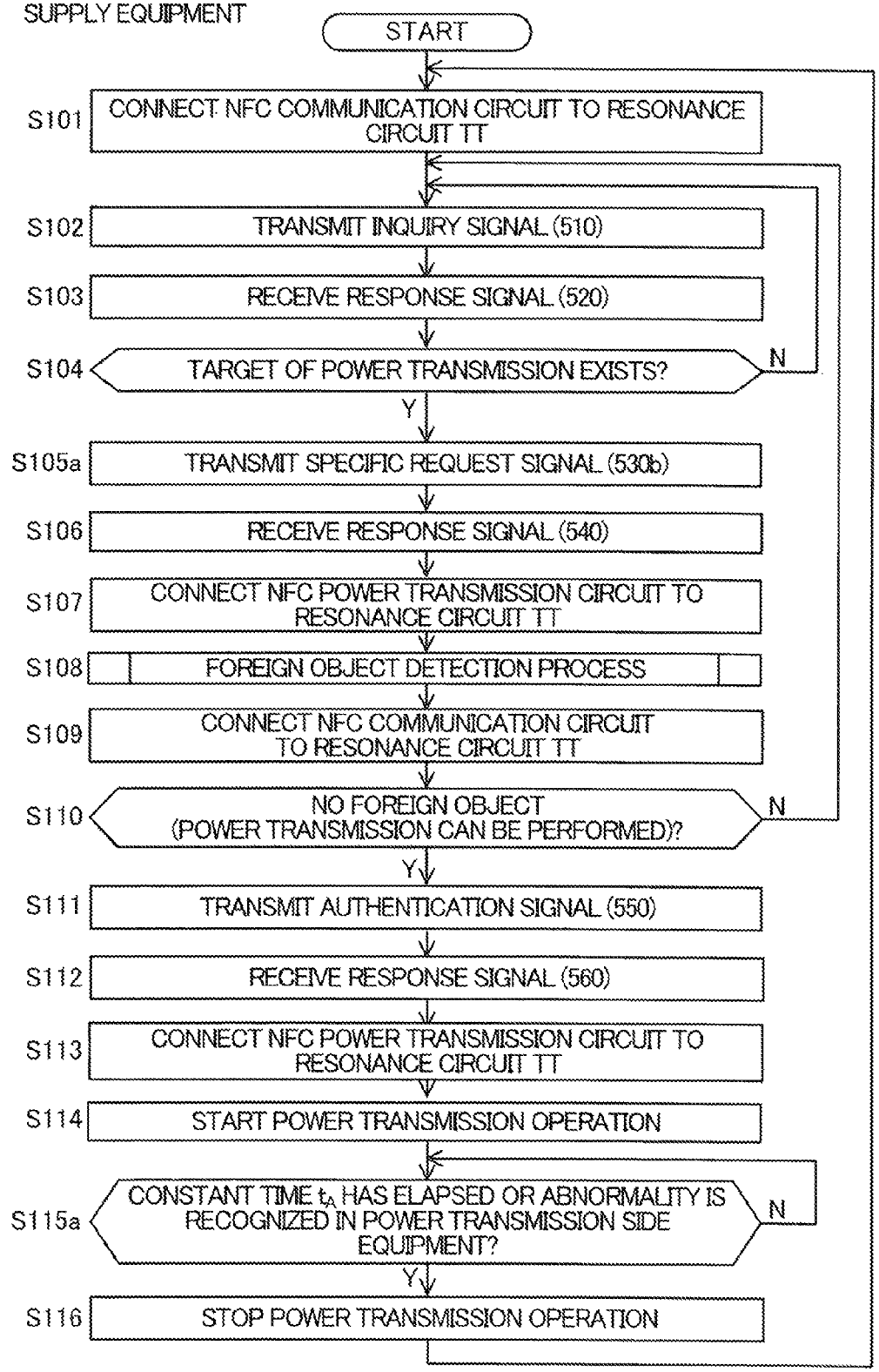

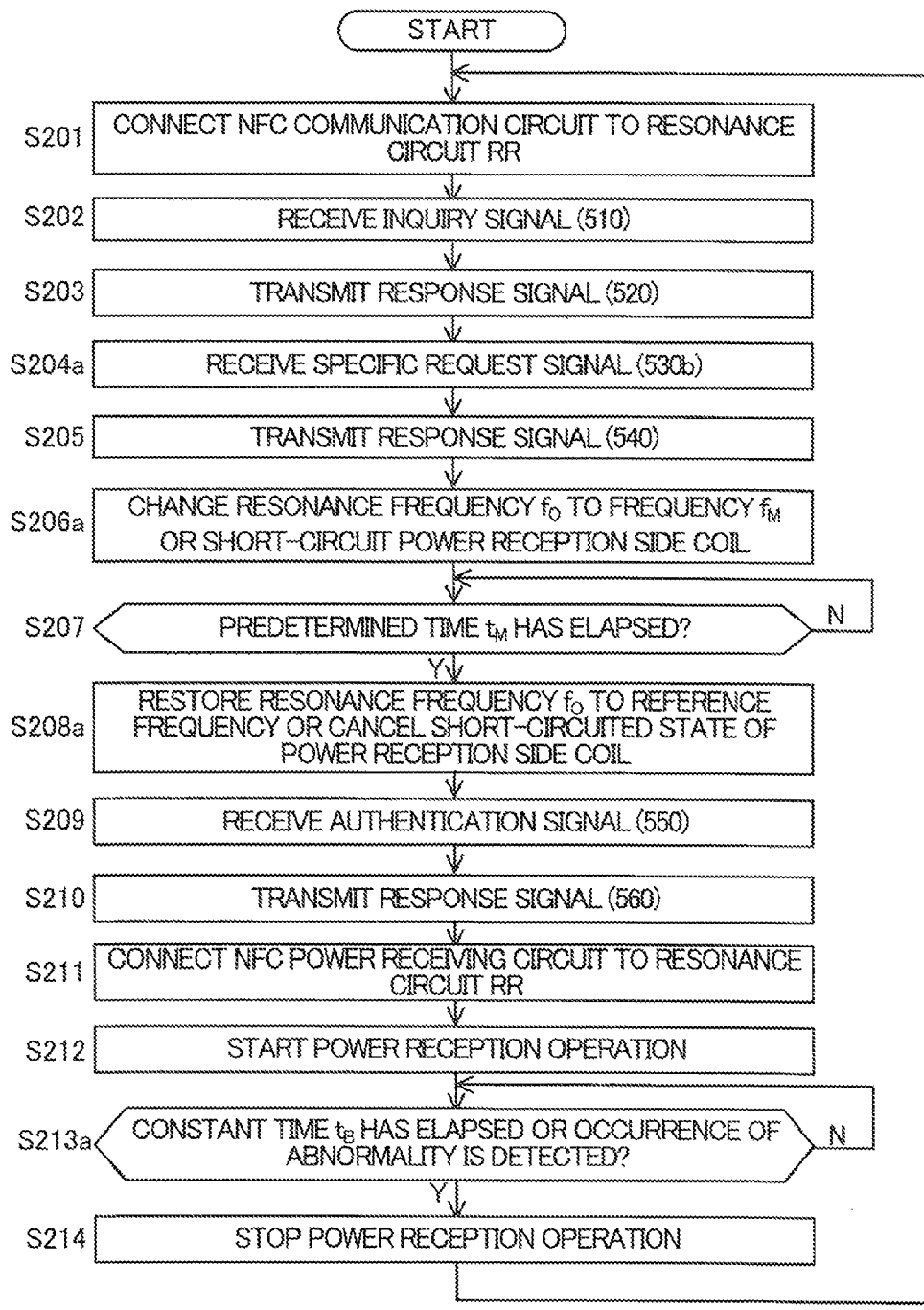

POWER RECEPTION APPARATUS, POWER TRANSMISSION APPARATUS, NON-CONTACT POWER SUPPLY SYSTEM, POWER RECEPTION METHOD, AND POWER TRANSMISSION METHOD

CROSS-REFERENCE TO RELATED APPLICATIONS

This nonprovisional application claims priority under 35 U.S.C. §119(a) on Patent Application No. 2014-73095 filed in Japan on Mar. 31, 2014 and on Patent Application No. 2014-189760 filed in Japan on Sep. 18, 2014, the entire contents of which are hereby incorporated by reference.

BACKGROUND OF THE INVENTION

Field of the Invention

The present invention relates to a power reception apparatus, a power transmission apparatus, a non-contact power supply system, a power reception method, and a power transmission method.

Description of Related Art

As one type of short-range wireless communication, there is wireless communication by near field communication (NFC) using a frequency of 13.56 MHz as a carrier frequency. On the other hand, there is also proposed a technique of non-contact power supply by a magnetic resonance method using a coil that is used for NFC communication.

In the non-contact power supply using magnetic resonance, a power transmission side resonance circuit including a power transmission side coil is disposed in power supply equipment, a power reception side resonance circuit including a power reception side coil is disposed in electronic equipment as power receiving equipment, and resonance frequencies of the resonance circuits are set to be the same reference frequency. Then, alternating current is supplied to the power transmission side coil so as to make the power transmission side coil generate an alternating magnetic field of a reference frequency. Then, the alternating magnetic field propagates to the power reception side resonance circuit resonating at the reference frequency so that alternating current flows in the power reception side coil. In other words, power is transmitted from the power transmission side resonance circuit including the power transmission side coil to the power reception side resonance circuit including the power reception side coil.

Note that a technique related to the above description is disclosed in JP-A-2014-33504.

Typically, only the electronic equipment corresponding to the power supply equipment is placed on a power supply table (a power supply mat or a power supply cradle) of the power supply equipment so that desired power supply (power transfer) is performed. However, a foreign object that does not correspond to the power supply equipment may be placed on the power supply table by mistake. Here, the foreign object means, for example, an object (such as a card) having a wireless IC tag with an antenna coil of 13.56 MHz that does not respond to NFC communication. Otherwise, the foreign object means, for example, electronic equipment that has the NFC communication function itself, but the function is disabled by a switch. For instance, a smart phone with the NFC communication function, which is disabled by software setting can be the foreign object. In addition, a smart phone with the enabled NFC communication function but without power receiving function is classified into the foreign object.

In a state where such the foreign object is placed on the power supply table, if the power supply equipment performs power transmission operation, the foreign object may be broken down by ferromagnetic field generated by the power transmission side coil. For instance, the ferromagnetic field in the power transmission operation may cause an increase of a terminal voltage of the coil of the foreign object on the power supply table up to 100-200 V. If the foreign object is not made to withstand such a high voltage, the foreign object is broken down.

In addition, when an abnormality occurs in the electronic equipment on the power reception side during power transmission, countermeasure of power transmission stop or the like can protect the electronic equipment. In order to perform power transmission stop or the like, it may be possible to inform the power supply equipment about the occurrence of abnormality via communication. However, performing such communication requires modulation of an electromagnetic wave and is usually difficult because of legal restrictions in reality. It is desired to develop a technique that is useful for controlling power transmission by informing the power transmission side about occurrence of abnormality without modulating the electromagnetic wave when the abnormality of the power reception side occurs.

SUMMARY OF THE INVENTION

It is an object of the present invention to provide a non-contact power supply system, as well as a power reception apparatus, a power transmission apparatus, a power reception method, and a power transmission method, for constituting the non-contact power supply system, which can prevent a breakdown or the like of a foreign object. In addition, it is also an object of the present invention to provide a non-contact power supply system that can contribute to protection of the power reception apparatus when an abnormality occurs on the power reception apparatus side.

A first power reception apparatus according to the present invention includes a power receiving circuit to be connected to a power reception side resonance circuit including a power reception side coil and a power reception side capacitance, for generating an output power based on power received by the power reception side coil utilizing magnetic resonance, and a changing/short-circuiting circuit configured to change a resonance frequency of the power reception side resonance circuit from a reference frequency that is the resonance frequency when receiving the power or to short-circuit the power reception side coil, before receiving the power.

A second power reception apparatus according to the present invention includes a power receiving circuit to be connected to a power reception side resonance circuit including a power reception side coil and a power reception side capacitance, for generating an output power based on power received by the power reception side coil utilizing magnetic resonance, and a changing circuit configured to change a resonance frequency of the power reception side resonance circuit from a reference frequency that is a resonance frequency when receiving the power before receiving the power.

A third power reception apparatus according to the present invention includes a power receiving circuit to be connected to a power reception side resonance circuit including a power reception side coil and a power reception side capacitance, for generating an output power based on power received by the power reception side coil utilizing magnetic resonance and a short-circuiting circuit configured to short-circuit the power reception side coil before receiving the power.

A first power transmission apparatus according to the present invention includes a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method, a detection circuit configured to output a value corresponding to amplitude of current flowing in the power transmission side coil, and a control circuit configured to control the power transmission circuit. The control circuit includes a first processing portion configured to control to transmit a specific signal from the power transmission side coil to the power reception side coil, a second processing portion configured to control the power transmission circuit so that the power transmission side coil generates a predetermined test magnetic field oscillating at the reference frequency after transmission of the specific signal, and a third processing portion configured to determine whether or not the power transmission can be performed by comparing an output value of the detection circuit when the test magnetic field is generated with a predetermined reference value. The specific signal is a signal as a trigger for changing a resonance frequency of a power reception side resonance circuit including a power reception side coil capable of receiving power from the power transmission side coil and a power reception side capacitance from the reference frequency that is the resonance frequency when receiving the power, or a signal as a trigger for short-circuiting the power reception side coil.

A second power transmission apparatus according to the present invention includes a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method, a detection circuit configured to output a value corresponding to amplitude of current flowing in the power transmission side coil, and a control circuit configured to control the power transmission circuit. The control circuit includes a first processing portion configured to control to transmit a specific signal as a trigger for changing a resonance frequency of a power reception side resonance circuit including a power reception side coil capable of receiving power from the power transmission side coil and a power reception side capacitance from the reference frequency that is the resonance frequency when receiving the power from the power transmission side coil to the power reception side coil, a second processing portion configured to control the power transmission circuit so that the power transmission side coil generates a predetermined test magnetic field oscillating at the reference frequency after transmission of the specific signal, and a third processing portion configured to determine whether or not the power transmission can be performed by comparing an output value of the detection circuit when the test magnetic field is generated with a predetermined reference value.

A third power transmission apparatus according to the present invention includes a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method, a detection circuit configured to output a value corresponding to amplitude of current flowing in the power transmission side coil, and a control circuit configured to control the power transmission circuit. The control circuit includes a first processing portion configured to control to transmit a specific signal as a trigger for short-circuiting a power reception side coil in a power reception side resonance circuit including the power reception side coil capable of receiving power from the power transmission side coil and a power reception side capacitance from the power transmission side coil to the power reception side coil, a second processing portion configured to control the power transmission circuit so that the power transmission side coil generates a predetermined test magnetic field oscillating at the reference frequency after transmission of the specific signal, and a third processing portion configured to determine whether or not the power transmission can be performed by comparing an output value of the detection circuit when the test magnetic field is generated with a predetermined reference value.

In addition, a non-contact power supply system according to the present invention includes a power transmission apparatus including a power transmission side resonance circuit, and a power reception apparatus including a power reception side resonance circuit, for transmitting power from the power transmission apparatus to the power reception apparatus by magnetic resonance method. The power reception apparatus includes a load circuit that consumes power received by the power reception side resonance circuit, an abnormality detection circuit that detects presence or absence of an abnormality in the load circuit, and an abnormality response circuit that changes a magnitude of a load of the power reception apparatus viewed from the power transmission apparatus when the abnormality is detected. The power transmission apparatus monitors presence or absence of the change while the power transmission is performed, so as to control the power transmission.

In addition, a power reception method according to the present invention includes the steps of receiving power by a power receiving circuit to be connected to a power reception side resonance circuit including a power reception side coil and a power reception side capacitance, utilizing magnetic resonance, so as to generate an output power based on the power received by the power reception side coil, and changing a resonance frequency of the power reception side resonance circuit from a reference frequency that is the resonance frequency when receiving the power or short-circuiting the power reception side coil, before receiving the power.

In addition, a power transmission method according to the present invention includes the steps of transmitting power by a power transmission circuit to be connected to a power transmission side resonance circuit including a power transmission side coil and a power transmission side capacitance, so as to supply the power transmission side resonance circuit with an AC signal, so that the power transmission side coil generates an alternating magnetic field of a reference frequency, for transmitting power from the power transmission side coil by a magnetic resonance method, detecting to output a value corresponding to an amplitude of current flowing in the power transmission side coil, and controlling the power transmission circuit. The controlling step includes a first processing step of transmitting a specific signal from the power transmission side coil to the power reception side coil, a second processing step of controlling the power transmission circuit so that the power transmission side coil generates a predetermined test magnetic field oscillating at the reference frequency after the transmission of the specific signal, and a third processing step of determining whether or not the power transmission can be performed by comparing an output value in the detecting step when the test magnetic field is generated with a predetermined reference value. The specific signal is a signal as a trigger for changing a resonance frequency of a power reception side resonance circuit including a power reception side coil capable of receiving power from the power transmission side coil and a power reception side capacitance from the reference frequency that is the resonance frequency when receiving the power, or a signal as a trigger for short-circuiting the power reception side coil.

According to the present invention, it is possible to provide a non-contact power supply system, as well as a power reception apparatus, a power transmission apparatus, a power reception method, and a power transmission method, constituting the non-contact power supply system, which can prevent a breakdown or the like of a foreign object. In addition, according to the present invention, it is possible to provide a non-contact power supply system that can contribute to protection of the power reception apparatus when an abnormality occurs on the power reception apparatus side.

BRIEF DESCRIPTION OF THE DRAWINGS

FIGS. 1A and 1B are schematic outside views of power supply equipment and electronic equipment according to a first embodiment of the present invention.

FIG. 2 is a schematic inside structure diagram of the power supply equipment and the electronic equipment according to the first embodiment of the present invention.

FIG. 3 is a modified schematic outside view of the power supply equipment according to the first embodiment of the present invention.

FIG. 10 is a circuit diagram of a resonance frequency changing circuit according to the first embodiment of the present invention.

FIGS. 11A and 11B respectively show a schematic outside view and a schematic inside structure diagram of a foreign object in the first embodiment of the present invention.

FIGS. 14A to 14D are diagram showing examples of a positional relationship among a power supply table, electronic equipment, and a foreign object.

FIG. 15 is a diagram showing a positional relationship among the power supply table, the electronic equipment, and the foreign object.

FIG. 16 is a diagram for explaining exchange of signals between the power supply equipment and the electronic equipment according to the first embodiment of the present invention.

FIGS. 24A and 24B are diagrams respectively showing a power transmission side resonance circuit and a power reception side resonance circuit according to a third embodiment of the present invention.

FIG. 25 is a diagram showing connection relationship between the power transmission side resonance circuit and the sense resistor according to the third embodiment of the present invention.

FIG. 60 is an operation flowchart of the power supply equipment according to an eleventh embodiment of the present invention.

FIG. 61 is an operation flowchart of the electronic equipment that works together with the operation of FIG. 60.

DETAILED DESCRIPTION OF THE PREFERRED EMBODIMENTS

Figure 4:
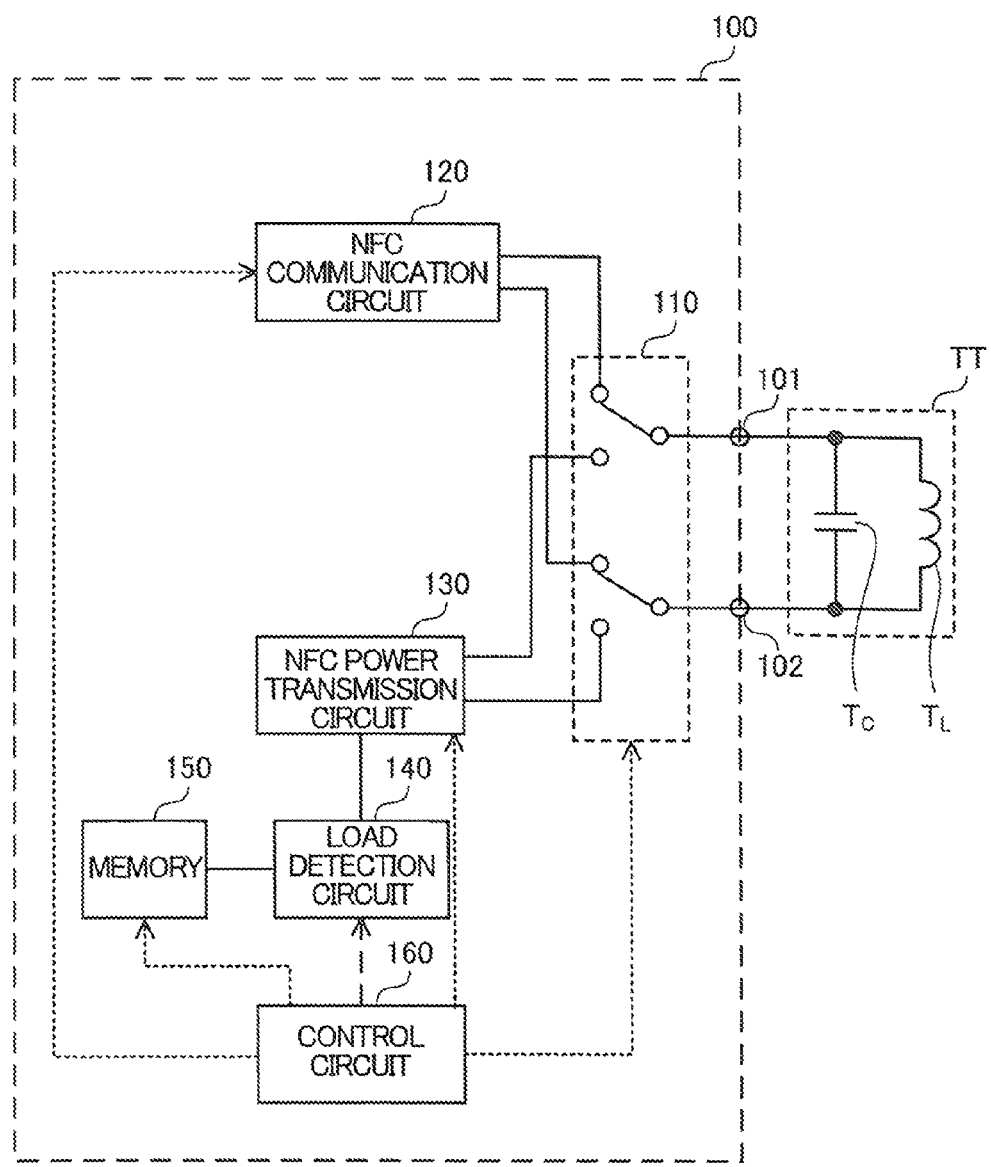
FIG. 4 is a partial structure diagram of the power supply equipment including an inside block diagram of an IC in the power supply equipment according to the first embodiment of the present invention.

Now, examples of embodiments of the present invention are specifically described with reference to the drawings. In the diagrams to be referred to, the same portion is denoted by the same reference numeral or symbol, and overlapping description of the same reference is omitted as a rule. Further, in this specification, for simplification of description, using a symbol or code indicating information, a signal, physical quantity, state quantity, a member, or the like, a name of the information, the signal, the physical quantity, the state quantity, the member, or the like corresponding to the symbol or the code may be omitted or abbreviated. In addition, in any flowchart that will be referred to later, a plurality of processes in any plurality of steps can be executed in any different order or can be executed in parallel as long as no contradiction occurs in the process content.

First Embodiment

A first embodiment of the present invention is described. FIGS. 1A and 1B are schematic outside views of power supply equipment 1 and electronic equipment 2 according to the first embodiment. Here, FIG. 1A is an outside view when the power supply equipment 1 and the electronic equipment 2 are in a separated state, while FIG. 1B is an outside view when the power supply equipment 1 and the electronic equipment 2 are in a basic position state. Meanings of the separated state and the basic position state will be described later in detail. The power supply equipment 1 and the electronic equipment 2 constitute the non-contact power supply system. The power supply equipment 1 includes a power plug 11 for receiving commercial AC power and a power supply table 12. FIG. 2 is a schematic inside structure diagram of the power supply equipment 1 and the electronic equipment 2. The power supply equipment 1 includes an AC/DC conversion portion 13 that generates and outputs a DC voltage having a predetermined voltage value from a commercial AC voltage supplied via the power plug 11, a power transmission side IC 100 (hereinafter referred to also as an IC 100) that is an integrated circuit and that operates using an output voltage of the AC/DC conversion portion 13, and a power transmission side resonance circuit TT (hereinafter referred to also as a resonance circuit TT) connected to the IC 100. The AC/DC conversion portion 13, the power transmission side IC 100, and the resonance circuit TT can be disposed in the power supply table 12. A circuit, besides the IC 100, that operates using the output voltage of the AC/DC conversion portion 13 can also be disposed in the power supply equipment 1.

The electronic equipment 2 includes a power reception side IC 200 (hereinafter referred to also as an IC 200) that is an integrated circuit, a power reception side resonance circuit RR (hereinafter referred to also as a resonance circuit RR) connected to the IC 200, a battery 21 that is a secondary battery, and a function circuit 22 that operates based on an output voltage of the battery 21. As described later in detail, the IC 200 can supply the battery 21 with a charging power. The IC 200 may operate using the output voltage of the battery 21 or using a voltage from a voltage source other than the battery 21. Otherwise, a DC voltage obtained by rectifying the signal for NFC communication (described later in detail) received from the power supply equipment 1 may be the drive voltage for the IC 200. In this case, the IC 200 can operate even if the battery 21 has run out of power.

The electronic equipment 2 can be any electronic equipment, such as a cellular phone (including a cellular phone classified into a smart phone), a mobile information terminal, a tablet personal computer, a digital camera, an MP3 player, a pedometer, or a Bluetooth (registered trademark) headset. The function circuit 22 realizes any function to be realized by the electronic equipment 2. Specifically, for example, if the electronic equipment 2 is a smart phone, the function circuit 22 includes a call processing portion for realizing call communication with a device on the other side, a communication processing portion for communicating information with other devices via a network, and the like. Otherwise, for example, if the electronic equipment 2 is a digital camera, the function circuit 22 includes a driving circuit for driving an image sensor, an image processing circuit for generating image data from an output signal of the image sensor, and the like.

The resonance circuit TT includes a parallel circuit of a coil $T_L$ as a power transmission side coil and a capacitor $T_C$ as a power transmission side capacitor (power transmission side capacitance). The resonance circuit RR includes a parallel circuit of a coil $R_L$ as a power reception side coil and a capacitor $R_C$ as a power reception side capacitor.

As shown in FIG. 1B, when the electronic equipment 2 is placed in a predetermined range on the power supply table 12, communication, power transmission, and power reception can be performed between the equipments 1 and 2 by magnetic resonance method (namely, utilizing magnetic resonance).

The communication between the equipments 1 and 2 is wireless communication by near field communication (NFC) (hereinafter referred to as NFC communication), and carrier frequency of the communication is 13.56 megahertz (MHz). Hereinafter, 13.56 MHz is referred to as a reference frequency. Because the NFC communication between the equipments 1 and 2 is performed by magnetic resonance method using the resonance circuits TT and RR, resonance frequencies of the resonance circuits TT and RR are both set to the reference frequency. However, as described later, the resonance frequency of the resonance circuit RR can be temporarily changed from the reference frequency.

The power transmission and the power reception between the equipments 1 and 2 means the power transmission from the power supply equipment 1 to the electronic equipment 2 by NFC and the power reception in the electronic equipment 2 by NFC. The power transmission and the power reception are also collectively referred to as power transfer. When the power is transferred from the coil $T_L$ to the coil $R_L$ by magnetic resonance method, non-contact power transfer is realized.

In the power transfer utilizing magnetic resonance, alternating current is supplied to the power transmission side coil $T_L$ so that alternating magnetic field of the reference frequency is generated in the power transmission side coil $T_L$. Then, the alternating magnetic field is transferred to the resonance circuit RR resonating at the reference frequency, and hence alternating current flows in the power reception side coil $R_L$. In other words, power is transferred from the resonance circuit TT including the power transmission side coil $T_L$ to the resonance circuit RR including the power reception side coil $R_L$. Further, although may be omitted in the following description, the magnetic field generated by the coil $T_L$ or the coil $R_L$ in the NFC communication or power transfer is alternating magnetic field that oscillates at the reference frequency, unless otherwise specified.

The state where the electronic equipment 2 is placed in the predetermined range on the power supply table 12 so that the above-mentioned NFC communication and power transfer can be realized is referred to as the basic position state (see FIG. 1B). When the magnetic resonance is used, the communication and power transfer can be performed even if a distance to the other party is relatively large. However, if the electronic equipment 2 is far from the power supply table 12 by substantial distance, the NFC communication and power transfer cannot be realized. The state where the electronic equipment 2 is sufficiently far from the power supply table 12 so that the NFC communication and power transfer cannot be realized is referred to as the separated state (see FIG. 1A).

Further, the power supply table 12 shown in FIG. 1A has a flat surface, but a recess or the like corresponding to a shape of the electronic equipment 2 to be placed may be formed in the power supply table 12. In other words, for example, the power supply table 12 may be a power supply cradle 12a shown in FIG. 3.

Figure 5:
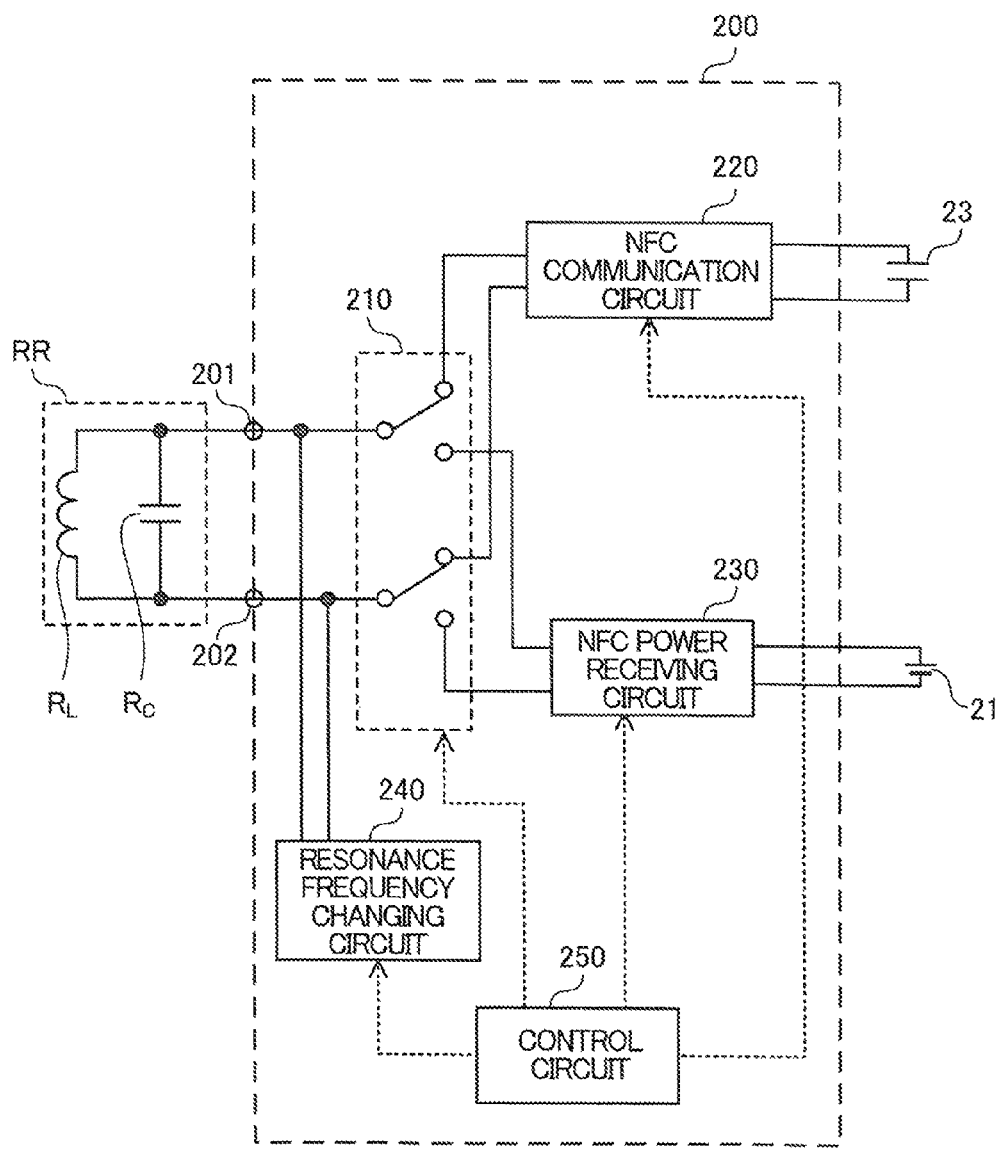
FIG. 5 is a partial structure diagram of the electronic equipment including an inside block diagram of an IC in the electronic equipment according to the first embodiment of the present invention.

FIG. 4 is a structure diagram of a part of the power supply equipment 1 including an inside block diagram of the IC 100. The IC 100 is provided with terminals 101 and 102, as well as portions denoted by numerals 110, 120, 130, 140, 150 and 160. FIG. 5 is a structure diagram of a part of the electronic equipment 2 including an inside block diagram of the IC 200. The IC 200 is provided with terminals 201 and 202, as well as portions denoted by numerals 210, 220, 230, 240 and 250. In addition, it is preferred to connect the IC 200 to a capacitor 23 for outputting a drive voltage of the IC 200. The capacitor 23 can output a DC voltage obtained by rectifying a signal for NFC communication received from the power supply equipment 1.

The terminal 101 is connected to one end of the capacitor $T_C$ and one end of the coil $T_L$, while the terminal 102 is connected to the other ends of the capacitor $T_C$ and the coil $T_L$. The switch circuit 110 includes switches disposed in series between the resonance circuit TT as well as the terminals 101 and 102 and the NFC communication circuit 120 as well as the NFC power transmission circuit 130. By the switch circuit 110, one of the circuits 120 and 130 is selectively connected to the terminals 101 and 102, and hence one of the circuits 120 and 130 is selectively connected to the resonance circuit TT.

The terminal 201 is connected to one end of the capacitor $R_C$ and one end of the coil $R_L$, while the terminal 202 is connected to the other ends of the capacitor $R_C$ and the coil $R_L$. The switch circuit 210 includes switches disposed in series between the resonance circuit RR as well as the terminals 201 and 202 and the NFC communication circuit 220 as well as the NFC power receiving circuit 230. By the switch circuit 210, one of the circuits 220 and 230 is selectively connected to the terminals 201 and 202, and hence one of the circuits 220 and 230 is selectively connected to the resonance circuit RR.

The state where the resonance circuit TT and the terminals 101 and 102 are connected to the NFC communication circuit 120 via the switch circuit 110 while the resonance circuit RR and the terminals 201 and 202 are connected to the NFC communication circuit 220 via the switch circuit 210 is referred to as a communication connection state.

If the IC 100 is on the transmission side in the communication connection state, the NFC communication circuit 120 can supply the AC signal (alternating current) of the reference frequency to the resonance circuit TT via the terminals 101 and 102. By superimposing any information signal on the AC signal, the NFC communication circuit 120 can transfer the information signal to the resonance circuit RR (electronic equipment 2) by magnetic resonance method. The information signal transferred from the power supply equipment 1 is extracted by the NFC communication circuit 220.

If the IC 200 is on the transmission side in the communication connection state, the NFC communication circuit 220 can supply the AC signal (alternating current) of the reference frequency to the resonance circuit RR via the terminals 201 and 202. By superimposing any information signal on the AC signal, the NFC communication circuit 220 can transfer the information signal to the resonance circuit TT (power supply equipment 1) by magnetic resonance method. The information signal transferred from the electronic equipment 2 is extracted by the NFC communication circuit 120.

The state where the resonance circuit TT and the terminals 101 and 102 are connected to the NFC power transmission circuit 130 via the switch circuit 110 while the resonance circuit RR and the terminals 201 and 202 are connected to the NFC power receiving circuit 230 via the switch circuit 210 is referred to as a power supply connection state.

In the power supply connection state, the NFC power transmission circuit 130 can perform the power transmission operation, and the NFC power receiving circuit 230 can perform the power reception operation. The power transfer can be realized by the power transmission operation and the power reception operation. In the power transmission operation, the power transmission circuit 130 supplies the AC signal (alternating current) of the reference frequency to the resonance circuit TT so that the power transmission side coil $T_L$ generates the alternating magnetic field for power transmission of the reference frequency, and hence transmits power from the resonance circuit TT (power transmission side coil $T_L$) to the resonance circuit RR by magnetic resonance method. The power received by the power reception side coil $R_L$ based on the power transmission operation is sent to the power receiving circuit 230. In the power reception operation, the power receiving circuit 230 generates any DC power from the received power. The power receiving circuit 230 can charge the battery 21 by the generated DC power.

Figure 6:
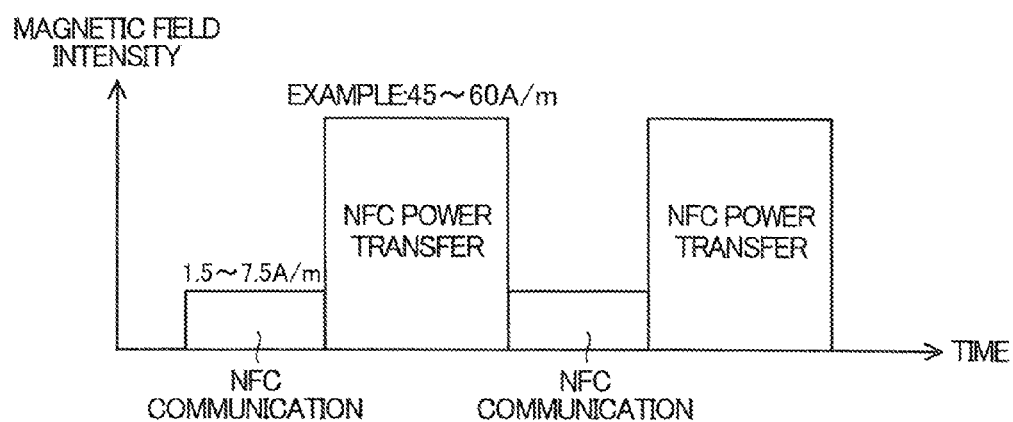
FIG. 6 is a diagram showing a change of magnetic field intensity when NFC communication and power transmission are alternately performed.

The magnetic field is generated by the coil $T_L$ or $R_L$ also in the case where the NFC communication is performed in the communication connection state, but the magnetic field intensity in the NFC communication is within a predetermined range. A lower limit value and an upper limit value in the range are defined by the NFC standard, and are 1.5 A/m and 7.5 A/m, respectively. In contrast, intensity of the magnetic field generated by the power transmission side coil $T_L$ in the power transfer (namely in the power transmission operation) is larger than the above-mentioned upper limit value and is approximately 45-60 A/m, for example. In the non-contact power supply system including the equipments 1 and 2, the NFC communication and the power transfer (NFC power transfer) can be alternately performed, and FIG. 6 shows the magnetic field intensity in this case.

Figure 7:
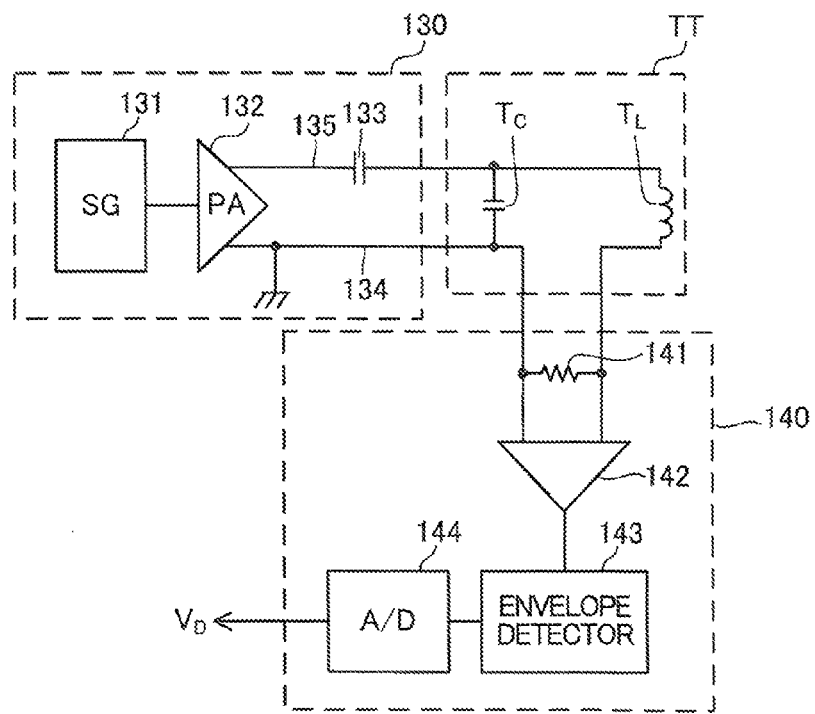
FIG. 7 is a diagram showing a relationship among a power transmission circuit, a load detection circuit, and a resonance circuit in the power supply equipment.

The load detection circuit 140 detects a magnitude of the load of the power transmission side coil $T_L$ when the AC signal (alternating current) is supplies from the power transmission circuit 130 to the power transmission side coil $T_L$. FIG. 7 shows a relationship among the power transmission circuit 130, the load detection circuit 140, and the resonance circuit TT in the power supply connection state. Note that the switch circuit 110 is omitted in FIG. 7.

The power transmission circuit 130 includes a signal generator 131 that generates a sine wave signal of the reference frequency, an amplifier (power amplifier) 132 that amplifies the sine wave signal generated by the signal generator 131 so as to output the amplified sine wave signal between lines 134 and 135 with reference to a potential of the line 134, and a capacitor 133. On the other hand, the load detection circuit 140 includes a sense resistor 141, an amplifier 142, an envelope detector 143, and an A/D converter 144. Signal intensity of the sine wave signal generated by the signal generator 131 is fixed to a constant value, but an amplification factor of the amplifier 132 is set in a variable manner by the control circuit 160.

One end of the capacitor 133 is connected to the line 135. In the power supply connection state, the other end of the capacitor 133 is commonly connected to one end of the capacitor $T_C$ and one end of the coil $T_L$, while the other end of the coil $T_L$ is commonly connected to the line 134 and the other end of the capacitor $T_C$ via the sense resistor 141.

Figure 8:
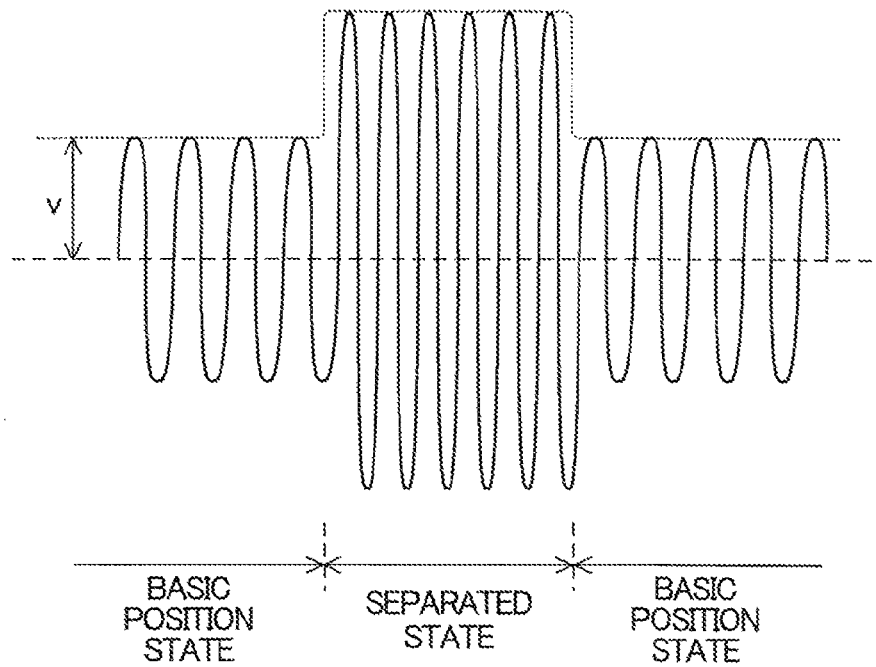
FIG. 8 is a waveform diagram showing a voltage drop of a sense resistor in the load detection circuit of FIG. 7.

The power transmission operation is realized by supplying the AC signal from the amplifier 132 to the resonance circuit TT via the capacitor 133. In the power supply connection state, when the AC signal is supplied from the amplifier 132 to the resonance circuit TT, the alternating current of the reference frequency flows in the coil $T_L$. As a result, an AC voltage drop is generated in the sense resistor 141. The solid line waveform of FIG. 8 is a voltage waveform of the voltage drop of the sense resistor 141. Under constant intensity of the magnetic field generated by the power transmission side coil $T_L$, when the electronic equipment 2 is brought close to the power supply table 12, current based on the magnetic field generated by the power transmission side coil $T_L$ flows in the power reception side coil $R_L$. On the other hand, a counter electromotive force based on the current that has flowed in the power reception side coil $R_L$ is generated in the power transmission side coil $T_L$, and the counter electromotive force acts to reduce the current flowing in the power transmission side coil $T_L$. For this reason, as shown in FIG. 8, amplitude of the voltage drop of the sense resistor 141 in the basic position state is smaller than that in the separated state.

The amplifier 142 amplifies the signal of the voltage drop of the sense resistor 141. The envelope detector 143 detects the envelope of the signal amplified by the amplifier 142 so as to output an analog voltage signal proportional to a voltage v of FIG. 8. The A/D converter 144 converts an output voltage signal of the envelope detector 143 into a digital signal so as to output a digital voltage value $V_D$. As understood from the above description, the voltage value $V_D$ has a value proportional to amplitude of current flowing in the sense resistor 141 (i.e., amplitude of current flowing in the power transmission side coil $T_L$).

For the power transmission side coil $T_L$ that generates the magnetic field, a coil such as the power reception side coil $R_L$ that magnetically couples with the power transmission side coil $T_L$ can be considered as a load, and the voltage value $V_D$ as a detection value of the load detection circuit 140 varies depending on the magnitude of the load. Thus, it can be considered that the load detection circuit 140 detects the magnitude of the load by an output of the voltage value $V_D$.

Figure 9:
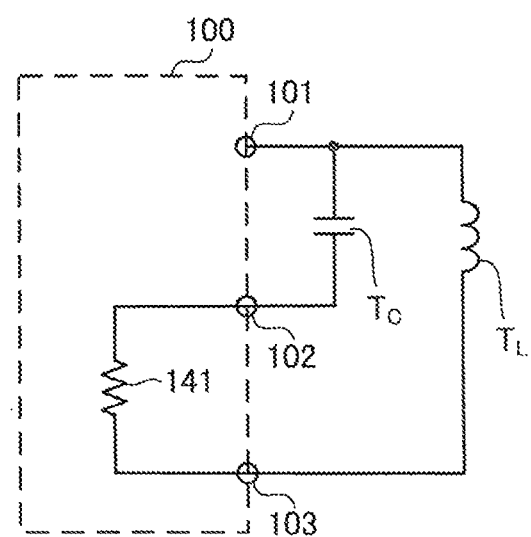
FIG. 9 is a connection circuit diagram of the sense resistor, a power transmission side coil, and a power transmission side capacitor.

Further, when forming the load detection circuit 140 as shown in FIG. 7, the sense resistor 141 can be disposed in the IC 100 as shown in FIG. 9. In the case of the structure of FIG. 9, it is preferred to further dispose a terminal 103 in the IC 100 so that the sense resistor 141 is connected between the terminals 102 and 103, to commonly connect one end of the capacitor $T_C$ and one end of the coil $T_L$ to the terminal 101, and to connect the other ends of the capacitor $T_C$ and the coil $T_L$ to the terminals 102 and 103, respectively. However, it is possible to dispose the sense resistor 141 outside the IC 100.

In addition, although detailed description is omitted as a known technique, when the IC 200 is on the transmission side in the communication connection state, the NFC communication circuit 220 itself may not transmit a radio wave but may change the load on the resonance circuit TT so as to transfer any information signal to the resonance circuit TT (power supply equipment 1) by magnetic resonance method. In other words, when the IC 200 is on the transmission side in the communication connection state, the IC 100 generates a non-modulated wave of the reference frequency by the resonance circuit TT, and in this case, the IC 200 changes the magnitude of the load of the IC 200 viewed from the resonance circuit TT (for example, the entire power consumption of the IC 200) in accordance with the information signal to be transferred to the IC 100. Then, the second load detection circuit equivalent to the load detection circuit 140 is disposed in the communication circuit 120 of the IC 100, and the magnitude of the load is detected by the second load detection circuit so that the communication circuit 120 extracts the above-mentioned information signal.

FIG. 4 is referred to again. The memory 150 is constituted of a nonvolatile memory and stores a reference value described later or the like in a nonvolatile manner. The control circuit 160 integrally controls operations of the portions in the IC 100. The control performed by the control circuit 160 includes, for example, switching operation control of the switch circuit 110, contents control and execution/non-execution control of the communication operation and power transmission operation by the communication circuit 120 and the power transmission circuit 130, operation control of the load detection circuit 140, and write control and read control of the memory 150.

With reference to FIG. 5, a resonance frequency changing circuit 240 in the electronic equipment 2 is a circuit for changing the resonance frequency of the resonance circuit RR from the reference frequency to other predetermined frequency $f_M$. FIG. 10 shows an example of the changing circuit 240. In FIG. 10, the changing circuit 240 is constituted of a series circuit of a capacitor 241 and a switch 242, and an end of the series circuit is commonly connected to an end of the capacitor $R_C$ and an end of the coil $R_L$ via the terminal 201, while the other end of the series circuit is commonly connected to the other ends of the capacitor $R_C$ and the coil $R_L$ via the terminal 202. The switch 242 is constituted of a semiconductor switching element such as a field-effect transistor, which is turned on or off under control of the control circuit 250.

When the switch 242 is off, the capacitor 241 is separated from the capacitor $R_C$ and the coil $R_L$. Therefore, the resonance circuit RR is constituted only of the coil $R_L$ and the capacitor $R_C$ if parasitic inductance and parasitic capacitance are omitted, and hence the resonance frequency of the resonance circuit RR is identical to the reference frequency. In other words, when the switch 242 is off, a power reception side capacitance that determines the resonance frequency of the resonance circuit RR is the capacitor $R_C$ itself. When the switch 242 is on, the capacitor 241 is connected in parallel to the capacitor $R_C$. Therefore, the resonance circuit RR is constituted of the coil $R_L$ and the combined capacitance of the capacitor $R_C$ and the capacitor 241. As a result, the resonance frequency of the resonance circuit RR becomes the frequency $f_M$ lower than the reference frequency. In other words, when the switch 242 is on, the power reception side capacitance that determines the resonance frequency of the resonance circuit RR is the above-mentioned combined capacitance. Here, it is supposed that the frequency $f_M$ is apart from the reference frequency in such extent that the resonance circuit RR does not work as a load on the power transmission side coil $T_L$ (namely, the magnetic resonance is not sufficiently generated between the resonance circuits TT and RR) when the switch 242 is on. For instance, the resonance frequency of the resonance circuit RR (namely frequency $f_M$) when the switch 242 is on is a few hundreds kHz to 1 MHz.

The control circuit 250 integrally controls operations of the portions in the IC 200. The control performed by the control circuit 250 includes, for example, switching operation control of the switch circuit 210, contents control and execution/non-execution control of the communication operation and the power reception operation by the communication circuit 220 and the power receiving circuit 230, and operation control of the changing circuit 240.

Further, the control circuit 160 of the power supply equipment 1 determines presence or absence of a foreign object on the power supply table 12 and can control the power transmission circuit 130 to perform the power transmission operation only if there is no foreign object. Here, meaning of the foreign object is described. FIG. 11A shows a schematic outside view of a foreign object 3, and FIG. 11B shows a schematic inside structure of the foreign object 3. The foreign object 3 includes a resonance circuit JJ constituted of a parallel circuit of a coil $J_L$ and a capacitor $J_C$, and a circuit 300 inside the foreign object connected to the resonance circuit JJ. A resonance frequency of the resonance circuit JJ is set to the reference frequency. The foreign object 3 is equipment that does not correspond to the power supply equipment 1 unlike the electronic equipment 2. For instance, the foreign object 3 is an object (such as a card) with a wireless IC tag having an antenna coil (coil $J_L$) of 13.56 MHz that does not respond to the NFC communication. In addition, for example, the foreign object 3 is electronic equipment that has the NFC communication function itself, but the function is disabled by a switch. For instance, a smart phone that has the NFC communication function, which is disabled by software setting though, can be the foreign object 3. In addition, a smart phone that has the effective NFC communication function but does not have the power receiving function is also classified to the foreign object 3.

In the state where such the foreign object 3 is placed on the power supply table 12, if the power supply equipment 1 performs the power transmission operation, the foreign object 3 may be broken down by ferromagnetic field generated by the power transmission side coil $T_L$ (for example, magnetic field having intensity of 12 A/m or higher). For instance, the ferromagnetic field in the power transmission operation may cause an increase of a terminal voltage of the coil $J_L$ of the foreign object 3 on the power supply table 12 up to 100-200 V. If the foreign object 3 is not made to withstand such a high voltage, the foreign object 3 is broken down.

[Initial Setting Process]

Figure 12:
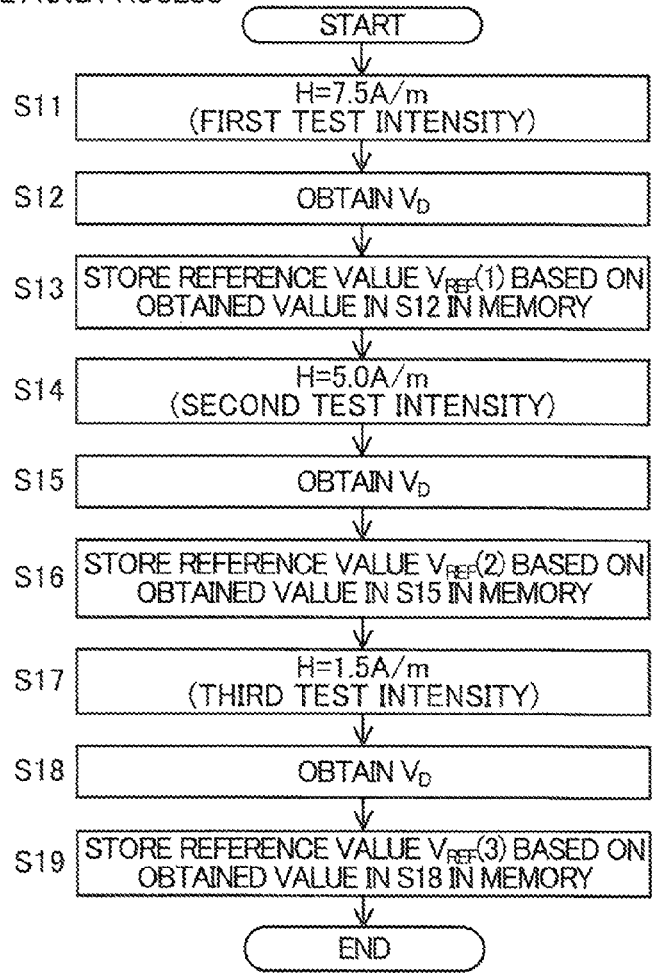
FIG. 12 is an operation flowchart of an initial setting process performed by the power supply equipment.
Figure 13:
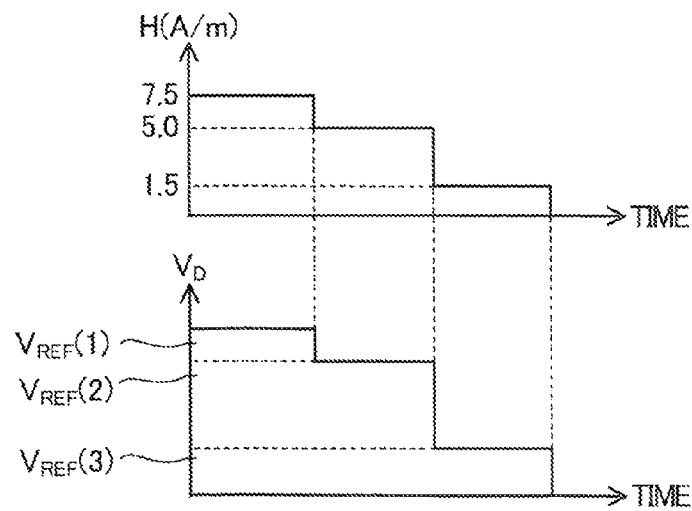
FIG. 13 is a diagram for explaining magnetic field intensity and a set reference value when the initial setting process is performed.

In order to enable to determine presence or absence of a foreign object, one or more reference values are stored in advance in the memory 150 of the power supply equipment 1. With reference to FIGS. 12 and 13, a method of setting the reference value is described. FIG. 12 is an operation flowchart of an initial setting process for storing three reference values in the memory 150, and FIG. 13 shows a relationship between a magnetic field intensity H and the voltage value $V_D$ when the initial setting process is performed. The magnetic field intensity H indicates magnetic field intensity of the alternating magnetic field oscillating at the reference frequency generated by the power transmission side coil $T_L$.

The initial setting process is performed by the IC 100 under the following initial setting environment. Under the initial setting environment, the load on the power transmission side coil $T_L$ is zero or as small as to be completely neglected, and hence there is no coil that magnetically couples with the power transmission side coil $T_L$. In order to secure this, equipment with a coil, including the power receiving equipment 2 and the foreign object 3, is sufficiently kept away from the power supply table 12. The separated state of FIG. 1A can be considered to satisfy the initial setting environment. In order to secure the initial setting environment, the initial setting process may be performed in the manufacturing process or the shipping process of the power supply equipment 1, for example. However, the initial setting process may be performed at any timing as long as the initial setting environment is secured.

When the initial setting process is performed, the control circuit 160 controls the switch circuit 110 so as to connect the power transmission circuit 130 to the resonance circuit TT. Then, the magnetic field intensity H is sequentially set to first, second, . . . , n-th test intensities, and hence the voltage values $V_D$ at the test intensities are stored in the memory 150. To set the magnetic field intensity H to the i-th test intensity means to control the power transmission side coil $T_L$ to generate the alternating magnetic field that has the i-th test intensity and oscillates at the reference frequency (i is an integer). The control circuit 160 can set the magnetic field intensity H in a variable manner by controlling the amplification factor of the amplifier 132 (see FIG. 7). The first to the n-th test intensities are predetermined magnetic field intensities different from each other. However, the first to the n-th test intensities are all within the range from the lower limit value 1.5 A/m to the upper limit value 7.5 A/m of communication magnetic field intensity. Symbol n is an arbitrary integer larger than 2, and n is three in the example of FIGS. 12 and 13. Here, it is supposed that the first to third test intensities are 7.5 A/m, 5.0 A/m, and 1.5 A/m, respectively. Every test intensity is smaller than the magnetic field intensity (for example, 45-60 A/m) generated by the power transmission side coil $T_L$ in the power transfer (namely power transmission operation).

Specifically, in the initial setting process, the control circuit 160 first sets the magnetic field intensity H to the first test intensity (Step S11), and in this state, the control circuit 160 controls the memory 150 to store a reference value $V_{REF}(1)$ based on the voltage value $V_D$ obtained from the A/D converter 144 (Steps S12 and S13). Next, the control circuit 160 sets the magnetic field intensity H to the second test intensity (Step S14), and in this state, the control circuit 160 controls the memory 150 to store a reference value $V_{REF}(2)$ based on the voltage value $V_D$ obtained from the A/D converter 144 (Steps S15 and S16). Finally, the control circuit 160 sets the magnetic field intensity H to the third test intensity (Step S17), and in this state, the control circuit 160 controls the memory 150 to store a reference value $V_{REF}(3)$ based on the voltage value $V_D$ obtained from the A/D converter 144 (Steps S18 and S19). Thus, the initial setting process is finished.

The obtained voltage value $V_D$ when the magnetic field intensity H is the i-th test intensity in the initial setting process is denoted by symbol $V_{Di}$ (i is an integer). For instance, $V_{REF}(1)$, $V_{REF}(2)$, and $V_{REF}(3)$ are set to $V_{D1}-\Delta V$, $V_{D2}-\Delta V$, and $V_{D3}-\Delta V$, respectively. Alternatively, $V_{REF}(1)$, $V_{REF}(2)$, and $V_{REF}(3)$ are set to $V_{D1} \times k$, $V_{D2} \times k$, and $V_{D3} \times k$, respectively. Symbol $\Delta V$ is a predetermined positive very small value (here, $\Delta V$ can be zero). Symbol k is a coefficient having a predetermined positive value smaller than one.

Note that the voltage value $V_D$ that will be obtained when the magnetic field intensity H is set to the first test intensity under the initial setting environment can be estimated at the designing stage. The value derived by the estimation may be stored as the reference value $V_{REF}(1)$ in the memory 150 without performing the initial setting process of FIG. 12. The same is true for the reference values $V_{REF}(2)$ and $V_{REF}(3)$.

[Principle of Foreign Object Detection Process]

A principle of the foreign object detection process for detecting presence or absence of the foreign object 3 on the power supply table 12 is described. First to fourth cases shown in FIGS. 14A to 14D are considered. In the first case, only the electronic equipment 2 exists on the power supply table 12. In the second case, the electronic equipment 2 and the foreign object 3 exist on the power supply table 12. In the third case, only the foreign object 3 exists on the power supply table 12. In the fourth case, neither the electronic equipment 2 nor the foreign object 3 exists on the power supply table 12.

When the foreign object detection process is performed, the power transmission circuit 130 is connected to the resonance circuit TT. In the foreign object detection process, the power transmission circuit 130 controls the power transmission side coil $T_L$ to generate the i-th test magnetic field (i-th test alternating magnetic field) that has the i-th test intensity and oscillates at the reference frequency, and the control circuit 160 uses the load detection circuit 140 to obtain the voltage value $V_D$ when the i-th test magnetic field is generated as a voltage value $V_D(i)$. In addition, during the period while the i-th test magnetic field is generated by the power transmission side coil $T_L$, in the electronic equipment 2, the changing circuit 240 is used, and the resonance frequency of the resonance circuit RR is set to the above-mentioned frequency $f_M$.

For this reason, in the first case, compared with the case where the resonance frequency of the resonance circuit RR remains to be the reference frequency, a load on the power transmission side coil $T_L$ becomes sufficiently small (namely, becomes a state as if the electronic equipment 2 does not exist on the power supply table 12), and the voltage value $V_D(i)$ becomes large so that decision inequality "$V_D(i) \geq V_{REF}(i)$" is satisfied.

On the other hand, in the second case, the resonance frequency of the resonance circuit RR is changed to the frequency $f_M$, but the foreign object 3 remains to exist as a load on the power transmission side coil $T_L$ (the resonance frequency of the resonance circuit JJ of the foreign object 3 remains to be the reference frequency). Therefore, the voltage value $V_D(i)$ becomes small, so that the decision inequality "$V_D(i) \leq V_{REF}(i)$" is not satisfied.

If the above-mentioned decision inequality is satisfied, the control circuit 160 determines that the foreign object 3 does not exist on the power supply table 12 and allows the power transmission circuit 130 to perform the power transmission operation. However, if the above-mentioned decision inequality is not satisfied, the control circuit 160 determines that the foreign object 3 exists on the power supply table 12 and disables the power transmission circuit 130 to perform the power transmission operation. The magnetic field intensity (i-th test intensity) of the i-th test magnetic field is substantially smaller than the magnetic field intensity generated by the power transmission side coil $T_L$ in the power transmission operation and is smaller than or equal to the upper limit value (7.5 A/m) of the communication magnetic field intensity. Therefore, there is no possibility or little possibility that the foreign object 3 is broken down by the i-th test magnetic field.

In the third and the fourth cases, the electronic equipment 2 that responds to the NFC communication does not exist on the power supply table 12. Therefore, the power transmission operation is not necessary, and hence the foreign object detection process itself is not performed. The power supply equipment 1 can determine whether or not the electronic equipment 2 that can respond to the power transfer exists on the power supply table 12 by NFC communication.

Note that the state where the foreign object 3 exists on the power supply table 12 is not limited to the state where the foreign object 3 directly contacts with the power supply table 12. For instance, the state as shown in FIG. 15, in which the electronic equipment 2 exists directly on the power supply table 12 and the foreign object 3 exists on the electronic equipment 2, also belongs to the state where the foreign object 3 exists on the power supply table 12 as long as the above-mentioned decision inequality is not satisfied.

[Exchange of Signals Until Power Transfer: FIG. 16]

With reference to FIG. 16, exchange of signals between the equipments 1 and 2 until the power transfer is performed is described. In the following description, it is supposed that the electronic equipment 2 exists on the power supply table 12 in the basic position state (FIG. 1B) unless otherwise specified. In addition, in the following description, the resonance frequency of the resonance circuit RR is denoted by symbol $f_O$.

The NFC communication between the equipments 1 and 2 is performed by half-duplex method. First, the power supply equipment 1 is the transmission side while the electronic equipment 2 is the reception side. The power supply equipment 1 (IC 100) transmits an inquiry signal 510 to the equipment on the power supply table 12 (hereinafter referred to as equipment to be supplied with power) by NFC communication. The equipment to be supplied with power includes the electronic equipment 2 and can include the foreign object 3. The inquiry signal 510 includes, for example, a signal to inquire unique identification information of the equipment to be supplied with power, a signal to inquire whether or not the equipment to be supplied with power is ready to perform the NFC communication, and a signal to inquire whether or not the equipment to be supplied with power can receive power or requests power transmission.

The electronic equipment 2 (IC 200) that has received the inquiry signal 510 transmits a response signal 520 responding the inquiry of the inquiry signal 510 to the power supply equipment 1 by NFC communication. The power supply equipment 1 (IC 100) that has received the response signal 520 analyzes the response signal 520. If the equipment to be supplied with power can perform the NFC communication and can receive power or requests power transmission, the power supply equipment 1 transmits a change signal 530 to the equipment to be supplied with power by NFC communication. The electronic equipment 2 (IC 200) as the equipment to be supplied with power, which has received the change signal 530, transmits a response signal 540 to the change signal 530 to the power supply equipment 1 by NFC communication and quickly changes a resonance frequency $f_O$ from the reference frequency to the frequency $f_M$ (for example, 1.0 MHz). The change signal 530 is, for example, a signal to request, instruct, or suggest for changing the resonance frequency $f_O$ from the reference frequency to the frequency $f_M$. The control circuit 250 of the electronic equipment 2 changes the resonance frequency $f_O$ from the reference frequency to the frequency $f_M$ by the trigger that is the reception of the change signal 530. The change signal 530 can be any signal and may be included in the inquiry signal 510 as long as it can be the trigger of the change of the resonance frequency $f_O$.

The power supply equipment 1 (IC 100) that has received the response signal 540 switches the connection destination of the resonance circuit TT from the communication circuit 120 to the power transmission circuit 130 and performs the foreign object detection process described above. During the period while the foreign object detection process is performed, the electronic equipment 2 (IC 200) maintains the resonance frequency $f_O$ at the frequency $f_M$. Specifically, the electronic equipment 2 (IC 200) uses an internal timer to maintain the resonance frequency $f_O$ at the frequency $f_M$ for a period of time corresponding to a length of the execution period of the foreign object detection process, and afterwards resets the resonance frequency $f_O$ to the reference frequency (13.56 MHz).

When determining that there is no foreign object on the power supply table 12 in the foreign object detection process, the power supply equipment 1 (IC 100) switches the connection destination of the resonance circuit TT from the power transmission circuit 130 to the communication circuit 120 and transmits an authentication signal 550 to the equipment to be supplied with power by NFC communication. The authentication signal 550 includes, for example, a signal to inform the equipment to be supplied with power about that the power transmission is ready. The electronic equipment 2 (IC 200) that has received the authentication signal 550 transmits a response signal 560 to the authentication signal 550 to the power supply equipment 1 by NFC communication. The response signal 560 includes, for example, a signal to inform about that content indicated by the authentication signal 550 is recognized or a signal to give permission to content indicated by the authentication signal 550. The power supply equipment 1 (IC 100) that has received the response signal 560 switches the connection destination of the resonance circuit TT again from the communication circuit 120 to the power transmission circuit 130, and performs the power transmission operation so that power transfer 570 is realized.

In the first case of FIG. 14A, the power transfer 570 is performed by the flow described above. However, in the second case of FIG. 14B, the process proceeds until transmission and reception of the response signal 540, but the above-mentioned decision inequality is not satisfied in the foreign object detection process. Therefore, it is determined that there is a foreign object on the power supply table 12, and hence the power transfer 570 is not performed.

Figure 17:
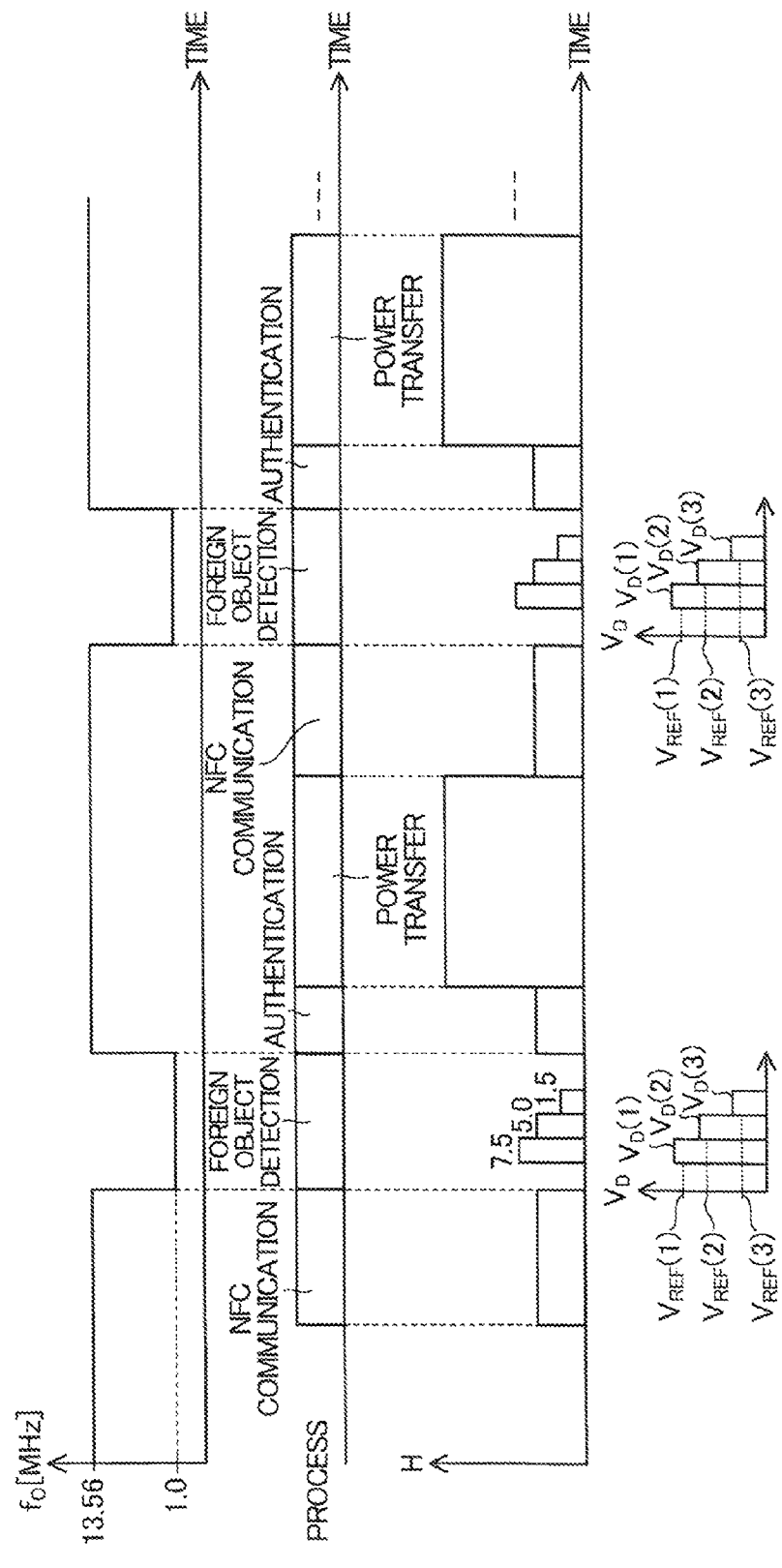
FIG. 17 is a diagram showing time series variations of a resonance frequency ($f_O$), magnetic field intensity (H), and a voltage value ($V_D$) together with time series variation of the process in the case where only the electronic equipment exists on the power supply table.

The power transfer 570 of one time may be performed only for a predetermined period of time, and the sequential process from the transmission of the inquiry signal 510 to the power transfer 570 may be repeatedly performed. FIG. 17 shows time series variations of the resonance frequency $f_O$, the magnetic field intensity H, and the voltage value $V_D$ with respect to the time series variation of the process when the above-mentioned repetition is performed in the first case. In the example of FIG. 17, the first, second, and third test magnetic fields having the first, second, and third test intensities (see FIG. 12) are sequentially generated in the foreign object detection process. Note that FIG. 17 is referred to also in the description of a flowchart that will appear later.

[Operational Flowchart]

Figure 18:
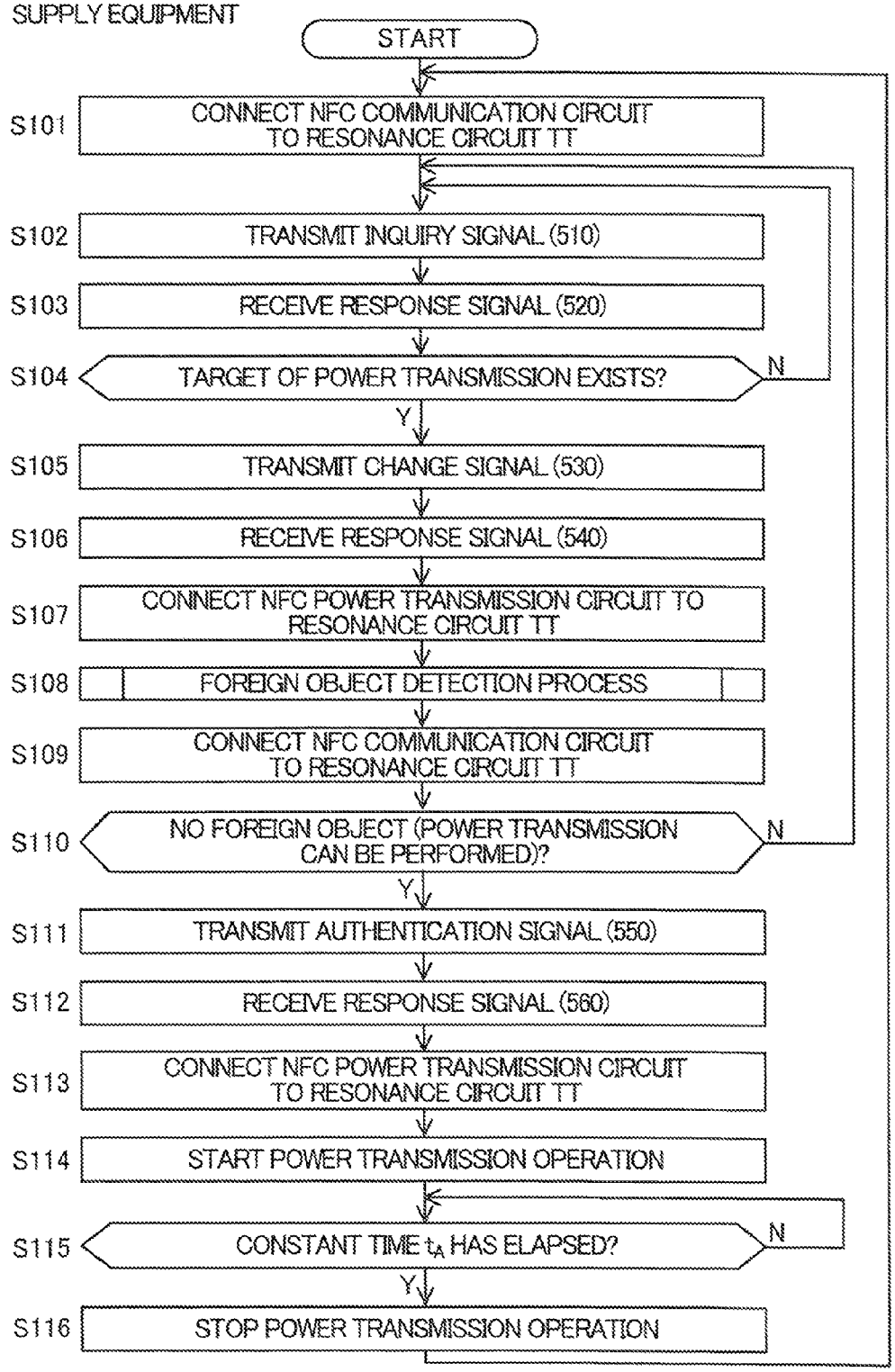
FIG. 18 is an operation flowchart of the power supply equipment according to the first embodiment of the present invention.

Next, the operation flow of the power supply equipment 1 is described. FIG. 18 is an operation flowchart of the power supply equipment 1 after the initial setting process described above. The process starting from Step S101 is executed after the initial setting process. Operations of the communication circuit 120 and the power transmission circuit 130 are performed under control of the control circuit 160.

When the power supply equipment 1 is started, first in Step S101, the control circuit 160 connects the communication circuit 120 to the resonance circuit TT by control of the switch circuit 110. In the following Step S102, the control circuit 160 transmits the inquiry signal 510 to the equipment to be supplied with power by NFC communication using the communication circuit 120, and afterwards in Step S103, waits for reception of the response signal 520. When the communication circuit 120 receives the response signal 520, the control circuit 160 analyzes the response signal 520. If the equipment to be supplied with power can perform the NFC communication and can receive power or requests power transmission, the control circuit 160 determines that there is a target of the power transmission (Y in Step S104) and proceeds to Step S105. Otherwise (N in Step S104), the control circuit 160 returns to Step S102.

In Step S105, the control circuit 160 transmits the change signal 530 to the equipment to be supplied with power by NFC communication using the communication circuit 120, and afterwards in Step S106, waits for reception of the response signal 540. When the communication circuit 120 receives the response signal 540, the control circuit 160 connects the power transmission circuit 130 to the resonance circuit TT by control of the switch circuit 110 in Step S107, and performs the foreign object detection process in the following Step S108 (as described later in detail).

After the foreign object detection process, the control circuit 160 connects the communication circuit 120 to the resonance circuit TT by control of the switch circuit 110 in Step S109, and proceeds to Step S110. In the foreign object detection process of Step S108, if it is determined that the foreign object 3 exists on the power supply table 12, the process returns from Step S110 to Step S102. If it is determined that the foreign object 3 does not exist on the power supply table 12, the process proceeds from Step S110 to Step S111. In Step S110, the determination that the foreign object 3 does not exist is equivalent to determination that the power transmission to the equipment to be supplied with power can be performed. The determination that the foreign object 3 exists is equivalent to determination that the power transmission to the equipment to be supplied with power cannot be performed.

In Step S111, the control circuit 160 transmits the authentication signal 550 to the equipment to be supplied with power by NFC communication using the communication circuit 120, and afterward in Step S112, waits for reception of the response signal 560. When the communication circuit 120 receives the response signal 560, the control circuit 160 connects the power transmission circuit 130 to the resonance circuit TT by control of the switch circuit 110 in Step S113, and in the following Step S114, controls the power transmission circuit 130 to start the power transmission operation.

The control circuit 160 measures a lapse time from the start time point of the power transmission operation and compares the lapse time with a predetermined time $t_A$ (Step S115). Then, when the lapse time reaches the time $t_A$ (Y in Step S115), the control circuit 160 controls the power transmission circuit 130 to stop the power transmission operation in Step S116 and returns to Step S101 so as to repeat the process described above. However, also in the first case, when the battery of the electronic equipment 2 becomes a fully charged state, the process does not proceed to Step S105 based on a result of the analysis of the response signal 520.

Figure 19:
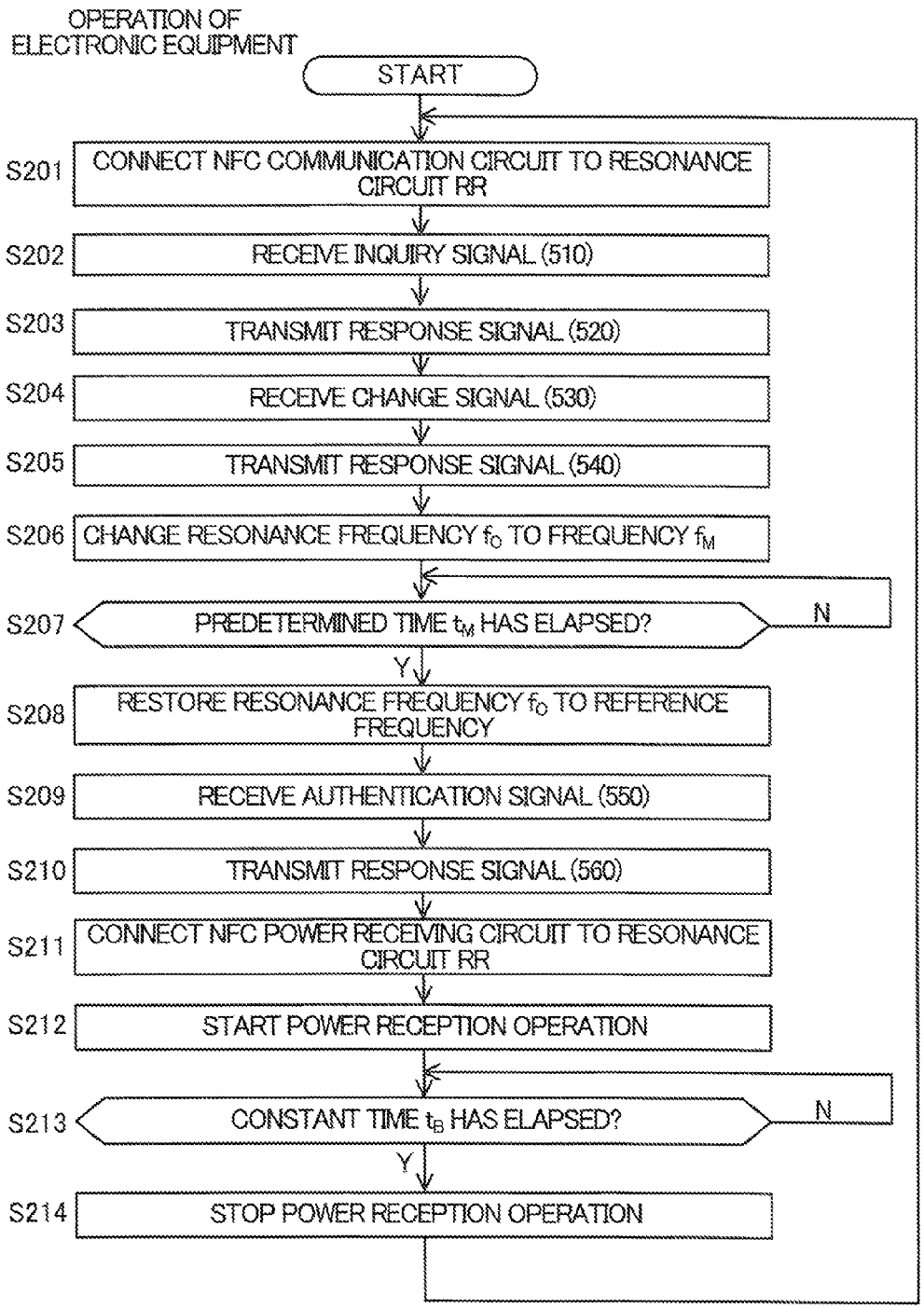
FIG. 19 is an operation flowchart of the electronic equipment that works together with the operation of FIG. 18.

Next, the operation flow of the electronic equipment 2 is described. FIG. 19 is an operation flowchart of the electronic equipment 2. The process starting from Step S201 is performed together with the operation of the power supply equipment 1 after the initial setting process. Operations of the communication circuit 220 and the power receiving circuit 230 are performed under control of the control circuit 250.

When the electronic equipment 2 is started, first in Step S201, the control circuit 250 connects the communication circuit 220 to the resonance circuit RR by control of the switch circuit 210. The resonance frequency $f_O$ when the electronic equipment 2 is started is the reference frequency. In the following Step S202, the control circuit 250 uses the communication circuit 220 and waits for reception of the inquiry signal 510. When the communication circuit 220 receives the inquiry signal 510, the control circuit 250 analyzes the inquiry signal 510, generates the response signal 520, and transmits the response signal 520 to the power supply equipment 1 by NFC communication using the communication circuit 220 in Step S203. In this case, the control circuit 250 checks a state of the battery 21. If the battery 21 is not the fully charged state and there is no abnormality of the battery 21, the control circuit 250 puts the signal indicating ready to receive power or requesting the power transmission in the response signal 520. On the other hand, if the battery 21 is the fully charged state or there is an abnormality of the battery 21, the control circuit 250 puts the signal indicating not ready to receive power in the response signal 520.

After that, when the change signal 530 is received by the communication circuit 220 in Step S204, the process proceeds to Step S205. In Step S205, the control circuit 250 transmits the response signal 540 to the power supply equipment 1 by NFC communication using the communication circuit 220, and in the following Step S206, controls the changing circuit 240 to change the resonance frequency $f_O$ from the reference frequency to the frequency $f_M$. The control circuit 250 measures lapse time from changing the resonance frequency $f_O$ to the frequency $f_M$ (Step S207). When the lapse time reaches a predetermined time $t_M$, the control circuit 250 restores the resonance frequency $f_O$ to reference frequency (Step S208) and proceeds to Step S209. The time $t_M$ is set in advance so that the resonance frequency $f_O$ is maintained at the frequency $f_M$ during the period while the power supply equipment 1 generates the test magnetic field, and that the resonance frequency $f_O$ is quickly restored to the reference frequency when the period is finished. It is possible to specify the time $t_M$ in the change signal 530.

In Step S209, the control circuit 250 uses the communication circuit 220 so as to wait for reception of the authentication signal 550. When the communication circuit 220 receives the authentication signal 550, the control circuit 250 transmits the response signal 560 to the authentication signal 550 to the power supply equipment 1 by NFC communication using the communication circuit 220 in Step S210. Further, if the foreign object 3 exists on the power supply table 12, the authentication signal 550 is not transmitted from the power supply equipment 1 (see Step S110 in FIG. 18). Therefore, if the authentication signal 550 is not received for a constant period of time in Step S209, the process may return to Step S201.

After transmitting the response signal 560, the control circuit 250 connects the power receiving circuit 230 to the resonance circuit RR by control of the switch circuit 210 in Step S211, and in the following Step S212, controls the power receiving circuit 230 to start the power reception operation. The control circuit 250 measures a lapse time from the start time point of the power reception operation and compares the lapse time with a predetermined time $t_B$ (Step S213). Then, when the lapse time reaches the time $t_B$ (Y in Step S213), the control circuit 250 controls to stop the power reception operation in Step S214 and returns to Step S201.

The time $t_B$ is set in advance or specified in the authentication signal 550 so that the period while the power reception operation is performed is substantially identical to the period while the power supply equipment 1 performs the power transmission operation. After starting the power reception operation, the control circuit 250 may monitor charge current of the battery 21, determine that the power transmission operation is finished when the charge current value becomes a predetermined value or lower, stop the power reception operation, and proceed to Step S201.

Figure 20:
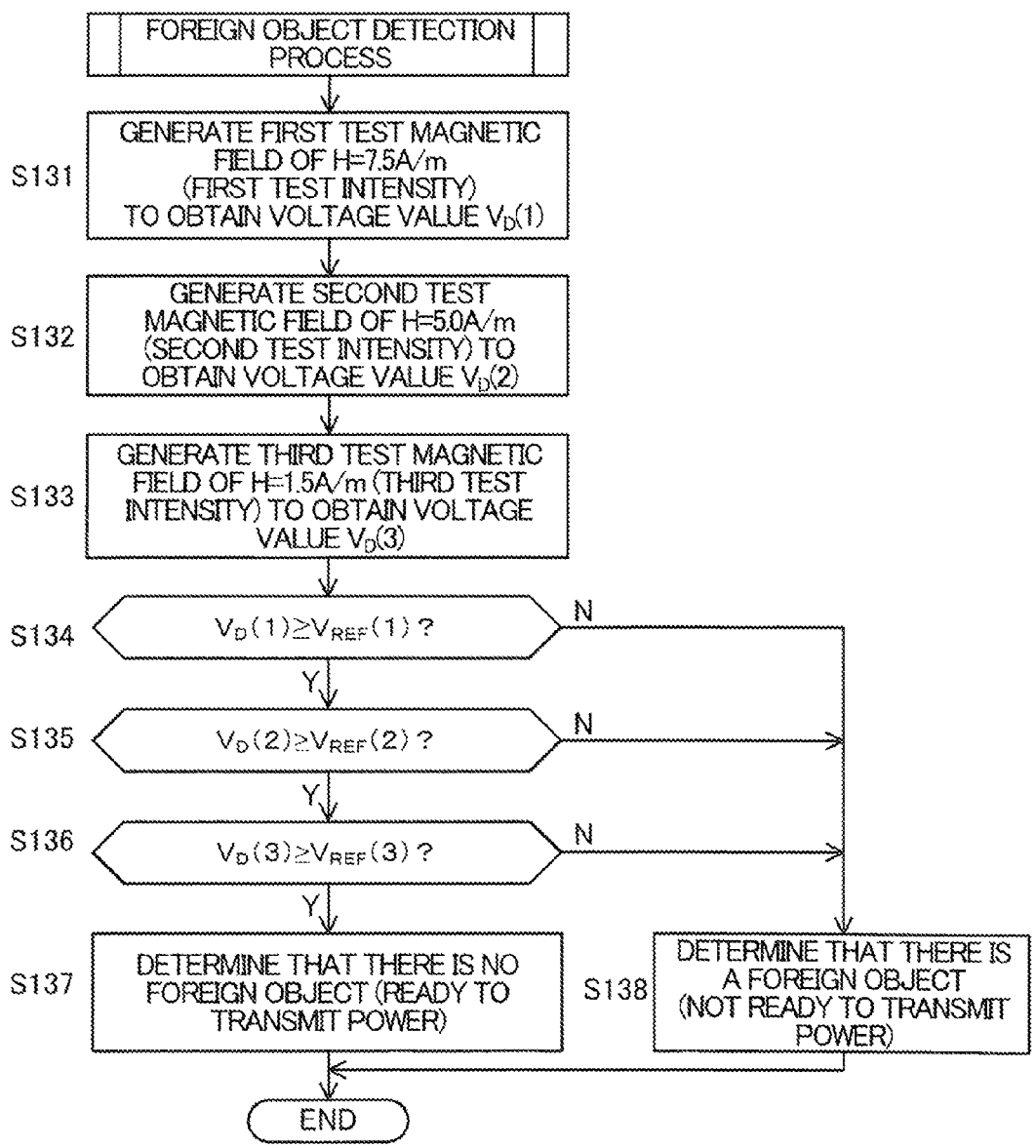
FIG. 20 is a flowchart of a foreign object detection process performed by the power supply equipment.

With reference to FIG. 20, the operation flow of the foreign object detection process is described. FIG. 20 is a detailed flowchart of the foreign object detection process in Step S108 of FIG. 18. In the foreign object detection process, first in Step S131, the control circuit 160 controls the power transmission side coil $T_L$ to generate a first test magnetic field that has the first test intensity and oscillates at the reference frequency by control of the power transmission circuit 130, and uses the load detection circuit 140 to obtain the voltage value $V_D$ when the first test magnetic field is generated as a voltage value $V_D(1)$. Next in Step S132, the control circuit 160 controls the power transmission side coil $T_L$ to generate a second test magnetic field that has the second test intensity and oscillates at the reference frequency by control of the power transmission circuit 130, and uses the load detection circuit 140 to obtain the voltage value $V_D$ when the second test magnetic field is generated as a voltage value $V_D(2)$. Further in Step S133, the control circuit 160 controls the power transmission side coil $T_L$ to generate a third test magnetic field that has the third test intensity and oscillates at the reference frequency by control of the power transmission circuit 130, and uses the load detection circuit 140 to obtain the voltage value $V_D$ when the third test magnetic field is generated as a voltage value $V_D(3)$.

After that, the control circuit 160 compares the voltage values $V_D(1)$, $V_D(2)$ and $V_D(3)$ with the reference values $V_{REF}(1)$, $V_{REF}(2)$ and $V_{REF}(3)$ in the memory 150, respectively, and determines whether or not the first decision inequality "$V_D(1) \geq V_{REF}(1)$", the second decision inequality "$V_D(2) \geq V_{REF}(2)$", and the third decision inequality "$V_D(3) \geq V_{REF}(3)$" are respectively satisfied (Steps S134 to S136). Then, the control circuit 160 determines that there is no foreign object on the power supply table 12 only if the first to third decision inequalities are all satisfied (Step S137). Otherwise, the control circuit 160 determines that there is a foreign object on the power supply table 12 (Step S138), and finishes the foreign object detection process. When determining that there is no foreign object, the control circuit 160 determines that the power transmission to the equipment to be supplied with power can be performed. When determined that there is a foreign object, the control circuit 160 determines that the power transmission to the equipment to be supplied with power cannot be performed. Further, it is possible to determine that there is no foreign object on the power supply table 12 if two or more decision inequalities among the first to third decision inequalities are satisfied.

Figure 21:
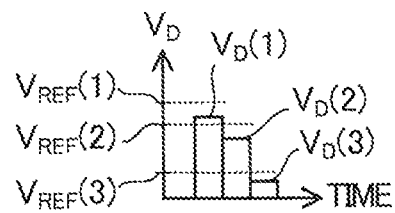
FIG. 21 is a diagram showing a result of the foreign object detection process in the case where the foreign object exists.

In FIG. 17 corresponding to the first case (FIG. 14A), a manner in which all the first to third decision inequalities are satisfied is shown. In the second case, as shown in FIG. 21, it is expected that the voltage values $V_D(1)$ to $V_D(3)$ obtained in the foreign object detection process are lower than $V_{REF}(1)$ to $V_{REF}(3)$, respectively.

According to this embodiment, when the foreign object 3 is placed on the power supply table 12 in error, the power transmission operation is not performed in accordance with the foreign object detection process. Therefore, a breakdown of the foreign object 3 due to execution of the power transmission operation can be avoided.

In this embodiment, reliability of detection is improved by performing the foreign object detection process using the three test magnetic fields, but it is possible to perform the foreign object detection process using one, two, or four or more test magnetic fields. When using only one test magnetic field, for example, it is possible to omit the process of Steps S14 to S19 in the initial setting process of FIG. 12 and to omit the process of Steps S132, S133, S135 and S136 in the foreign object detection process of FIG. 20. Then, it is determined that there is no foreign object on the power supply table 12 if the first decision inequality "$V_D(1) \geq V_{REF}(1)$" is satisfied, and that there is a foreign object on the power supply table 12 if the first decision inequality is not satisfied.

Second Embodiment

A second embodiment of the present invention is described. The second embodiment and a third embodiment described later are embodiments based on the first embodiment. The description of the first embodiment is applied also to the second and third embodiments concerning items that are not specifically described in the second and third embodiments, as long as no contradiction occurs. In the second embodiment, a variation structure of the changing circuit 240 is exemplified.

Figure 22:
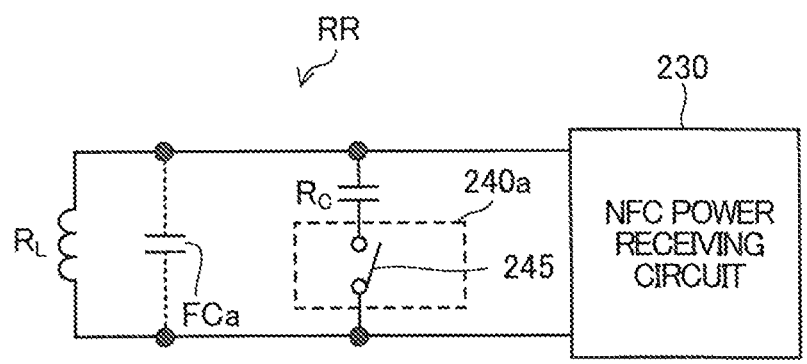
FIG. 22 is a diagram for explaining a first example of the resonance frequency changing circuit according to a second embodiment of the present invention.
Figure 23:
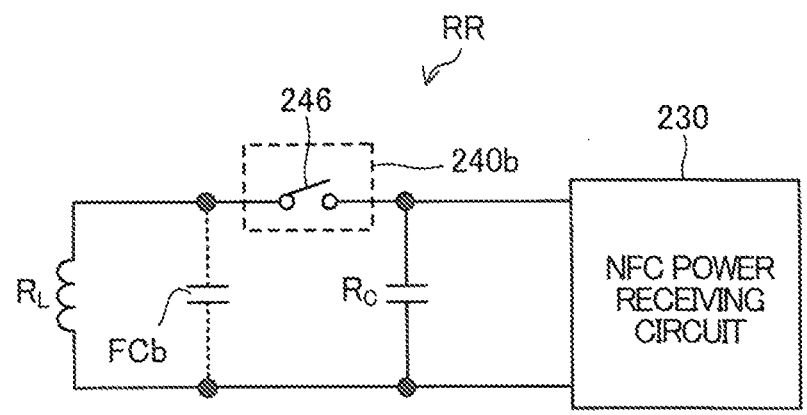
FIG. 23 is a diagram for explaining a second example of the resonance frequency changing circuit according to the second embodiment of the present invention.

As the changing circuit 240, a changing circuit 240a constituted of a switch 245 of FIG. 22 or a changing circuit 240b constituted of a switch 246 of FIG. 23 may be used. Each of the switching elements 245 and 246 is, for example, a semiconductor switching element such as a field-effect transistor. The resonance circuit RR includes a parallel circuit of the power reception side coil $R_L$ and the power reception side capacitor $R_C$, which oscillates at the reference frequency, and each of the switches 245 and 246 is disposed in series in the parallel circuit.

In other words, in the structure of FIG. 22, the coil $R_L$, the capacitor $R_C$, and the switch 245 are connected in series to each other, which form a closed circuit only when the switch 245 is on. In other words, when the switch 245 is on, the parallel circuit of the coil $R_L$ and the capacitor $R_C$ is formed so that the resonance frequency $f_O$ is identical to the reference frequency. However, when the switch 245 is off, the parallel circuit of the coil $R_L$ and the capacitor $R_C$ is not formed, and the resonance circuit RR is formed of the coil $R_L$ and a parasitic capacitance FCa. Thus, the resonance frequency $f_O$ when the switch 245 is off is determined by an inductance value of the coil $R_L$ and a capacitance value of the parasitic capacitance FCa. In FIG. 22, the parasitic capacitance FCa is a parasitic capacitance due to wiring connected directly to the coil $R_L$, and a capacitance value thereof is much smaller than a capacitance value of the capacitor $R_C$. Consequently, the resonance frequency $f_O$ when the switch 245 is off (namely the frequency $f_M$) is much higher than the reference frequency. The control circuit 250 can switch the resonance frequency $f_O$ between the reference frequency and the frequency $f_M$ by controlling on and off of the switch 245.

Similarly, in the structure of FIG. 23, the coil $R_L$, the capacitor $R_C$ and the switch 246 are connected in series to each other, which form a closed circuit only when the switch 246 is on. In other words, when the switch 246 is on, the parallel circuit of the coil $R_L$ and the capacitor $R_C$ is formed so that the resonance frequency $f_O$ is identical to the reference frequency. However, when the switch 246 is off, the parallel circuit of the coil $R_L$ and the capacitor $R_C$ is not formed so that the resonance circuit RR is formed of the coil $R_L$ and a parasitic capacitance FCb. Thus, the resonance frequency $f_O$ when the switch 246 is off is determined by the inductance value of the coil $R_L$ and the capacitance value of the parasitic capacitance FCb. In FIG. 23, the parasitic capacitance FCb is a parasitic capacitance due to wiring connected directly to the coil $R_L$, and a capacitance value thereof is much smaller than a capacitance value of the capacitor $R_C$. Consequently, the resonance frequency $f_O$ when the switch 246 is off (namely frequency $f_M$) is much higher than the reference frequency. The control circuit 250 can switch the resonance frequency $f_O$ between the reference frequency and the frequency $f_M$ by controlling on and off of the switch 246.

In the power supply connection state, the switch 246 of FIG. 23 is disposed on a pair of wirings connecting the coil $R_L$ and the power receiving circuit 230 (namely, a pair of wirings for received power is sent to the power receiving circuit 230). On the other hand, the switch 245 of FIG. 22 is disposed not on the pair of wirings but on a branch wiring disposed between the pair of wirings. The capacitor $R_C$ and the switch 245 are disposed in series on the branch wiring in the structure of FIG. 22, but only the capacitor $R_C$ is disposed on the branch wiring in the structure of FIG. 23. A large current flows in the pair of wirings to send the received power to the power receiving circuit 230. Considering this, the switch 246 should have relatively high rating. Therefore, it is preferred to adopt the structure of FIG. 22 rather than the structure of FIG. 23. The switch 245 or 246 may be disposed outside the IC 200.

Third Embodiment

A third embodiment of the present invention is described. Each of the resonance circuits TT and RR in the first or the second embodiment may be changed to a series resonance circuit. The series resonance circuit as the resonance circuit TT is denoted by TT', and the series resonance circuit as the resonance circuit RR is denoted by RR'. FIGS. 24A and 24B show circuit diagrams of the resonance circuits TT' and RR'. When the description of the first or the second embodiment is applied to the third embodiment, symbols TT and RR in the description of the first or the second embodiment are read as symbols TT' and RR', respectively.

The resonance circuit TT' is constituted of a series circuit of the capacitor $T_C$ and the coil $T_L$ disposed in series between the terminals 101 and 102, and the resonance circuit RR' is constituted of a series circuit of the capacitor $R_C$ and the coil $R_L$ disposed in series between the terminals 201 and 202. The resonance frequency of the capacitor $T_C$ and the coil $T_L$ in the resonance circuit TT' as well as the resonance frequency of the capacitor $R_C$ and the coil $R_L$ in the resonance circuit RR' is also identical to the reference frequency. Also when the load detection circuit 140 is connected to the resonance circuit TT', the current flowing in the coil $T_L$ should be supplied to the sense resistor 141 as shown in FIG. 25. When the parallel resonance circuit is changed to the series resonance circuit, the structures of the circuits described above should be appropriately changed, as a matter of course.

Figure 26:
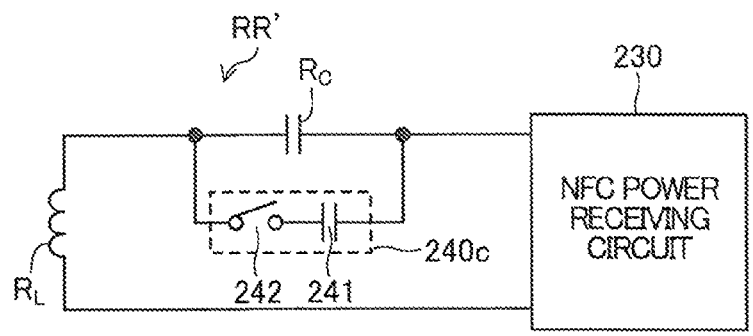
FIG. 26 is a diagram for explaining a first example of the resonance frequency changing circuit according to the third embodiment of the present invention.
Figure 27:
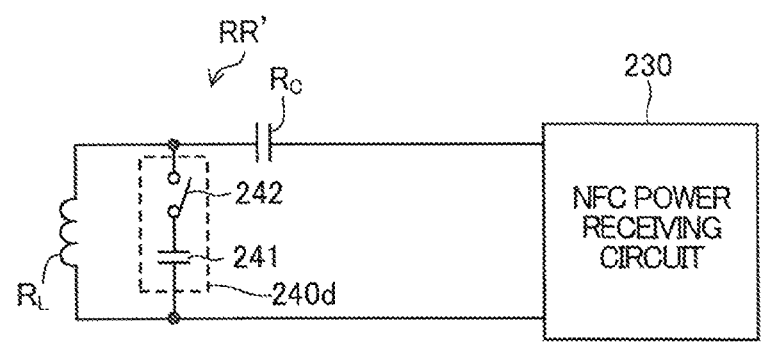
FIG. 27 is a diagram for explaining a second example of the resonance frequency changing circuit according to the third embodiment of the present invention.

In other words, for example, when using the resonance circuit RR', it is possible to use a changing circuit 240c of FIG. 26 or a changing circuit 240d of FIG. 27 as the changing circuit 240. Each of the changing circuit 240c and 240d is constituted of a series circuit of the capacitor 241 and the switch 242 similarly to the changing circuit 240 of FIG. 10.

However, in the structure of FIG. 26 using the resonance circuit RR' and the changing circuit 240c, the series circuit of the capacitor 241 and the switch 242 is connected in parallel to the capacitor $R_C$. In the structure of FIG. 27 using the resonance circuit RR' and the changing circuit 240d, the series circuit of the capacitor 241 and the switch 242 is connected in parallel to the coil $R_L$. Thus, in the structure of FIG. 26 or FIG. 27, when the switch 242 is off, the power reception side capacitance that determines the resonance frequency $f_O$ of the resonance circuit RR' becomes the capacitor $R_C$ itself, and hence the resonance frequency $f_O$ is identical to the reference frequency. However, when the switch 242 is on, the power reception side capacitance is constituted of the capacitors $R_C$ and 241, and hence the resonance frequency $f_O$ is changed from the reference frequency to the frequency $f_M$. The control circuit 250 can switch the resonance frequency $f_O$ between the reference frequency and the frequency $f_M$ by controlling on and off of the switch 242. It is possible to dispose at least one of the capacitor 241 and the switch 242 outside the IC 200.

Some circuit examples of applying the resonance frequency changing circuit (240, 240c or 240d) including the capacitor 241 to the series resonance circuit RR or the parallel resonance circuit RR' are described above, but other variations are possible. In any case, in order to change the resonance frequency of the power reception side resonance circuit (RR, RR') including the power reception side coil and the power reception side capacitance from the reference frequency, the resonance frequency changing circuit should change the power reception side capacitance using the other capacitor (241) with reference to the state where the power reception side capacitance is identical to the power reception side capacitor ($R_C$).

Figure 28:
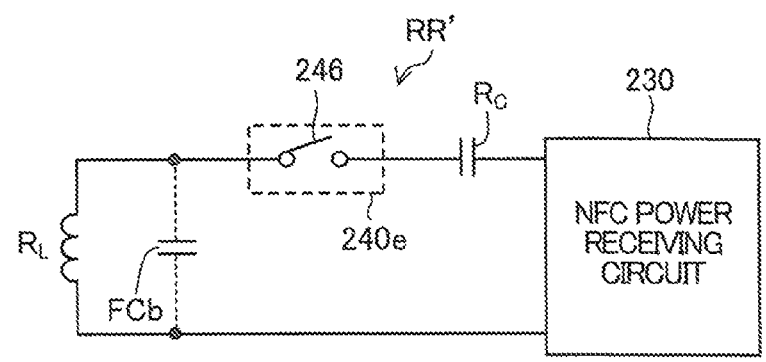
FIG. 28 is a diagram for explaining a third example of the resonance frequency changing circuit according to the third embodiment of the present invention.

Alternatively, for example, when using the resonance circuit RR', it is possible to use a changing circuit 240e constituted of the switch 246 as the changing circuit 240 as shown in FIG. 28. The changing circuit 240e is constituted of the switch 246 similarly to the changing circuit 240b of FIG. 23. However, in the structure of FIG. 28 using the resonance circuit RR' and the changing circuit 240e, the switch 246 is inserted in series between the coil $R_L$ and the capacitor $R_C$. Thus, in the structure of FIG. 28, when the switch 246 is on, the series circuit of the coil $R_L$ and the capacitor $R_C$ is formed, and the resonance frequency $f_O$ is identical to the reference frequency. However, when the switch 246 is off, the series circuit of the coil $R_L$ and the capacitor $R_C$ is not formed, and the resonance circuit RR' is formed of the coil $R_L$ and the parasitic capacitance FCb. As a result, resonance frequency $f_O$ of the resonance circuit RR' is changed from the reference frequency to the frequency $f_M$. The control circuit 250 can switch the resonance frequency $f_O$ between the reference frequency and the frequency $f_M$ by controlling on and off of the switch 246. It is possible to dispose the switch 246 of FIG. 28 outside the IC 200.

Figure 29:
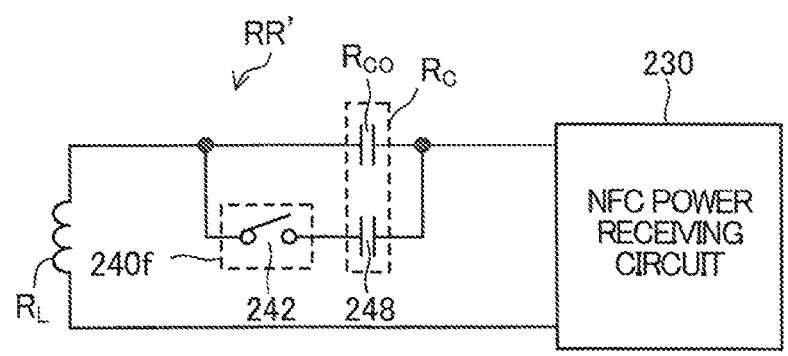
FIG. 29 is a diagram for explaining a fourth example of the resonance frequency changing circuit according to the third embodiment of the present invention.

Further, alternatively, for example, it is possible to use the resonance circuit RR' and a changing circuit 240f as the changing circuit 240 shown in FIG. 29. The changing circuit 240f is constituted of the switch 242, and the capacitor $R_C$ is constituted of a capacitor $R_{CO}$ and a capacitor 248 in the resonance circuit RR of FIG. 29. When the switch 242 is on, the capacitor $R_{CO}$, the capacitor 248, and the switch 242 form a closed circuit, a combined capacitance ($R_C$) of the parallel circuit of the capacitors $R_{CO}$ and 248 is connected in series to the coil $R_L$, and a resonance frequency ($f_O$) of the series resonance circuit of the combined capacitance ($R_C$) and the coil $R_L$ is identical to the reference frequency. On the other hand, when the switch 242 is off, the capacitor 248 is disconnected from the coil $R_L$, the resonance frequency of the series resonance circuit of the capacitor $R_{CO}$ and the coil $R_L$ becomes the resonance frequency $f_O$ of the resonance circuit RR', and the resonance frequency $f_O$ becomes the frequency $f_M$ higher than the reference frequency. The control circuit 250 can switch the resonance frequency $f_O$ between the reference frequency and the frequency $f_M$ by controlling on and off of the switch 242 of FIG. 29 (the resonance frequency $f_O$ is changed to the frequency $f_M$ by turning off the switch 242 unlike FIG. 26 or the like). It is possible to dispose the switch 242 of FIG. 29 outside the IC 200.

Summarizing the above discussion, the following techniques are included in the present invention. In the present invention, the power reception side resonance circuit includes the parallel circuit or the series circuit of the power reception side coil ($R_L$) and the power reception side capacitance. When the NFC communication and power transfer are performed, the power reception side capacitance is made identical to a predetermined reference capacitance. When the power reception side capacitance is identical to the reference capacitance, the resonance frequency $f_O$ of the power reception side resonance circuit, namely the resonance frequency $f_O$ of the parallel circuit or the series circuit of the power reception side coil ($R_L$) and the power reception side capacitance is identical to the reference frequency. The resonance frequency changing circuit increases or decreases the power reception side capacitance from the reference capacitance at necessary timing. Thus, in the power reception side resonance circuit, the parallel circuit or the series circuit is constituted of the power reception side coil ($R_L$) and the power reception side capacitance that is larger than or smaller than the reference capacitance. As a result, the resonance frequency $f_O$ of the power reception side resonance circuit is changed from the reference frequency.

<<First Consideration of the Present Invention>>

The present invention embodied by the first to the third embodiments is considered.

The power reception apparatus (200) according to one aspect of the present invention includes the power receiving circuit (230) that is connected to the power reception side resonance circuit (RR) including the power reception side coil and the power reception side capacitance and generates the output power utilizing magnetic resonance based on the power received by the power reception side coil, and the changing circuit (240) that changes the resonance frequency of the power reception side resonance circuit from the reference frequency that is the resonance frequency when receiving the power, before receiving the power.

The power reception apparatus can receive power transmitted from the power transmission side coil corresponding to the power reception side coil, utilizing magnetic resonance. On the other hand, a foreign object different from the power reception apparatus may exist. Here, the foreign object means equipment that includes the resonance circuit having the reference frequency as the resonance frequency but does not have ability to receive power. In the state where the foreign object exists in a place responding to the magnetic field generated by the power transmission side coil, the foreign object may be broken down when the magnetic field for transmitting power is generated by the power transmission side coil. In order to avoid this, it is necessary to detect presence or absence of the foreign object.

For this detection, the changing circuit described above is disposed in the power reception apparatus. Then, the following action is obtained. Specifically, in the first case where only the power reception apparatus exists, when the resonance frequency of the power reception side resonance circuit is changed from the reference frequency, the power reception side resonance circuit does not resonate to the magnetic field generated by the power transmission side coil, and a magnitude of the load of the power transmission side coil becomes relatively small. On the other hand, in the second case where the power reception apparatus and the foreign object exist, when the resonance frequency of the power reception side resonance circuit is changed, the magnitude of the load of the power transmission side coil is partially decreased. However, because the resonance circuit of the foreign object resonates to the magnetic field generated by the power transmission side coil, the magnitude of the load of the power transmission side coil becomes larger than that in the first case.

Consequently, by evaluating the magnitude of the load, it is possible to discriminate between the first case and the second case, and it is possible to control not to perform the power transmission in the second case. In other words, according to the power reception apparatus having the above-mentioned structure, it is possible to determine presence or absence of the foreign object and to determine whether or not to perform the power transmission in the non-contact power supply system including the power reception apparatus and the power transmission apparatus, so that a breakdown of the foreign object can be avoided.

The transmission apparatus (100) according to one aspect of the present invention includes the power transmission circuit (130) that is connected to the power transmission side resonance circuit including a power transmission side coil and a power transmission side capacitance (TT), and supplies the power transmission side resonance circuit with an AC signal so that the power transmission side coil generates the alternating magnetic field having the reference frequency, so as to transmit power from the power transmission side coil by the magnetic resonance method, the detection circuit (140) configured to output a value corresponding to amplitude of current flowing in the power transmission side coil, and the control circuit (160) configured to control the power transmission circuit. The control circuit (160) includes the first processing portion that control to transmit the specific signal to be a trigger to change the resonance frequency of the power reception side resonance circuit including the power reception side coil capable of receiving power from the power transmission side coil and the power reception side capacitance from the reference frequency that is the resonance frequency when receiving the power from power transmission side coil to the power reception side coil, the second processing portion that controls the power transmission circuit so that the power transmission side coil generates the predetermined test magnetic field after the specific signal is transmitted, and the third processing portion that determines whether or not the power transmission can be performed by comparing the output value of the detection circuit when the test magnetic field is generated with the predetermined reference value.

The power reception apparatus that is connected to the power reception side resonance circuit or includes the power reception side resonance circuit can receive power transmitted from the power transmission side coil, utilizing magnetic resonance. On the other hand, a foreign object different from the power reception apparatus may exist. Here, the foreign object means equipment that includes the resonance circuit having the reference frequency as the resonance frequency but does not have ability to receive power. In the state where the foreign object exists in a place responding to the magnetic field generated by the power transmission side coil, the foreign object may be broken down when the magnetic field for transmitting power is generated by the power transmission side coil. In order to avoid this, it is necessary to detect presence or absence of the foreign object.

For this detection, first the first processing portion is utilized. The power reception apparatus corresponding to the power transmission apparatus can change the resonance frequency from the reference frequency in accordance with specific signal by the first processing portion. In contrast, the foreign object that does not corresponds to the power transmission apparatus does not respond to the specific signal and does not change or cannot change the resonance frequency from the reference frequency. The action by the change is considered in each of the first and the second cases.

In the first case where only the power reception apparatus exists, when the resonance frequency of the power reception side resonance circuit is changed from the reference frequency, the power reception side resonance circuit becomes not to resonate to the magnetic field generated by the power transmission side coil so that the magnitude of the load of the power transmission side coil becomes relatively small. On the other hand, in the second case where the power reception apparatus and the foreign object exist, when the resonance frequency of the power reception side resonance circuit is changed, the magnitude of the load of the power transmission side coil is partially decreased. However, because the foreign object resonates to the magnetic field generated by the power transmission side coil, the magnitude of the load of the power transmission side coil becomes larger than that in the first case.

Here, because amplitude of current flowing in the power transmission side coil depends on the magnitude of the load of the power transmission side coil, it is possible to discriminate the magnitude of the load, namely the first or the second case by evaluating the amplitude. Considering this, the second and the third processing portions are disposed in the power transmission apparatus. Thus, it is possible to control whether or not perform the power transmission by determining presence or absence of the foreign object, and hence a breakdown of the foreign object can be avoided.

Note that in the embodiments described above, transmission of the change signal 530 using the communication circuit 120 corresponds to transmission of the specific signal. Because the change signal 530 is transmitted under control of the control circuit 160, the control circuit 160 is considered to include the first processing portion. However, the communication circuit 120 transmits the change signal 530. In addition, in the example of FIG. 20, the process of Steps S131 to S133 corresponds to the process of the second processing portion, and the process of Steps S134 to S138 corresponds to the process of the third processing portion.

In addition, the power reception apparatus according to the present invention can be considered to be an apparatus connected to the power reception side resonance circuit or an apparatus including the power reception side resonance circuit as an element thereof. The power transmission apparatus according to the present invention can be considered to be an apparatus connected to the power transmission side resonance circuit or an apparatus including the power transmission side resonance circuit as an element thereof.

Fourth Embodiment

A fourth embodiment of the present invention is described. The fourth embodiment and the fifth to the eleventh embodiments described later are embodiments based on the first to the third embodiments. The descriptions in the first to the third embodiments are applied to the fourth to the eleventh embodiments concerning items that are not specifically described in the fourth to the eleventh embodiments, as long as no contradiction occurs. In addition, among techniques described in the first to the eleventh embodiments, techniques described in any two or more embodiments can be combined and embodied. Further, as described above, also in the following description, it is supposed that the electronic equipment 2 exists on the power supply table 12 in the basic position state (FIG. 1B), unless otherwise specified.

Figure 30:
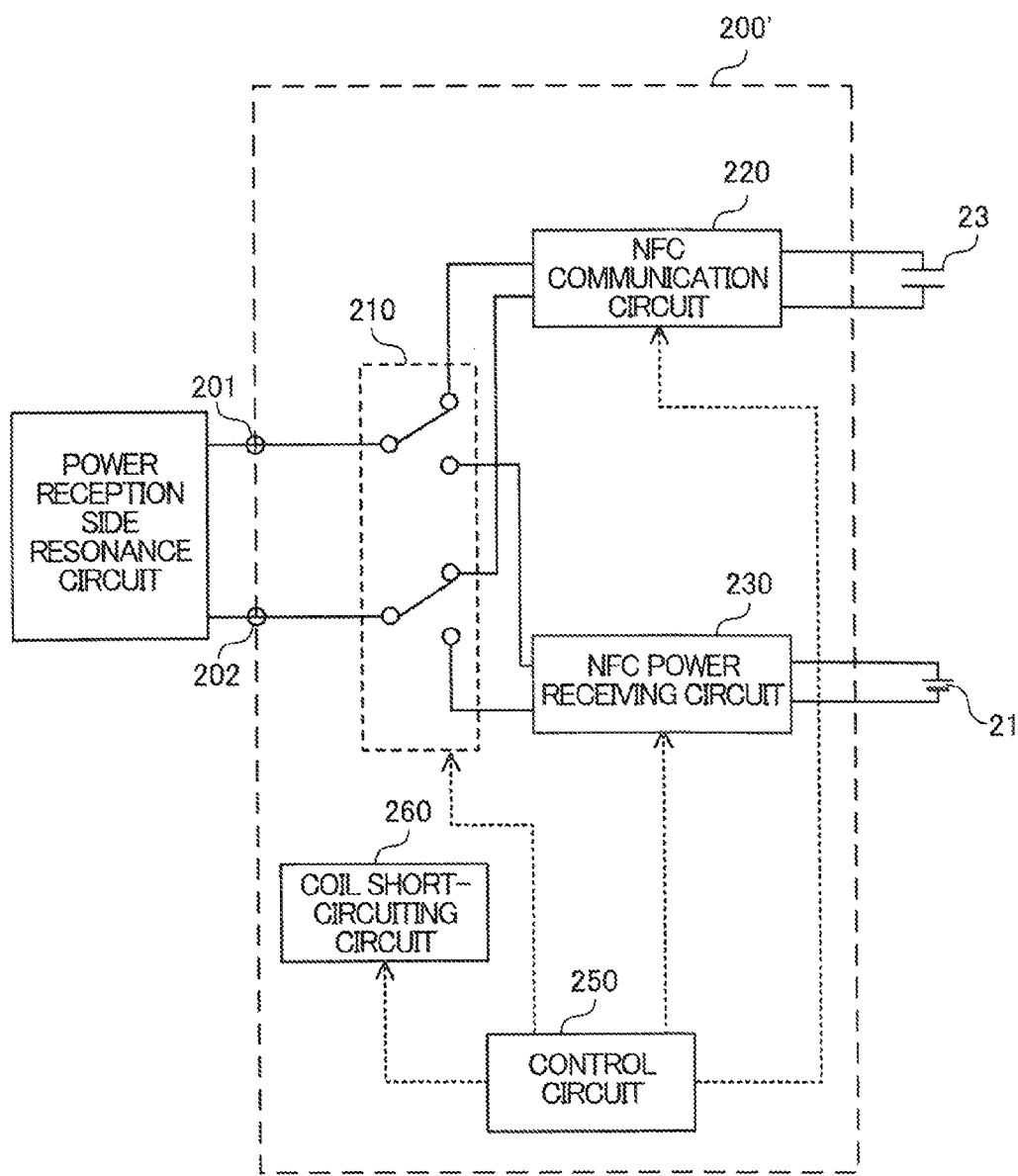
FIG. 30 is a partial structure diagram of the electronic equipment including an inside block diagram of an IC in the electronic equipment according to a fourth embodiment of the present invention.

With reference to FIG. 30, a power reception side IC 200' of FIG. 30 can be used as the power reception side IC 200 disposed in the electronic equipment 2. FIG. 30 is a structure diagram of a part of the electronic equipment 2 including the inside block diagram of the power reception side IC 200'. The IC 200' is formed by replacing the resonance frequency changing circuit 240 with a coil short-circuiting circuit 260 on the basis of the IC 200 of FIG. 5, and the IC 200' may be the same as the IC 200 in the first to the third embodiments except for the replacement.

The parallel resonance circuit RR (see FIG. 2) may be connected to the IC 200', and the series resonance circuit RR' (see FIG. 24B) may be connected to the IC 200'. In other words, the power reception side resonance circuit of the electronic equipment 2 may be the parallel resonance circuit RR or the series resonance circuit RR'. The coil short-circuiting circuit 260 is a circuit that can short-circuit the power reception side coil $R_L$ in the power reception side resonance circuit (RR or RR').

Figure 31:
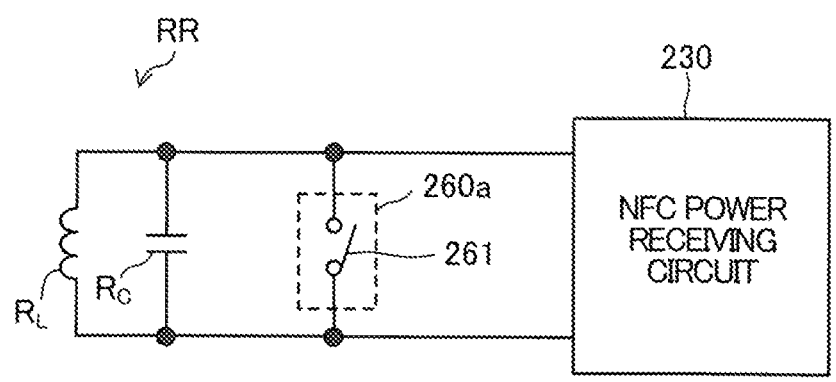
FIG. 31 is a diagram showing an example of a coil short-circuiting circuit according to the fourth embodiment of the present invention.

A short-circuiting circuit 260a shown in FIG. 31 is an example of the coil short-circuiting circuit 260 applied to the parallel resonance circuit RR. The short-circuiting circuit 260a is constituted of a switch 261 connected (inserted) between a node commonly connected to one end of the capacitor $R_C$ and one end of the coil $R_L$ of the resonance circuit RR and a node commonly connected to the other ends of the capacitor $R_C$ and the coil $R_L$ of the resonance circuit RR. The switch 261 is constituted of a semiconductor switching element such as a field-effect transistor and is turned on and off under control of the control circuit 250. When the switch 261 is turned on, the coil $R_L$ of the resonance circuit RR is short-circuited (more specifically, both ends of the coil $R_L$ are short-circuited).

Figure 32:
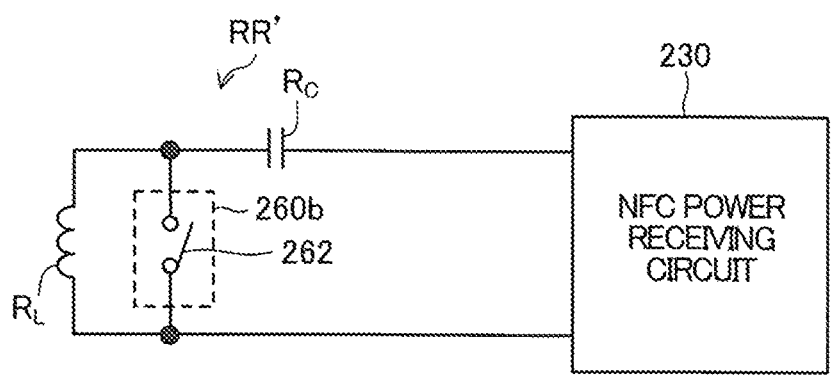
FIG. 32 is a diagram showing another example of the coil short-circuiting circuit according to the fourth embodiment of the present invention.

A short-circuiting circuit 260b shown in FIG. 32 is an example of the coil short-circuiting circuit 260 applied to the series resonance circuit RR'. The short-circuiting circuit 260b is constituted of the switch 262 connected between both ends of the coil $R_L$. The switch 262 is constituted of a semiconductor switching element such as a field-effect transistor and is turned on and off under control of the control circuit 250. When the switch 262 is turned on, the coil $R_L$ of the resonance circuit RR' is short-circuited (more specifically, both ends of the coil $R_L$ are short-circuited).

The operation of changing the resonance frequency $f_O$ of the power reception side resonance circuit (RR or RR') described above in the first to the third embodiments from the reference frequency to the predetermined frequency $f_M$ is referred to as a resonance frequency changing operation for convenience of description below. On the other hand, the operation of short-circuiting the power reception side coil $R_L$ by the coil short-circuiting circuit 260 is referred to as a coil short-circuiting operation for convenience of description below. At the timing when the resonance frequency changing operation is performed in the first to the third embodiment, the coil short-circuiting operation is performed in the fourth embodiment instead of the resonance frequency changing operation. In other words, during the period while the resonance frequency $f_O$ of the power reception side resonance circuit (RR or RR') is changed to the frequency $f_M$ in the first to the third embodiments, the power reception side coil $R_L$ is short-circuited in the fourth embodiment.

In the state where the power reception side coil $R_L$ is short-circuited, the power reception side resonance circuit does not exist (equivalent to the state where the power reception side resonance circuit does not exist). Thus, similarly to the case where the resonance frequency changing operation is performed, during the period while the coil short-circuiting operation is performed, the load on the power transmission side coil $T_L$ becomes sufficiently light (namely, as if the electronic equipment 2 does not exist on the power supply table 12), and in the first case described above (see FIG. 14A), the above-mentioned decision inequality "$V_D(i) \geq V_{REF}(i)$" is satisfied in the foreign object detection process (see FIG. 20). In addition, in the second case described above (see FIG. 14B), during the period while the coil short-circuiting operation is performed, the foreign object 3 maintains to be the load on the power transmission side coil $T_L$. Therefore, the voltage value $V_D(i)$ becomes small, and the decision inequality "$V_D(i) \geq V_{REF}(i)$" is not satisfied in the foreign object detection process. Consequently, it is possible to perform the foreign object detection process similar to that described above in the first to the third embodiments. The operation of the power supply equipment 1 based on a result of the foreign object detection process is similar to that described above in the first to the third embodiments.

Figure 33:
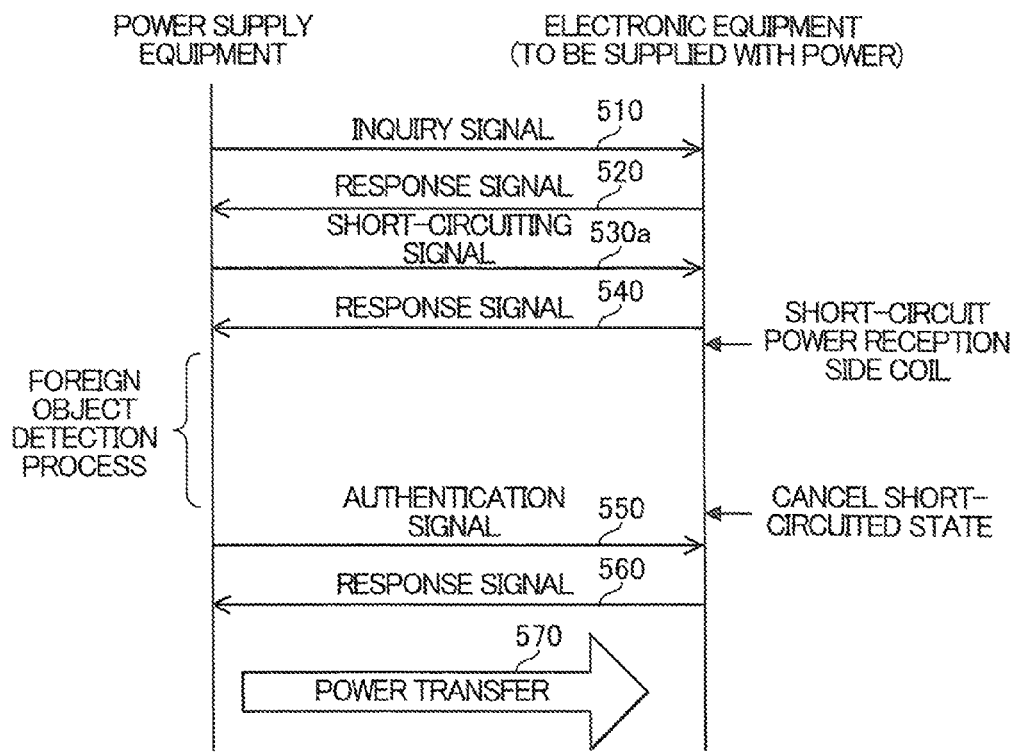
FIG. 33 is a diagram for explaining exchange of signals between the power supply equipment and the electronic equipment according to the fourth embodiment of the present invention.

With reference to FIG. 33, there is described the exchange of signals between the equipments 1 and 2 until the power transfer is performed. The flow of transmission and reception of the inquiry signal 510 and the response signal 520 is as described above in the first embodiment (see FIG. 16). As described above, the equipment to be supplied with power includes the electronic equipment 2, and can include the foreign object 3. The power supply equipment 1 (IC 100) after receiving the response signal 520 from the equipment to be supplied with power analyzes the response signal 520. If the equipment to be supplied with power can perform the NFC communication and can receive power or requests power transmission, the power supply equipment 1 (IC 100) transmits the short-circuiting signal 530a to the equipment to be supplied with power by NFC communication. The electronic equipment 2 (IC 200') as the equipment to be supplied with power after receiving the short-circuiting signal 530a transmits the response signal 540 to the short-circuiting signal 530a to the power supply equipment 1 by NFC communication and then quickly short-circuits the power reception side coil $R_L$. The short-circuiting signal 530a is, for example, a signal to request, instruct, or suggest for short-circuiting the power reception side coil $R_L$. The control circuit 250 of the electronic equipment 2 short-circuits the power reception side coil $R_L$ by the trigger of receiving the short-circuiting signal 530a. The short-circuiting signal 530a may be any signal and may be included in the inquiry signal 510 as long as it becomes the trigger for short-circuiting the power reception side coil $R_L$.

The power supply equipment 1 (IC 100) after receiving the response signal 540 changes the connection destination of the resonance circuit TT from the communication circuit 120 to the power transmission circuit 130, and then performs the foreign object detection process. During the execution period of the foreign object detection process, the electronic equipment 2 (IC 200') maintains the short-circuited state of the power reception side coil $R_L$. Specifically, the electronic equipment 2 (IC 200') uses an internal timer so as to maintain the power reception side coil $R_L$ in the short-circuited state for a period of time corresponding to the length of the execution period of the foreign object detection process, and afterwards cancels the short-circuited state of the power reception side coil $R_L$ (namely, restores the state where the power reception side coil $R_L$ is not short-circuited).

When determining that there is no foreign object on the power supply table 12 in the foreign object detection process, the power supply equipment 1 (IC 100) switches the connection destination of the resonance circuit TT from the power transmission circuit 130 to the communication circuit 120 and transmits the authentication signal 550 to the equipment to be supplied with power by NFC communication. The authentication signal 550 includes, for example, a signal informing the equipment to be supplied with power about that the power transmission will be performed. The electronic equipment 2 (IC 200') after receiving the authentication signal 550 transmits the response signal 560 corresponding to the authentication signal 550 to the power supply equipment 1 by NFC communication. The response signal 560 includes, for example, a signal informing that content indicated by the authentication signal 550 is recognized or a signal approving the content indicated by the authentication signal 550. The power supply equipment 1 (IC 100) after receiving the response signal 560 switches the connection destination of the resonance circuit TT again from the communication circuit 120 to the power transmission circuit 130 so as to perform the power transmission operation, and hence the power transfer 570 is realized.

The power transfer 570 is performed by the flow described above in the first case of FIG. 14A. However, in the second case of FIG. 14B, the process proceeds to the transmission and reception of the response signal 540, but the above-mentioned decision inequality is not satisfied in the foreign object detection process, and it is determined that there is a foreign object on the power supply table 12. Therefore, the power transfer 570 is not performed.

Figure 34:
FIG. 34 is an explanatory diagram of signals according to the fourth embodiment of the present invention.

Note that the foreign object detection process can be correctly performed either by the resonance frequency changing operation or by the coil short-circuiting operation. Therefore, the power supply equipment 1 (IC 100) after receiving the response signal 520 may transmit a specific request signal 530b having functions of both the change signal 530 and the short-circuiting signal 530a (see FIG. 34) to the equipment to be supplied with power. When the equipment to be supplied with power that can perform the resonance frequency changing operation receives the specific request signal 530b, the equipment to be supplied with power performs the resonance frequency changing operation. When the equipment to be supplied with power that can perform the coil short-circuiting operation receives the specific request signal 530b, the equipment to be supplied with power performs the coil short-circuiting operation.

Figure 35:
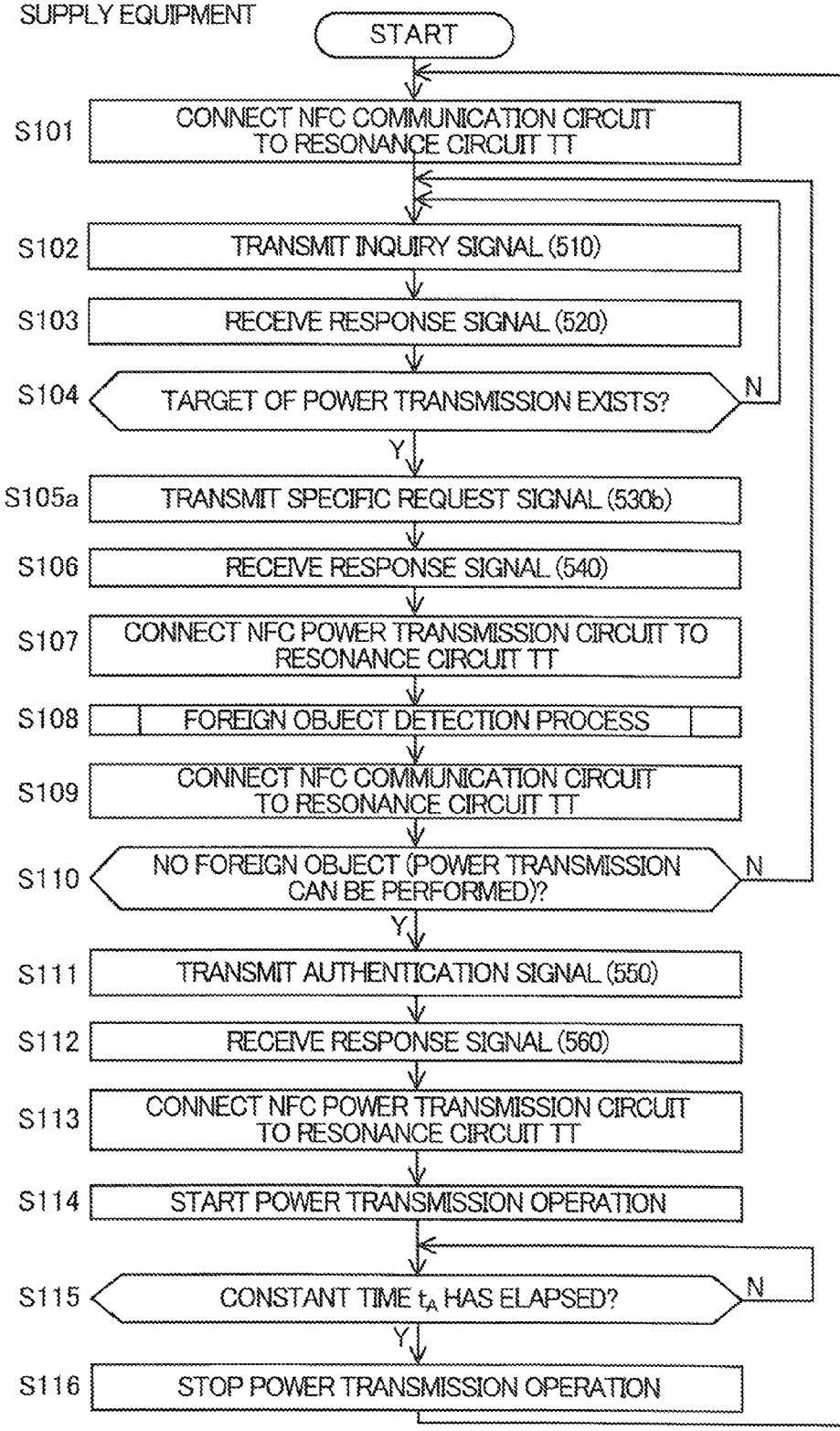
FIG. 35 is an operation flowchart of the power supply equipment according to the fourth embodiment of the present invention.

FIG. 35 is an operation flowchart of the power supply equipment 1 that is performed after the initial setting process (see FIG. 12). On the basis of the operation flowchart of the power supply equipment 1 described above in the first embodiment (FIG. 18), Step S105 is replaced with Step S105a in the fourth embodiment. Except for the replacement, the operation flowchart of the power supply equipment 1 is the same between the first and the fourth embodiments. Description of the same part is omitted. In Step S105a of FIG. 35, the control circuit 160 of the power supply equipment 1 transmits the specific request signal 530b to the equipment to be supplied with power by NFC communication using the communication circuit 120. After that, in Step S106, the control circuit 160 waits for reception of the response signal 540.

Figure 36:
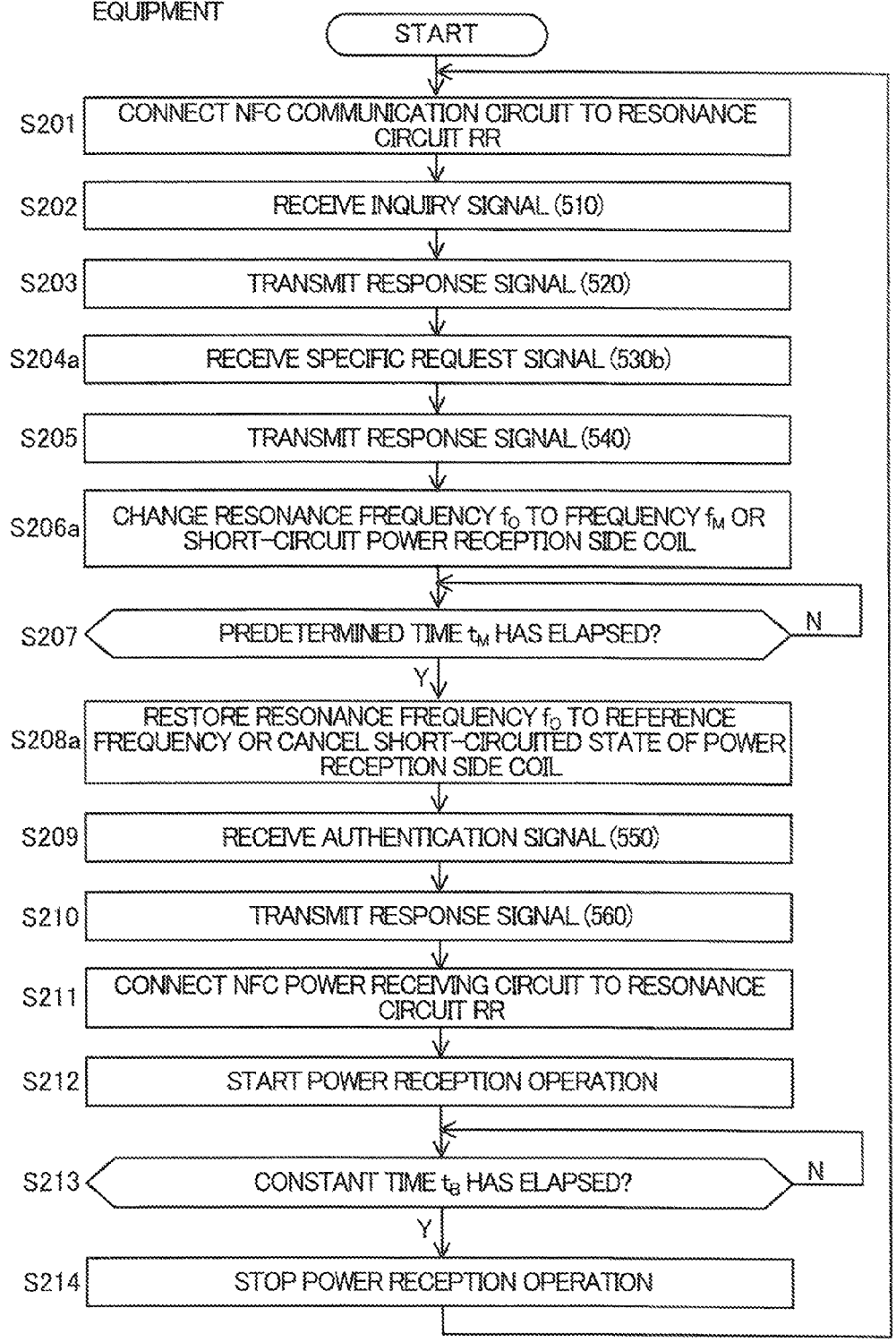
FIG. 36 is an operation flowchart of the electronic equipment that works together with the operation of FIG. 35.

FIG. 36 is an operation flowchart of the electronic equipment 2. On the basis of the operation flowchart of the electronic equipment 2 described above in the first embodiment (FIG. 19), Steps S204, S206 and S208 are respectively replaced with Steps S204a, S206a and S208a in the fourth embodiment. Except for the replacement, the operation flowchart of the electronic equipment 2 is the same between the first and the fourth embodiments. Description of the same part is omitted. The operation of FIG. 36 is described supposing that the electronic equipment 2 can perform the resonance frequency changing operation or the coil short-circuiting operation.

After transmitting the response signal 520 in Step S203, the electronic equipment 2 waits for reception of the specific request signal 530b in Step S204a. When the specific request signal 530b is received by the communication circuit 220 in Step S204a, the process proceeds to Step S205. In Step S205, the control circuit 250 transmits the response signal 540 to the power supply equipment 1 by NFC communication using the communication circuit 220, and in the next Step S206a, the control circuit 250 controls the changing circuit 240 to change the resonance frequency $f_O$ of the power reception side resonance circuit from the reference frequency to the frequency $f_M$ or controls the short-circuiting circuit 260 to short-circuit the power reception side coil $R_L$. The control circuit 250 measures lapse time from starting to change the resonance frequency $f_O$ or to short-circuit the power reception side coil $R_L$ (Step S207). When the lapse time reaches the predetermined time $t_M$, the control circuit 250 restores the resonance frequency $f_O$ to the reference frequency or cancels the short-circuited state of the power reception side coil $R_L$ in Step S208a. After that, the process proceeds to Step S209. During the period while the power supply equipment 1 generates the test magnetic field, the resonance frequency $f_O$ is maintained at the frequency $f_M$ or the short-circuited state of the power reception side coil $R_L$ is maintained. The time $t_M$ is set in advance so that the resonance frequency $f_O$ is quickly restored to the reference frequency or the short-circuited state of the power reception side coil $R_L$ is quickly canceled when the period is finished. The time $t_M$ may be specified in the specific request signal 530b. Operation after Step S209 is the same as the first embodiment.

The same action and effect as in the first to the third embodiments can be obtained in this embodiment in which the electronic equipment 2 is constituted so that the coil short-circuiting operation can be realized.

A specific circuit example of the short-circuiting circuit 260 suitable for the parallel resonance circuit RR is described with reference to FIG. 37. A rectifying circuit DD, a transistor SS, a resistor $R_{SS}$, a smoothing capacitor CC, and lines LN1 to LN4 as wiring can be disposed in the electronic equipment 2 or the IC 200'. The rectifying circuit DD is a full wave rectifying circuit constituted of diodes (rectifying elements) D1 to D4. The transistor SS is formed as an N-channel metal-oxide-semiconductor field-effect transistor (MOSFET).

Figure 37:
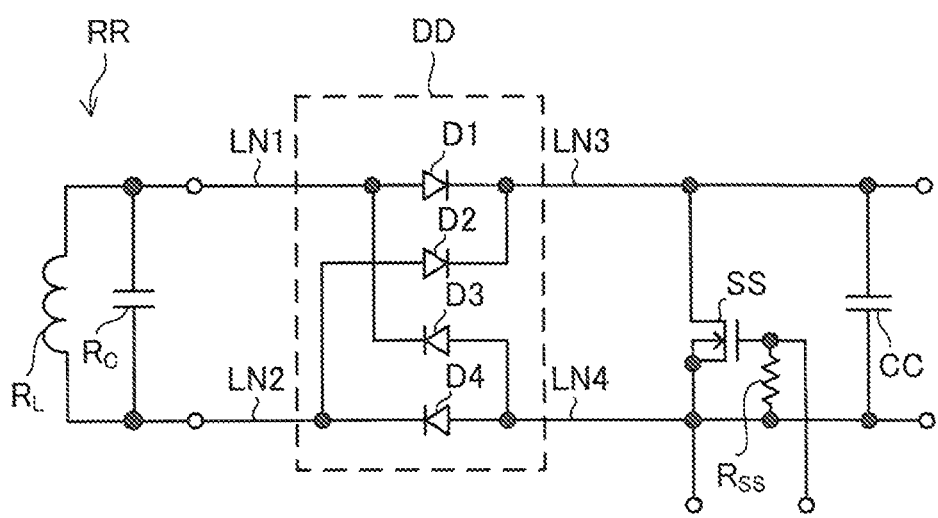
FIG. 37 is a diagram showing an example of a circuit that short-circuits the power reception side coil according to a fourth embodiment of the present invention.

In the circuit of FIG. 37, one end of the power reception side coil $R_L$ and one end of the power reception side capacitor $R_C$ are commonly connected to the line LN1. On the other hand, the other end of the power reception side coil $R_L$ and the other end of the power reception side capacitor $R_C$ are commonly connected to the line LN2. The line LN1 is commonly connected to the anode of the diode D1 and the cathode of the diode D3. The line LN2 is commonly connected to the anode of the diode D2 and the cathode of the diode D4. The cathodes of the diodes D1 and D2 are commonly connected to the line LN3, while the anodes of the diodes D3 and D4 are commonly connected to the line LN4. In the transistor SS, the drain is connected to the line LN3, the source is connected to the line LN4, and the gate is connected to the line LN4 via the resistor $R_{SS}$. The positive and negative electrodes of the smoothing capacitor CC are connected to the lines LN3 and LN4, respectively.

The control circuit 250 controls a gate voltage of the transistor SS so as to turn on and off the transistor SS. In the transistor constituted of a field-effect transistor such as a MOSFET, the gate voltage of the transistor means a voltage of the gate of the transistor with respect to a source potential of the transistor.

When the transistor SS is off, alternating current flows in the power reception side coil $R_L$ based on the alternating magnetic field generated by the power transmission side coil $T_L$, and power based on the alternating current is transmitted to between the lines LN3 and LN4 by rectification by the rectifying circuit DD. Thus, a positive voltage appears on the line LN3 with respect to the potential of the line LN4. In this case, as the smoothing capacitor CC is disposed between the lines LN3 and LN4 as shown in FIG. 37, charge is stored in the smoothing capacitor CC, and hence the positive DC voltage can be generated between the lines LN3 and LN4 with respect to the potential of the line LN3. This positive DC voltage can charge the battery 21 and drive the function circuit 22 (see FIGS. 30 and 2). The smoothing capacitor CC can be considered to be included in the NFC power receiving circuit 230 as an element or to be disposed outside the NFC power receiving circuit 230.

On the other hand, because the power reception side coil $R_L$ is short-circuited via the rectifying circuit DD (more specifically, via a combination of the diodes D1 and D4 or a combination of the diodes D2 and D3) when the transistor SS is on, no voltage is generated between the lines LN3 and LN4 (for simple description, it is supposed that the voltage between the drain and the source of the switch SS is zero). In the circuit of FIG. 37, turning on of the switch SS corresponds to the coil short-circuiting operation described above. When using the circuit of FIG. 37, the switch SS constitutes the coil short-circuiting circuit 260.

For instance, when constituting the circuit of FIG. 22, the switch 245 can function as a bidirectional switch by constituting the switch 245 of a series circuit of two MOSFETs. In this case, even if the switch 245 is turned off, a series capacitance of the parasitic capacitance of the MOSFET and the capacitor $R_C$ is connected in parallel to the parasitic capacitance FCa. As a result, the frequency $f_M$ may not be sufficiently away from the reference frequency. In contrast, using the circuit as shown in FIG. 37, occurrence of such the state can be suppressed.

Fifth Embodiment

Figure 38:
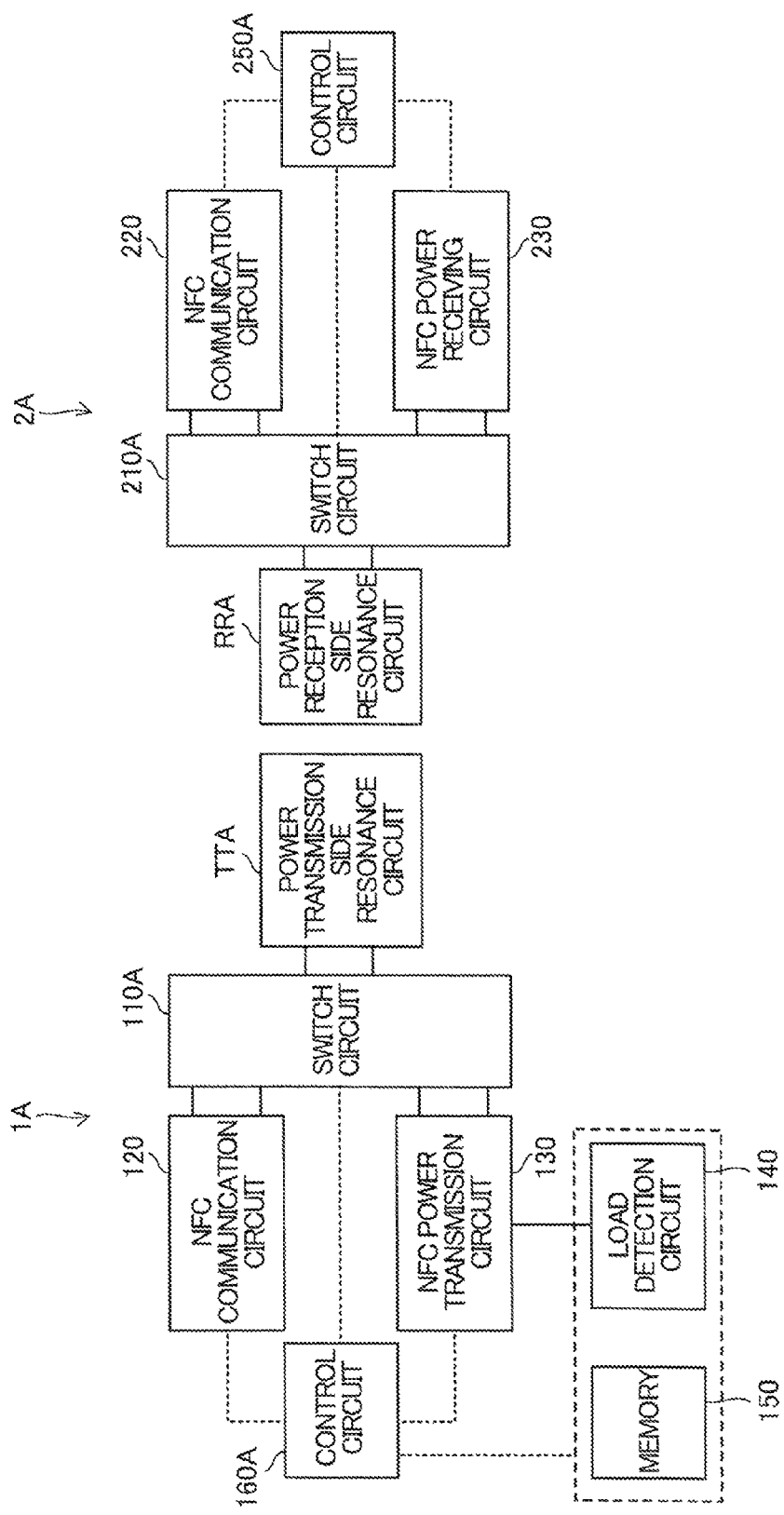
FIG. 38 is a schematic structure diagram of a non-contact power supply system according to a fifth embodiment of the present invention.

A fifth embodiment of the present invention is described. FIG. 38 is a schematic structure diagram of the non-contact power supply system according to the fifth embodiment. The non-contact power supply system of FIG. 38 includes power supply equipment 1A and electronic equipment 2A as the power supply equipment 1 and the electronic equipment 2, respectively.

The power supply equipment 1A includes a switch circuit 110A, the NFC communication circuit 120, the NFC power transmission circuit 130, the load detection circuit 140, the memory 150, a control circuit 160A, and a power transmission side resonance circuit TTA. A semiconductor integrated circuit, in which the blocks 110A, 120, 130, 140, 150 and 160A are integrated, can be disposed as the power transmission side IC 100 in the power supply equipment 1A. The electronic equipment 2A includes a switch circuit 210A, the NFC communication circuit 220, the NFC power receiving circuit 230, a control circuit 250A, and a power reception side resonance circuit RRA. A semiconductor integrated circuit, in which the blocks 210A, 220, 230 and 250A are integrated, can be disposed as the power reception side IC 200 or 200' in the electronic equipment 2A.

The NFC communication circuit 120, the NFC power transmission circuit 130, the load detection circuit 140, and the memory 150 in the power supply equipment 1A are the same as those of the power supply equipment 1 described above. The power transmission side resonance circuit TTA is the parallel power transmission side resonance circuit TT or the series power transmission side resonance circuit TT' (see FIGS. 2 and 24A). The power transmission side resonance circuit TTA is connected to the switch circuit 110A and is connected to the communication circuit 120 or the power transmission circuit 130 via the switch circuit 110A. The switch circuit 110A has the same function as the switch circuit 110 described above in the first embodiment (see FIG. 4) and may be the same as the switch circuit 110. The control circuit 160A includes the function of the control circuit 160 described above and may be the same as the control circuit 160. The control circuit 160A can control the circuits 110A, 120 and 130 similarly to the control circuit 160. It is possible that the control circuit 160A controls the switch circuit 110A so as to selectively connect the NFC communication circuit 120 or the NFC power transmission circuit 130 to the power transmission side resonance circuit TTA.

The NFC communication circuit 220 and the NFC power receiving circuit 230 in the electronic equipment 2A may be the same as those in the electronic equipment 2 described above. The switch circuit 210A may function as the switch circuit 210 (see FIG. 5) described above in the first embodiment, and a specific circuit example thereof will be described later. The power reception side resonance circuit RRA is the parallel power reception side resonance circuit RR or the series power reception side resonance circuit RR' (see FIGS. 2 and 24B). The power reception side resonance circuit RRA is connected to the switch circuit 210A and is connected to the communication circuit 220 or the power receiving circuit 230 via the switch circuit 210A. The control circuit 250A includes the function of the control circuit 250 described above and may be the same as the control circuit 250. The control circuit 250A can control the circuits 210A, 220, and 230 similarly to the control circuit 250. The control circuit 250A may selectively connect the NFC communication circuit 220 or the NFC power receiving circuit 230A to the power reception side resonance circuit RRA.

First Example of Switch Circuit 210A

Figure 39:
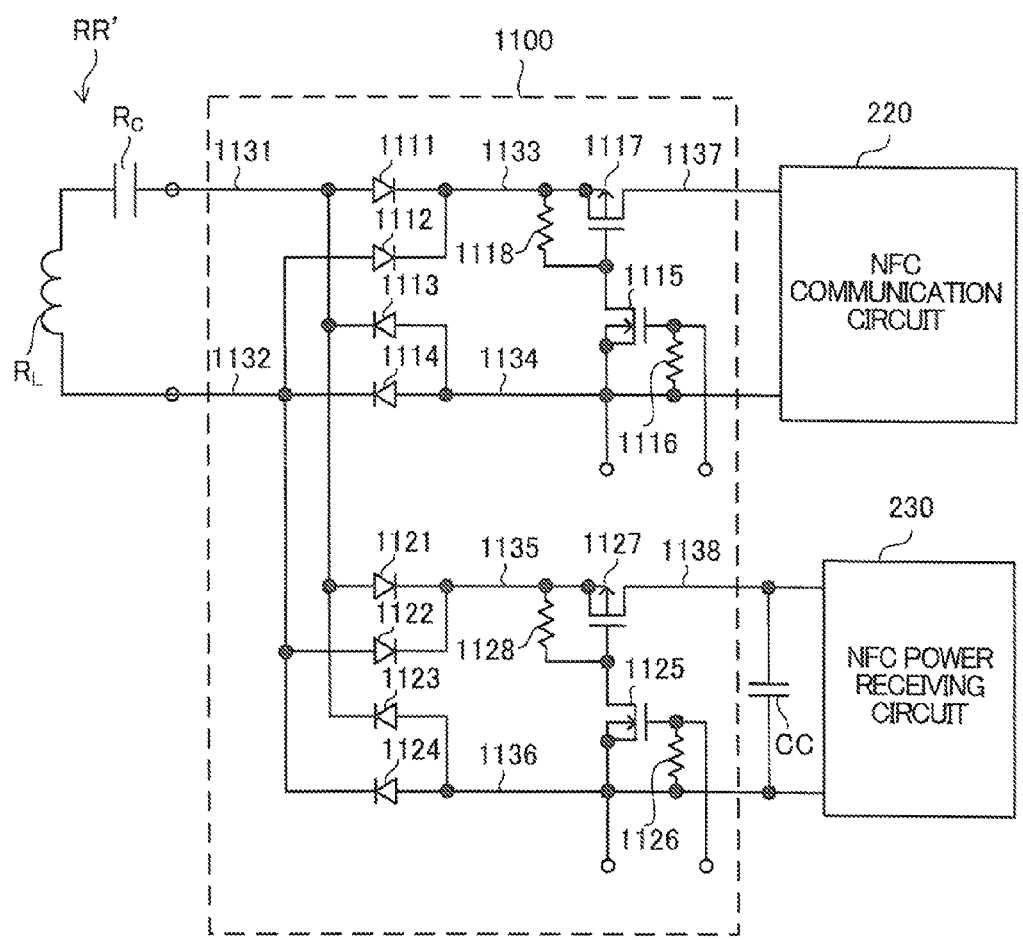
FIG. 39 is a diagram showing an example of a partial circuit in the electronic equipment according to the fifth embodiment of the present invention.

With reference to FIG. 39, a first example of the switch circuit 210A is described. A switch circuit 1100 shown in FIG. 39 can be used as a first example of the switch circuit 210A. In FIG. 39, the switch circuit 1100 is connected to the series resonance circuit RR'. The switch circuit 1100 is constituted to include components denoted by numerals 1111-1118 and 1121-1128 and lines 1131-1138. The transistors 1115 and 1125 are constituted as N-channel MOSFETs, while the transistors 1117 and 1127 are constituted as P-channel MOSFET.

In FIG. 39, an end of the power reception side coil $R_L$ is directly connected to the line 1132, while the other end of the power reception side coil $R_L$ is connected to the line 1131 via the power reception side capacitor $R_C$. The line 1131 is commonly connected to the anodes of the diodes 1111 and 1121 as well as the cathodes of the diodes 1113 and 1123, while the line 1132 is commonly connected to the anodes of the diodes 1112 and 1122 as well as the cathodes of the diodes 1114 and 1124. The cathodes of the diodes 1111 and 1112 are commonly connected to the line 1133, while the anodes of the diodes 1113 and 1114 are commonly connected to the line 1134. The cathodes of the diodes 1121 and 1122 are commonly connected to the line 1135, and the anodes of the diodes 1123 and 1124 are commonly connected to the line 1136.

In the transistor 1115, the drain is connected to the gate of the transistor 1117 and is connected to the line 1133 via the resistor 1118, the source is connected to the line 1134, and the gate is connected to the line 1134 via the resistor 1116. The source and the drain of the transistor 1117 are connected to the lines 1133 and 1137, respectively. In the transistor 1125, the drain is connected to the gate of the transistor 1127 and is connected to the line 1135 via the resistor 1128, the source is connected to the line 1136, and the gate is connected to the line 1136 via the resistor 1126. The source and the drain of the transistor 1127 are connected to the lines 1135 and 1138, respectively.

The smoothing capacitor CC is not disposed between the lines 1137 and 1134, and the smoothing capacitor CC is disposed only between the lines 1138 and 1136. Specifically, the positive and negative electrodes of the smoothing capacitor CC are connected to the lines 1138 and 1136, respectively. However, a capacitor having a relatively small capacitance (at least smaller than the capacitance of the smoothing capacitor CC) can be disposed between the lines 1137 and 1134. The lines 1134 and 1137 are connected to the NFC communication circuit 220, and a voltage between the line 1134 and 1137 is given to the NFC communication circuit 220. The lines 1138 and 1136 are connected to the NFC power receiving circuit 230, and a voltage between the lines 1138 and 1136 is given to the NFC power receiving circuit 230.

The control circuit 250A controls each of the gate voltages of the transistors 1115 and 1125 so as to turn on or off the transistors 1115 and 1125 individually. When the transistor 1115 is turned on, the transistor 1117 is also turned on by drop of the gate potential of the transistor 1117. When the transistor 1115 is turned off, the transistor 1117 is also turned off. When the transistor 1125 is turned on, the transistor 1127 is also turned on by drop of the gate potential of the transistor 1127. When the transistor 1125 is turned off, the transistor 1127 is also turned off.

Hereinafter, a period of performing the NFC communication using the communication circuits 120 and 220 is referred to as a communication period, and a period of performing the power transfer using the power transmission circuit 130 and the power receiving circuit 230 is referred to as a power transfer period. A period of performing the resonance frequency changing operation or the coil short-circuiting operation is referred to as a test period. The test period includes a period of performing the foreign object detection process The communication connection state is realized in the communication period. In other words, the control circuit 250A turns on and turns off the transistors 1115 and 1125, respectively in the communication period. In this case, alternating current flows in the power reception side coil $R_L$ based on the alternating magnetic field generated by the power transmission side coil $T_L$, and a signal based on the alternating current is transmitted to between the lines 1137 and 1134 via the rectifying circuit including the diodes 1111 to 1114 and the transistor 1117. The equipments 1 and 2 (1A and 2A in this embodiment) can realize NFC communication utilizing amplitude modulation of a carrier wave having the reference frequency. Thus, the NFC communication circuit 220 can extract the information signal from amplitude variation of the voltage signal between the lines 1137 and 1134 in the communication period.

In the power transfer period, the power supply connection state can be realized. In other words, in the power transfer period, the control circuit 250A turns off and turns on the transistors 1115 and 1125, respectively. In this case, alternating current flows in the power reception side coil $R_L$ based on the alternating magnetic field generated by the power transmission side coil $T_L$, and the power based on the alternating current is transmitted to between the lines 1138 and 1136 via the rectifying circuit constituted of the diodes 1121 to 1124 and the transistor 1127. As a result, the smoothing capacitor CC connected between the lines 1138 and 1136 stores charge. The NFC power receiving circuit 230 can generate and output any voltage based on the charge stored in the smoothing capacitor CC, and the output voltage can charge the battery 21 and can drive the function circuit 22 (see FIG. 2; the same is true in any example described later).

In the test period, the control circuit 250A turns off both the transistors 1115 and 1125. In FIG. 39, the state where both the transistors 1115 and 1125 are off is equivalent to the state where the switch 246 is off in FIG. 28. In other words, when the transistors 1115 and 1125 are off, the series circuit of the coil $R_L$ and the capacitor $R_C$ is not formed, so that the coil $R_L$ and the parasitic capacitance between both ends of the coil $R_L$ (that corresponds to FCb in FIG. 28 but is not shown in FIG. 39) constitute the power reception side resonance circuit. As a result, the resonance frequency $f_O$ of the power reception side resonance circuit is changed from the reference frequency to the frequency $f_M$. In this way, the switch circuit 1100 can be said to include the resonance frequency changing circuit (240) for realizing the resonance frequency changing operation.

Second Example of Switch Circuit 210A

Figure 40:
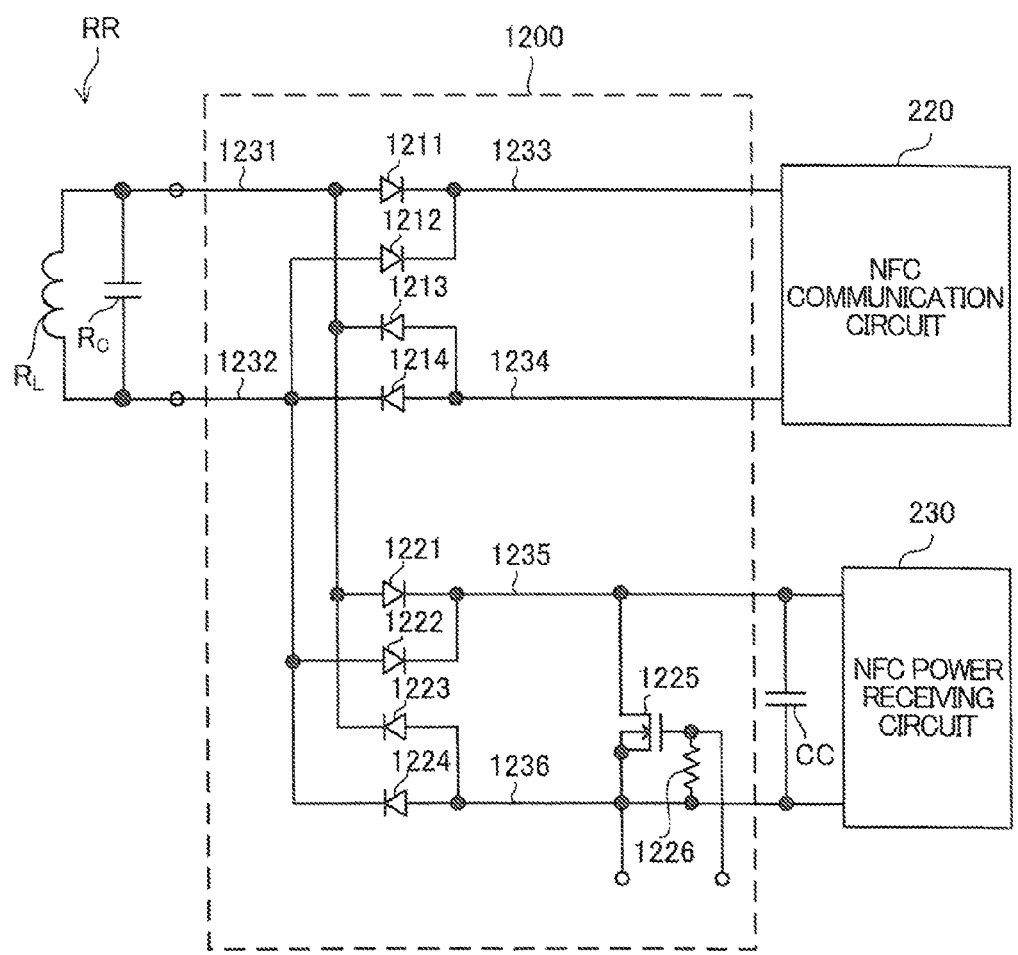
FIG. 40 is a diagram showing another example of the partial circuit in the electronic equipment according to the fifth embodiment of the present invention.

With reference to FIG. 40, a second example of the switch circuit 210A is described. A switch circuit 1200 shown in FIG. 40 can be used as the second example of the switch circuit 210A. In FIG. 40, the switch circuit 1200 is connected to the parallel resonance circuit RR. The switch circuit 1200 is constituted to include components denoted by numerals 1211-1214 and 1221-1226 and lines 1231-1236. The transistor 1225 is constituted as an N-channel MOSFET. The components 1221-1226 and CC in FIG. 40 correspond to components D1-D4, SS, $R_{SS}$, and CC in FIG. 37, respectively.

In FIG. 40, one end of the power reception side coil $R_L$ and one end of the power reception side capacitor $R_C$ are commonly connected to the line 1231, and the other end of the power reception side coil $R_L$ and the other end of the power reception side capacitor $R_C$ are commonly connected to the line 1232. The line 1231 is commonly connected to the anodes of the diodes 1211 and 1221 as well as the cathodes of the diodes 1213 and 1223, while the line 1232 is commonly connected to the anodes of the diodes 1212 and 1222 as well as the cathodes of the diodes 1214 and 1224. The cathodes of the diodes 1211 and 1212 are commonly connected to the line 1233, and the anodes of the diode 1213 and 1214 are commonly connected to the line 1234. The cathodes of the diodes 1221 and 1222 are commonly connected to the line 1235, and the anodes of the diodes 1223 and 1224 are commonly connected to the line 1236. In the transistor 1225, the drain is connected to the line 1235, the source is connected to the line 1236, and the gate is connected to the line 1236 via the resistor 1226.

The smoothing capacitor CC is not disposed between the lines 1233 and 1234, and the smoothing capacitor CC is disposed only between the lines 1235 and 1236. Specifically, the positive and negative electrodes of the smoothing capacitor CC are connected to the lines 1235 and 1236, respectively. However, a capacitor having a relatively small capacitance (at least smaller than the capacitance of the smoothing capacitor CC) can be disposed between the lines 1233 and 1234. The lines 1233 and 1234 are connected to the NFC communication circuit 220, and the voltage between the lines 1233 and 1234 is given to the NFC communication circuit 220. The lines 1235 and 1236 are connected to the NFC power receiving circuit 230, and a voltage between the lines 1235 and 1236 is given to the NFC power receiving circuit 230.

The control circuit 250A turns on or off the transistor 1225 by controlling the gate voltage of the transistor 1225.

In the test period, the control circuit 250A turns on the transistor 1225. When the transistor 1225 is on, the coil $R_L$ is short-circuited via the rectifying circuit (1221-1224). In other words, the coil short-circuiting operation is realized. Consequently, the switch circuit 1200 can be said to include the coil short-circuiting circuit (260).

In the communication period and the power transfer period, the transistor 1225 is off. FIG. 40 shows a circuit extracted as a part related to the coil short-circuiting operation. The switch circuit 210 as shown in FIG. 30 is disposed between the switch circuit 1200 and the resonance circuit RR, and the communication connection state is realized in the communication period (the rectifying circuit constituted of the diodes 1221-1224 are disconnected from the lines 1231 and 1232), and the power supply connection state should be realized in the power transfer period (the rectifying circuit constituted of the diodes 1211-1214 should be disconnected from the lines 1231 and 1232). In the communication period, the NFC communication circuit 220 can extract the information signal from amplitude variation of the voltage signal between the lines 1233 and 1234. In the power transfer period, the power based on the alternating current flowing in the power reception side coil $R_L$ is transmitted to between the lines 1235 and 1236 via the rectifying circuit constituted of the diodes 1221-1224 so that charge is accumulated in the smoothing capacitor CC. Then, the voltage of the accumulated charge of the smoothing capacitor CC is supplied to the NFC power receiving circuit 230.

Sixth Embodiment

Figure 41:
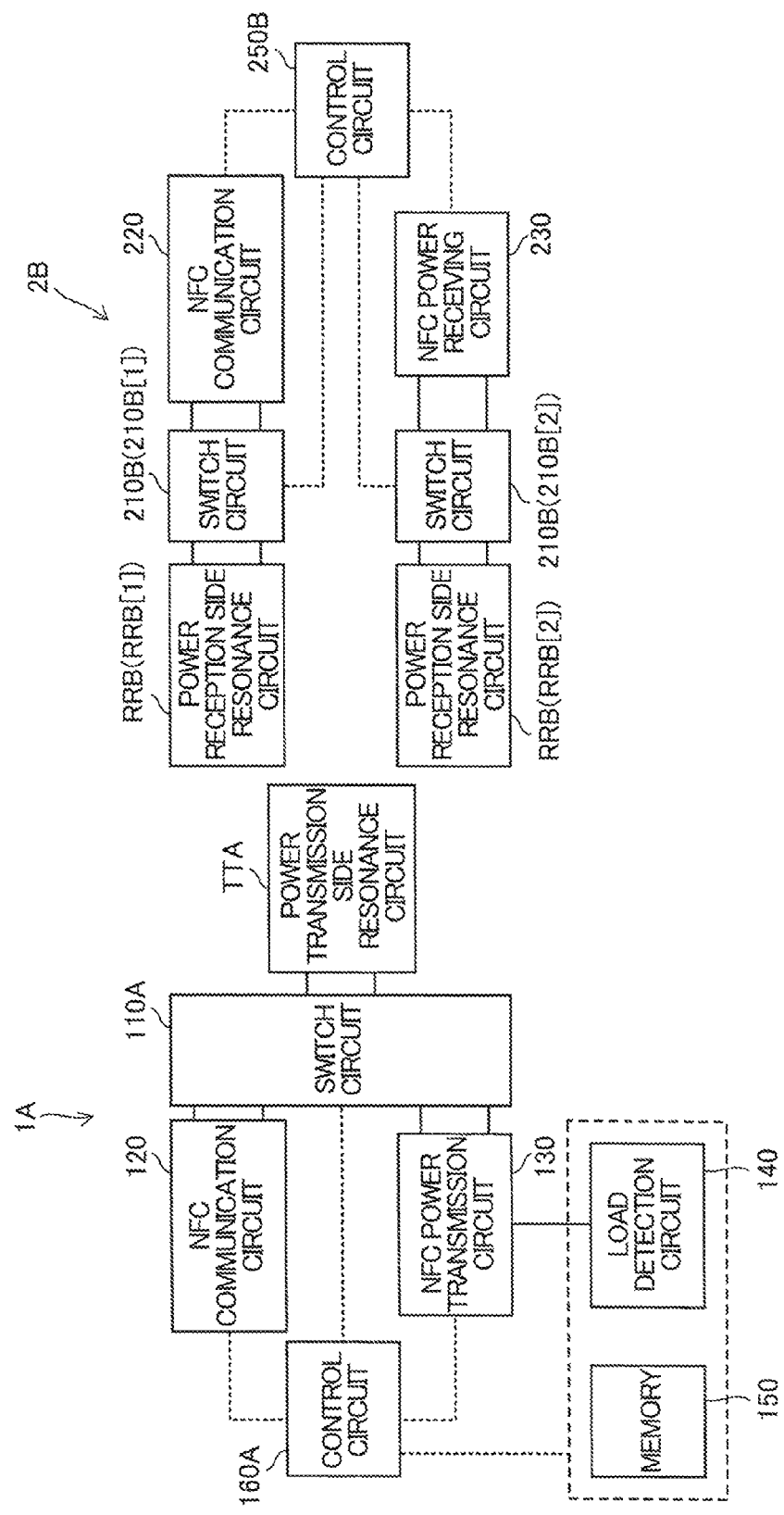
FIG. 41 is a schematic structure diagram of the non-contact power supply system according to a sixth embodiment of the present invention.

A sixth embodiment of the present invention is described. FIG. 41 is a schematic structure diagram of the non-contact power supply system according to the sixth embodiment. The non-contact power supply system of FIG. 41 includes the power supply equipment 1A and the electronic equipment 2B as the power supply equipment 1 and the electronic equipment 2, respectively. A structure and operation of the power supply equipment 1A are as described above in the fifth embodiment (FIG. 38).

The electronic equipment 2B includes two switch circuits 210B, the NFC communication circuit 220, the NFC power receiving circuit 230, a control circuit 250B, and the two power reception side resonance circuits RRB. A semiconductor integrated circuit, in which the two blocks 210B and blocks 220, 230, and 250B are integrated, can be disposed as the power reception side IC 200 or 200' in the electronic equipment 2B.

The NFC communication circuit 220 and the NFC power receiving circuit 230 in the electronic equipment 2B may be the same as those in the electronic equipment 2 described above. Each of the two power reception side resonance circuits RRB is the parallel power reception side resonance circuit RR or the series power reception side resonance circuit RR'. One of the two power reception side resonance circuits RRB is denoted by symbol RRB[1], and the other is denoted by symbol RRB[2]. The two switch circuits 210B is constituted of a switch circuit 210B[1] connected to the resonance circuit RRB[1] and a switch circuit 210B[2] connected to a resonance circuit RRB[2]. The resonance circuit RRB[1] disposed as a resonance circuit for communication is connected to the NFC communication circuit 220 via the switch circuit 210B[1], and the resonance circuit RRB[2] disposed as a resonance circuit for power reception is connected to the NFC power receiving circuit 230 via the switch circuit 210B[2]. In this way, because the resonance circuit for communication and the resonance circuit for power reception are individually disposed in the electronic equipment 2B, the function such as the switch circuit 210 in FIG. 30 is not provided to the electronic equipment 2B. Specific circuit examples of the switch circuits 210B[1] and 210B[2] will be described later. The control circuit 250B includes the function of the control circuit 250 described above. The control circuit 250B can control the circuits 210B[1] and 210B[2] and can control the circuits 220 and 230 similarly to the control circuit 250.

First Example of Switch Circuit 210B

Figure 42:
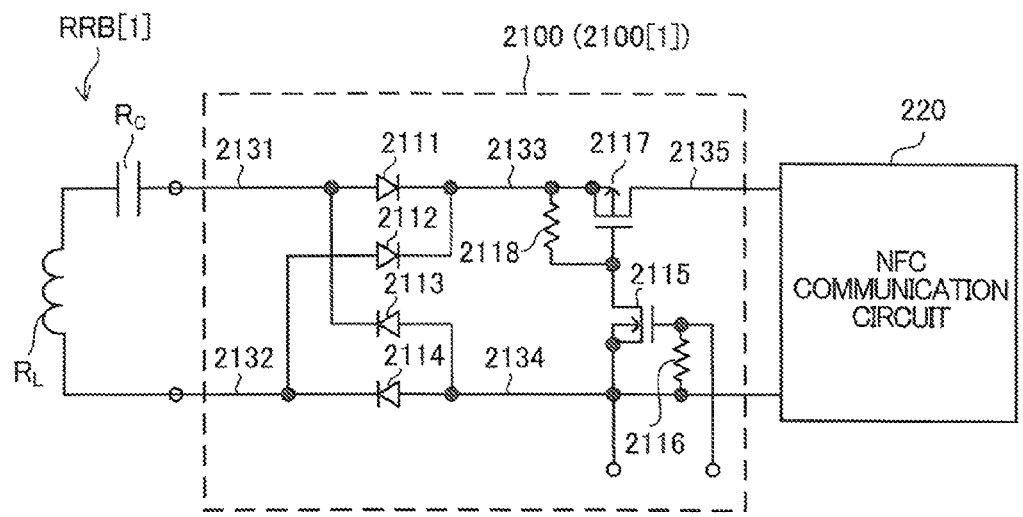
FIG. 42 is a diagram showing an example of a pre-stage circuit of the communication circuit in the electronic equipment according to the sixth embodiment of the present invention.
Figure 43:
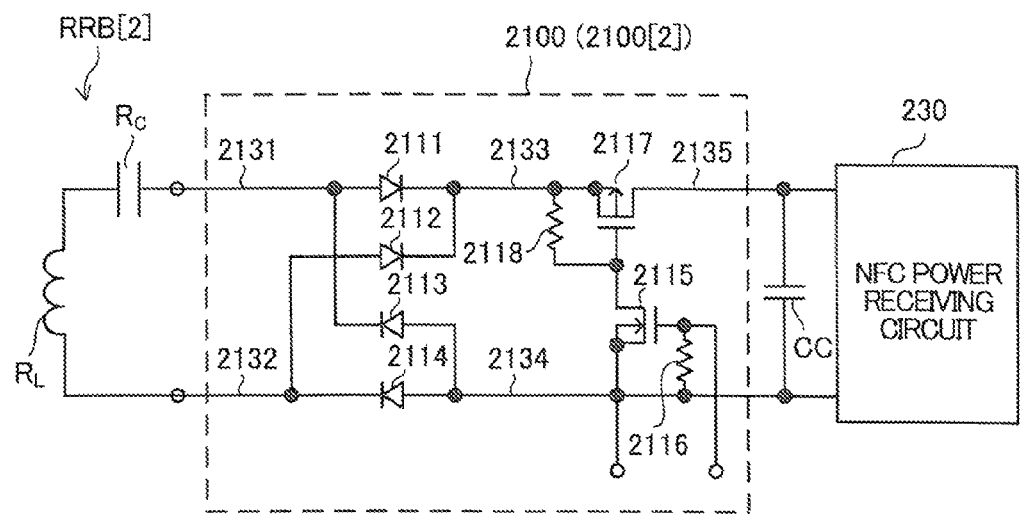
FIG. 43 is a diagram showing an example of a pre-stage circuit of the power receiving circuit in the electronic equipment according to the sixth embodiment of the present invention.

With reference to FIGS. 42 and 43, a first example of the switch circuit 210B is described. A switch circuit 2100 shown in FIGS. 42 and 43 can be used as the first example of the switch circuit 210B.

In FIGS. 42 and 43, the switch circuit 2100 is connected to the series power reception side resonance circuit. FIG. 42 shows a circuit example in which the switch circuit 2100 is used as the switch circuit 210B[1] of FIG. 41. The switch circuit 2100 that is used as the switch circuit 210B[1] is particularly referred to as a switch circuit 2100[1]. The switch circuit 2100[1] is disposed between the series resonance circuit RRB[1] and the NFC communication circuit 220. FIG. 43 shows a circuit example in which the switch circuit 2100 is used as the switch circuit 210B[2] of FIG. 41. The switch circuit 2100 that is used as the switch circuit 210B[2] is particularly referred to as a switch circuit 2100[2]. The switch circuit 2100[2] is disposed between the series resonance circuit RRB[2] and the NFC power receiving circuit 230. The switch circuit 2100[1] and the switch circuit 2100[2] have the same circuit structure.

The switch circuit 2100 (namely, each of the circuit 2100[1] and the 2100[2]) is constituted to include components denoted by numerals 2111-2118 and lines 2131-2135. The transistor 2115 is constituted as an N-channel MOSFET, and the transistor 2117 is constituted as a P-channel MOSFET.

In FIGS. 42 and 43, one end of the power reception side coil $R_L$ is directly connected to the line 2132, and the other end of the power reception side coil $R_L$ is connected to the line 2131 via the power reception side capacitor $R_C$. The line 2131 is commonly connected to the anode of the diode 2111 and the cathode of the diode 2113, and the line 2132 is commonly connected to the anode of the diode 2112 and the cathode of the diode 2114. The cathodes of the diodes 2111 and 2112 are commonly connected to the line 2133, and the anodes of the diodes 2113 and 2114 are commonly connected to the line 2134.

In the transistor 2115, the drain is connected to the gate of the transistor 2117 and is connected to the line 2133 via the resistor 2118, the source is connected to the line 2134, and the gate is connected to the line 2134 via the resistor 2116. The source and the drain of the transistor 2117 are connected to the lines 2133 and 2135, respectively.

The lines 2134 and 2135 in the switch circuit 2100[1] are connected to the NFC communication circuit 220, and the voltage between the lines 2134 and 2135 in the switch circuit 2100[1] is given to the NFC communication circuit 220. The lines 2134 and 2135 in the switch circuit 2100[2] are connected to the NFC power receiving circuit 230, and the voltage between the lines 2134 and 2135 in the switch circuit 2100[2] is given to the NFC power receiving circuit 230.

As shown in FIG. 42, the smoothing capacitor CC is not disposed between the lines 2134 and 2135 in the switch circuit 2100[1] (between the lines 2134 and 2135 connecting the circuit 2100[1] and the circuit 220). On the other hand, as shown in FIG. 43, the smoothing capacitor CC is disposed between the lines 2134 and 2135 in the switch circuit 2100[2] (between the lines 2134 and 2135 connecting the circuit 2100[2] and the circuit 230). Specifically, the positive electrode and the negative electrode of the smoothing capacitor CC are respectively connected to the lines 2135 and 2134 connecting the circuit 2100[2] and the circuit 230. Note that a capacitor having a relatively small capacitance (at least smaller than the capacitance of the smoothing capacitor CC) can be disposed between the lines 2134 and 2135 connected to the communication circuit 220.

The control circuit 250B controls a gate voltage of the transistor 2115 in each of the circuits 2100[1] and 2100[2] so as to turn on or off the transistor 2115 in the each of the circuits 2100[1] and 2100[2]. In the circuit 2100[1] or 2100[2], when the transistor 2115 is turned on, the transistor 2117 is also turned on by a gate potential drop of the transistor 2117. When the transistor 2115 is turned off, the transistor 2117 is also turned off.

In the test period, the control circuit 250B turns off the transistor 2115 in both the circuits 2100[1] and 2100[2]. In each circuit of FIGS. 42 and 43, the state where the transistor 2115 is off is equivalent to the state where the switch 246 is turned off in FIG. 28. In other words, when the transistor 2115 is turned off, the series circuit of the coil $R_L$ and the capacitor $R_C$ is not constituted, while the coil $R_L$ and the parasitic capacitance between the both ends of the coil $R_L$ (that corresponds to FCb in FIG. 28 but is not shown in FIGS. 42 and 43) constitute the power reception side resonance circuit. As a result, the resonance frequency $f_O$ of the power reception side resonance circuit is changed from the reference frequency to the frequency $f_M$. Thus, each of the switch circuits 2100[1] and 2100[2] can be said to include the resonance frequency changing circuit (240) that realizes the resonance frequency changing operation.

In the communication period, the control circuit 250B turns on the transistor 2115 of the circuit 2100[1] and turns off the transistor 2115 of the circuit 2100[2]. In this case, alternating current flows in the power reception side coil $R_L$ in the resonance circuit RRB[1] of FIG. 42 based on the alternating magnetic field generated by the power transmission side coil $T_L$, and the signal based on the alternating current is transmitted to between the lines 2134 and 2135 via the rectifying circuits (2111-2114) and the transistor 2117 in the circuit 2100[1]. Consequently, the NFC communication circuit 220 can extract the information signal from the amplitude variation of the voltage signal between the lines 2134 and 2135 in the circuit 2100[1] in the communication period. When the transistor 2115 in the circuit 2100[2] is turned off in the communication period, the resonance circuit for power reception RRB[2] does not substantially function as a load on the power transmission side coil $T_L$.

In the power transfer period, the control circuit 250B turns off the transistor 2115 of the circuit 2100[1] and turns on the transistor 2115 of the circuit 2100[2]. In this case, alternating current flows in the power reception side coil $R_L$ in the resonance circuit RRB[2] of FIG. 43 based on the alternating magnetic field generated by the power transmission side coil $T_L$, and the power based on the alternating current is transmitted to between the lines 2134 and 2135 via the rectifying circuits (2111-2114) and the transistor 2117 in the circuit 2100[2]. As a result, charge is accumulated in the smoothing capacitor CC connected between the lines 2134 and 2135 in the circuit 2100[2], and a voltage due to the accumulated charge is supplied to the NFC power receiving circuit 230.

Second Example of Switch Circuit 210B

Figure 44:
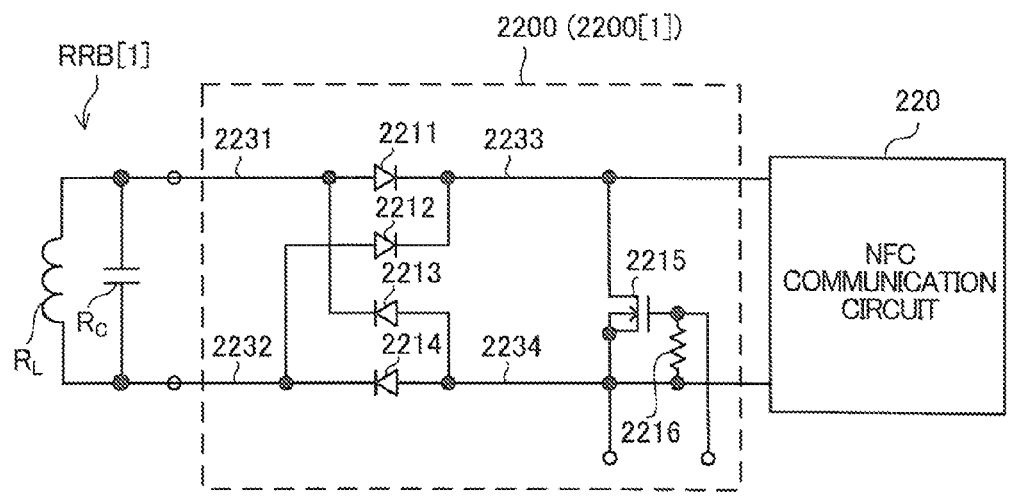
FIG. 44 is a diagram showing another example of the pre-stage circuit of the communication circuit in the electronic equipment according to the sixth embodiment of the present invention.
Figure 45:
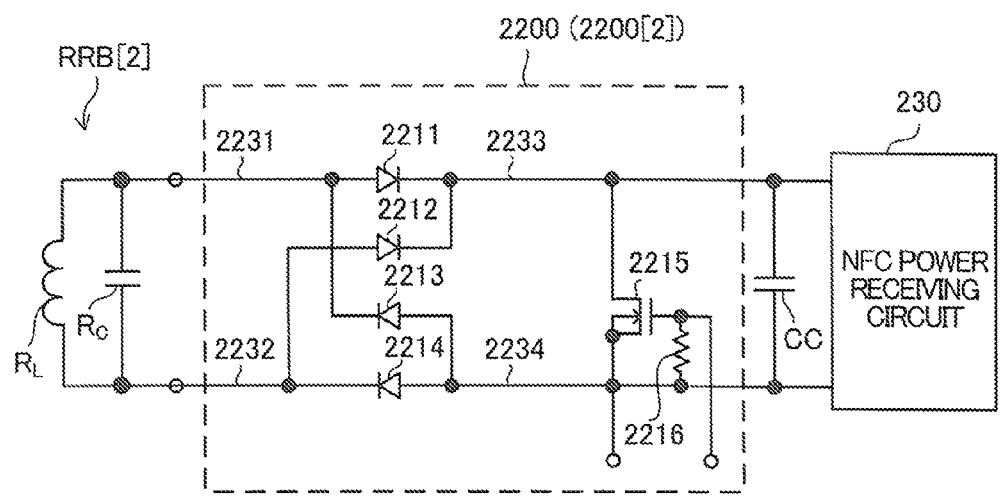
FIG. 45 is a diagram showing another example of the pre-stage circuit of the power receiving circuit in the electronic equipment according to the sixth embodiment of the present invention.

With reference to FIGS. 44 and 45, a second example of the switch circuit 210B is described. A switch circuit 2200 shown in FIGS. 44 and 45 can be used as the second example of the switch circuit 210B.

In FIGS. 44 and 45, the switch circuit 2200 is connected to the parallel power reception side resonance circuit. FIG. 44 shows a circuit example in which the switch circuit 2200 is used as the switch circuit 210B[1] of FIG. 41, and the switch circuit 2200 used as the switch circuit 210B[1] is particularly referred to as a switch circuit 2200[1]. The switch circuit 2200[1] is disposed between the parallel resonance circuit RRB[1] and the NFC communication circuit 220. FIG. 45 shows a circuit example in which the switch circuit 2200 is used as the switch circuit 210B[2] of FIG. 41, and the switch circuit 2200 used as the switch circuit 210B[2] is particularly referred to as a switch circuit 2200[2]. The switch circuit 2200[2] is disposed between the parallel resonance circuit RRB[2] and the NFC power receiving circuit 230. The switch circuit 2200[1] and the switch circuit 2200[2] have the same circuit structure.

The switch circuit 2200 (namely, each of the circuits 2200[1] and 2200[2]) is constituted to include components denoted by numerals 2211-2216 and lines 2231-2234. The transistor 2215 is constituted as an N-channel MOSFET.

In FIGS. 44 and 45, one end of the power reception side coil $R_L$ and one end of the power reception side capacitor $R_C$ are commonly connected to the line 2231, and the other end of the power reception side coil $R_L$ and the other end of the power reception side capacitor $R_C$ are commonly connected to the line 2232. The line 2231 is commonly connected to the anode of the diode 2211 and the cathode of the diode 2213, and the line 2232 is commonly connected to the anode of the diode 2212 and the cathode of the diode 2214. The cathodes of the diodes 2211 and 2212 are commonly connected to the line 2233, and the anodes of the diodes 2213 and 2214 are commonly connected to the line 2234.

In the transistor 2215, the drain is connected to the line 2233, the source is connected to the line 2234, and the gate is connected to the line 2234 via the resistor 2216.

The lines 2233 and 2234 in the switch circuit 2200[1] are connected to the NFC communication circuit 220, and a voltage between the lines 2233 and 2234 in the switch circuit 2200[1] is given to the NFC communication circuit 220. The lines 2233 and 2234 in the switch circuit 2200[2] are connected to the NFC power receiving circuit 230, and the voltage between the lines 2233 and 2234 in the switch circuit 2200[2] is given to the NFC power receiving circuit 230.

As shown in FIG. 44, the smoothing capacitor CC is not disposed between the lines 2233 and 2234 in the switch circuit 2200[1] (between the lines 2233 and 2234 connecting the circuit 2200[1] and the circuit 220). On the other hand, as shown in FIG. 45, the smoothing capacitor CC is disposed between the lines 2233 and 2234 in the switch circuit 2200[2] (between the lines 2233 and 2234 connecting the circuit 2200[2] and the circuit 230). Specifically, the positive electrode and the negative electrode of the smoothing capacitor CC are respectively connected to the lines 2233 and 2234 connecting the circuit 2200[2] and the circuit 230. Note that a capacitor having a relatively small capacitance (at least smaller than the capacitance of the smoothing capacitor CC) is disposed between the lines 2233 and 2234 connected to the communication circuit 220.

The control circuit 250B controls gate voltage of the transistor 2215 in each of the circuits 2200[1] and 2200[2] so as to turn on or off the transistor 2215 in each of the circuits 2200[1] and 2200[2].

In the test period, the control circuit 250B turns on both the transistors 2215 in the circuits 2200[1] and 2200[2]. In each of the circuits 2200[1] and 2200[2], when the transistor 2215 is turned on, the power reception side coil $R_L$ is short-circuited via the rectifying circuits (2211-2214). In other words, the coil short-circuiting operation is realized. Thus, each of the switch circuits 2200[1] and 2200[2] can be said to include the coil short-circuiting circuit (260) that realizes the coil short-circuiting operation.

In the communication period, the control circuit 250B turns off the transistor 2215 of the circuit 2200[1] and turns on the transistor 2215 of the circuit 2200[2]. In this case, alternating current flows in the power reception side coil $R_L$ in the resonance circuit RRB[1] of FIG. 44 based on the alternating magnetic field generated by the power transmission side coil $T_L$, and a signal based on the alternating current is transmitted to between the lines 2233 and 2234 via the rectifying circuits (2211-2214) in the circuit 2200[1]. Consequently, the NFC communication circuit 220 can extract the information signal from the amplitude variation of the voltage signal between the lines 2233 and 2234 in the circuit 2200[1] in the communication period. When the transistor 2215 of the circuit 2200[2] is turned on in the communication period, the resonance circuit for power reception RRB[2] does not substantially function as a load on the power transmission side coil $T_L$.

In the power transfer period, the control circuit 250B turns on the transistor 2215 of the circuit 2200[1] and turns off the transistor 2215 of the circuit 2200[2]. In this case, alternating current flows in the power reception side coil $R_L$ in the resonance circuit RRB[2] of FIG. 45 based on the alternating magnetic field generated by the power transmission side coil $T_L$, and power due to the alternating current is transmitted to between the lines 2233 and 2234 via the rectifying circuits (2211-2214) in the circuit 2200[2]. As a result, charge is accumulated in the smoothing capacitor CC connected between the lines 2233 and 2234 of the circuit 2200[2], and a voltage due to the accumulated charge is supplied to the NFC power receiving circuit 230.

Note that the switch circuit 2100[1] of FIG. 42 and the switch circuit 2200[2] of FIG. 45 may be used as the switch circuits 210B[1] and 210B[2] of FIG. 41. Otherwise, the switch circuit 2200[1] of FIG. 44 and the switch circuit 2100[2] of FIG. 43 may be used as the same.

Seventh Embodiment

Figure 46:
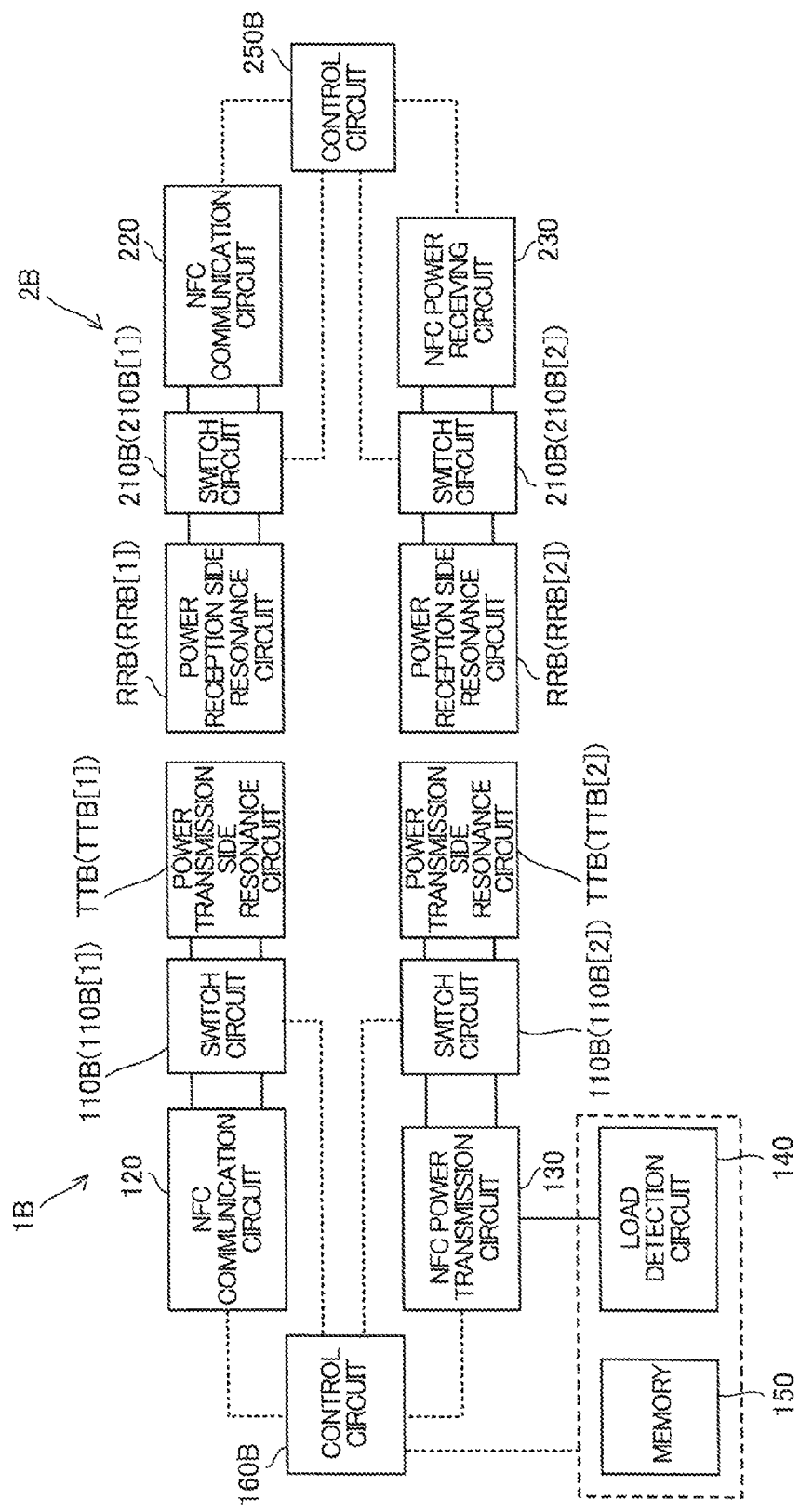
FIG. 46 is a schematic structure diagram of the non-contact power supply system according to a seventh embodiment of the present invention.

A seventh embodiment of the present invention is described. FIG. 46 is a schematic structure diagram of the non-contact power supply system according to the seventh embodiment, and the non-contact power supply system of FIG. 46 includes power supply equipment 1B and the electronic equipment 2B as the power supply equipment 1 and the electronic equipment 2, respectively. The structure and operation of the electronic equipment 2B are as described above in the sixth embodiment (FIG. 41).

The power supply equipment 1B includes two switch circuits 110B, the NFC communication circuit 120, the NFC power transmission circuit 130, the load detection circuit 140, the memory 150, a control circuit 160B, and two power transmission side resonance circuits TTB. A semiconductor integrated circuit in which the two blocks 110B and the blocks 120, 130, 140, 150 and 160B are integrated can be disposed as the power transmission side IC 100 in the power supply equipment 1B.

The NFC communication circuit 120, the NFC power transmission circuit 130, the load detection circuit 140, and the memory 150 in the power supply equipment 1B may be the same as those of the power supply equipment 1 described above. Each of the two power transmission side resonance circuits TTB is the parallel power transmission side resonance circuit TT or the series power transmission side resonance circuit TT' (see FIGS. 2 and 24A).

One of the two power transmission side resonance circuits TTB is denoted by symbol TTB[1], and the other is denoted by symbol TTB[2]. The two switch circuits 110B are constituted of a switch circuit 110B[1] connected to the resonance circuit TTB[1] and a switch circuit 110B[2] connected to the resonance circuit TTB[2]. The resonance circuit TTB[1] disposed as the resonance circuit for communication is connected to the NFC communication circuit 120 via the switch circuit 110B[1], and the resonance circuit TTB[2] disposed as a resonance circuit for power transmission is connected to the NFC power transmission circuit 130 via the switch circuit 110B[2]. In this way, because the resonance circuit for communication and the resonance circuit for power transmission are individually disposed in the power supply equipment 1B, the function such as the switch circuit 110 of FIG. 4 is not provided to the power supply equipment 1B. The control circuit 160B includes the function of the control circuit 160 described above. The control circuit 160B can control the circuits 110B[1] and 110B[2] and can control the circuits 120 and 130 similarly to the control circuit 160.

The switch circuits 110B[1] and 110B[2] have the same function. A switch circuit 110B[i] can perform the resonance frequency changing operation for changing the resonance frequency of a resonance circuit TTB[i] from 13.56 MHz as the reference frequency to a predetermined frequency (that may be the same as the frequency $f_M$ described above, such as a few hundreds kHz to 1 MHz), or the coil short-circuiting operation for short-circuiting the power transmission side coil $T_L$ in the resonance circuit TTB[i] (here, i is 1 or 2). The method of realizing the resonance frequency changing operation or the coil short-circuiting operation by the switch circuit 110B[i] may be the same as the method of realizing the resonance frequency changing operation or the coil short-circuiting operation of the power reception side resonance circuit described above in an arbitrary embodiment. The control circuit 160B can individually control execution/non-execution of the resonance frequency changing operation or the coil short-circuiting operation in the switch circuit 110B[1], as well as execution/non-execution of the resonance frequency changing operation or the coil short-circuiting operation in the switch circuit 110B[2]. Hereinafter, execution of the resonance frequency changing operation or the coil short-circuiting operation in the switch circuit 110B[i] is expressed as an action of the switch circuit 110B[i], and non-execution of the resonance frequency changing operation or the coil short-circuiting operation in the switch circuit 110B[i] is expressed as a function stop of the switch circuit 110B[i].

In the communication period, the control circuit 160B controls only the communication circuit 120 to operate out of the communication circuit 120 and the power transmission circuit 130. In the communication period, the NFC communication between the equipment 1B and the equipment 2B is performed by using the communication circuit 120 and the resonance circuit TTB[1] as well as the resonance circuit RRB[1] and the communication circuit 220. In this case, operations of the communication circuit 120 and the resonance circuit TTB[1] are the same as those of the communication circuit 120 and the resonance circuit TT in the NFC communication as described above. Thus, in the communication period, the control circuit 160B stops the function of the switch circuit 110B[1] (that is, the function stop of the switch circuit 110B[1] is realized). However, in the communication period, it is necessary to prevent the resonance circuit TTB[2] disposed physically very close to the resonance circuit TTB[1] from affecting largely to the circuit operation of the resonance circuit TTB[1]. Therefore, in the communication period, the control circuit 160B controls the switch circuit 110B[2] to operate (that is, the action of the switch circuit 110B[2] is realized).

In the power transfer period, the control circuit 160B controls only the power transmission circuit 130 out of the communication circuit 120 and the power transmission circuit 130. In the power transfer period, power transfer between the equipment 1B and the equipment 2B is performed by using the power transmission circuit 130 and the resonance circuit TTB[2] as well as the resonance circuit RRB[2] and the power receiving circuit 230. In this case, operations of the power transmission circuit 130 and the resonance circuit TTB[2] are the same as those of the power transmission circuit 130 and the resonance circuit TT in the power transfer described above. Therefore, in the power transfer period, the control circuit 160B stops the function of the switch circuit 110B[2] (that is, the function stop of the switch circuit 110B[2] is realized). However, in the power transfer period, it is necessary to prevent the resonance circuit TTB[1] disposed physically very close to the resonance circuit TTB[2] from affecting largely to the circuit operation of the resonance circuit TTB[2]. In addition, it is necessary to prevent a breakdown of the circuit connected to the resonance circuit TTB[1] due to the ferromagnetic field generated by the resonance circuit TTB[2]. Therefore, in the power transfer period, the control circuit 160B controls the switch circuit 110B[1] to operate (that is, the action of the switch circuit 110B[1] is realized).

In the test period, the control circuit 160B controls only the power transmission circuit 130 to operate out of the communication circuit 120 and the power transmission circuit 130. In the test period, the test magnetic field is generated by the power transmission circuit 130 and the resonance circuit TTB[2]. In this case, operations of the power transmission circuit 130 and the resonance circuit TTB [2] are the same as the operations of the power transmission circuit 130 and the resonance circuit TT in the test period described above (namely, the operations of the power transmission circuit 130 and the resonance circuit TT in the foreign object detection process described above). Therefore, in the test period, the control circuit 160B stops the function of the switch circuit 110B[2]. However, in the test period, it is necessary to prevent the resonance circuit TTB[1] disposed physically very close to the resonance circuit TTB[2] from affecting largely to a result of the foreign object detection process. Therefore, in the test period, the control circuit 160B controls the switch circuit 110B[1] to operate (that is, the action of the switch circuit 110B[1] is realized).

Eighth Embodiment

Figure 47:
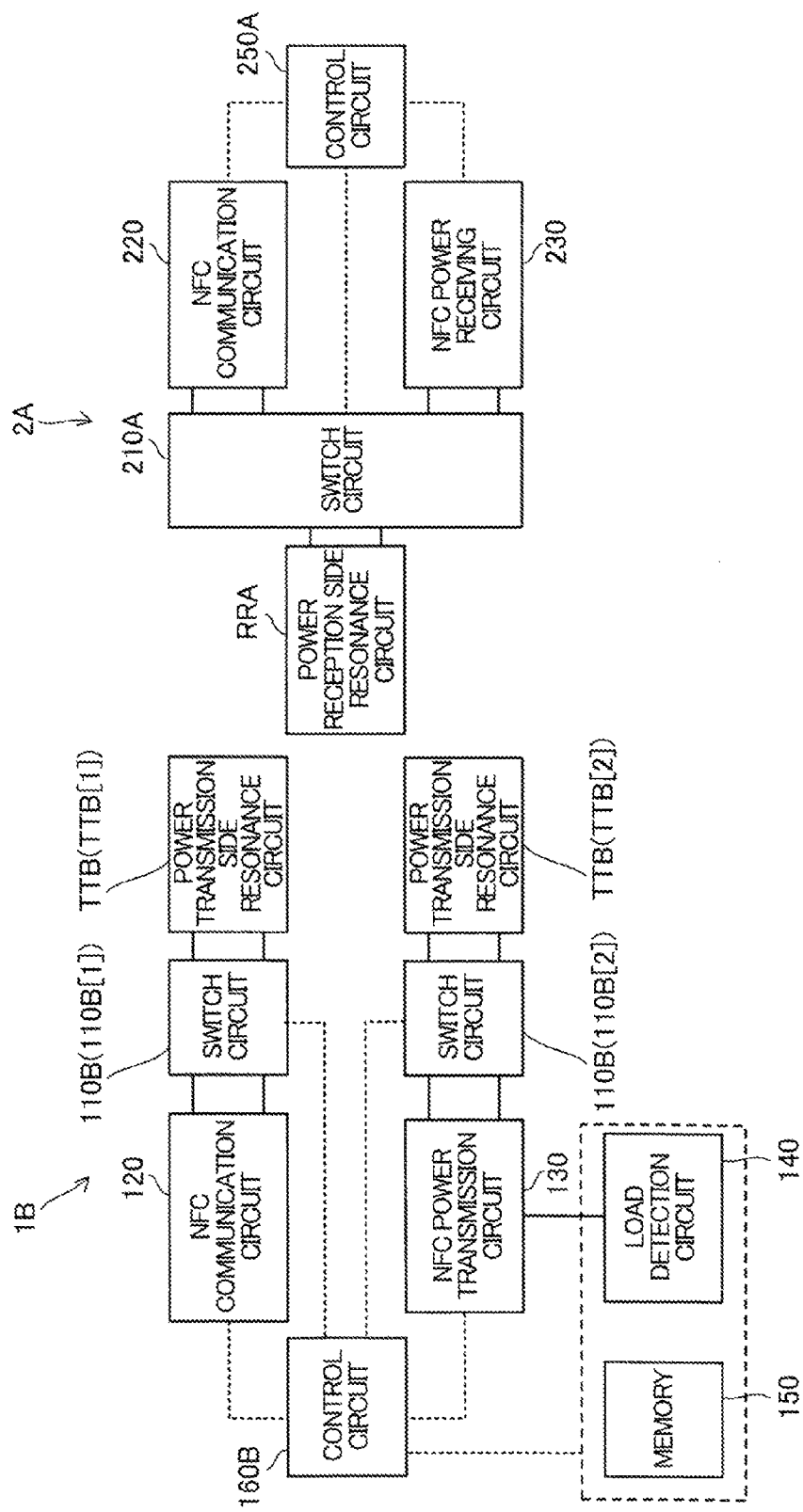
FIG. 47 is a schematic structure diagram of the non-contact power supply system according to an eighth embodiment of the present invention.

An eighth embodiment of the present invention is described. FIG. 47 is a schematic structure diagram of a non-contact power supply system according to the eighth embodiment. The non-contact power supply system of FIG. 47 includes the power supply equipment 1B and the electronic equipment 2A as the power supply equipment 1 and the electronic equipment 2, respectively. The structure and operation of the power supply equipment 1B are as described above in the seventh embodiment (FIG. 46). The structure and operation of the electronic equipment 2A are as described above in the fifth embodiment (FIG. 38).

Ninth Embodiment

A ninth embodiment of the present invention is described. In each of the embodiments described above, the NFC communication circuit 220 in the electronic equipment (2, 2A, 2B) can be realized using an existing NFC communication IC. Also in this case, the electronic equipment (2, 2A, 2B) should be constituted so that the resonance frequency changing operation or the coil short-circuiting operation can be realized for the power reception side resonance circuit.

Figure 48:
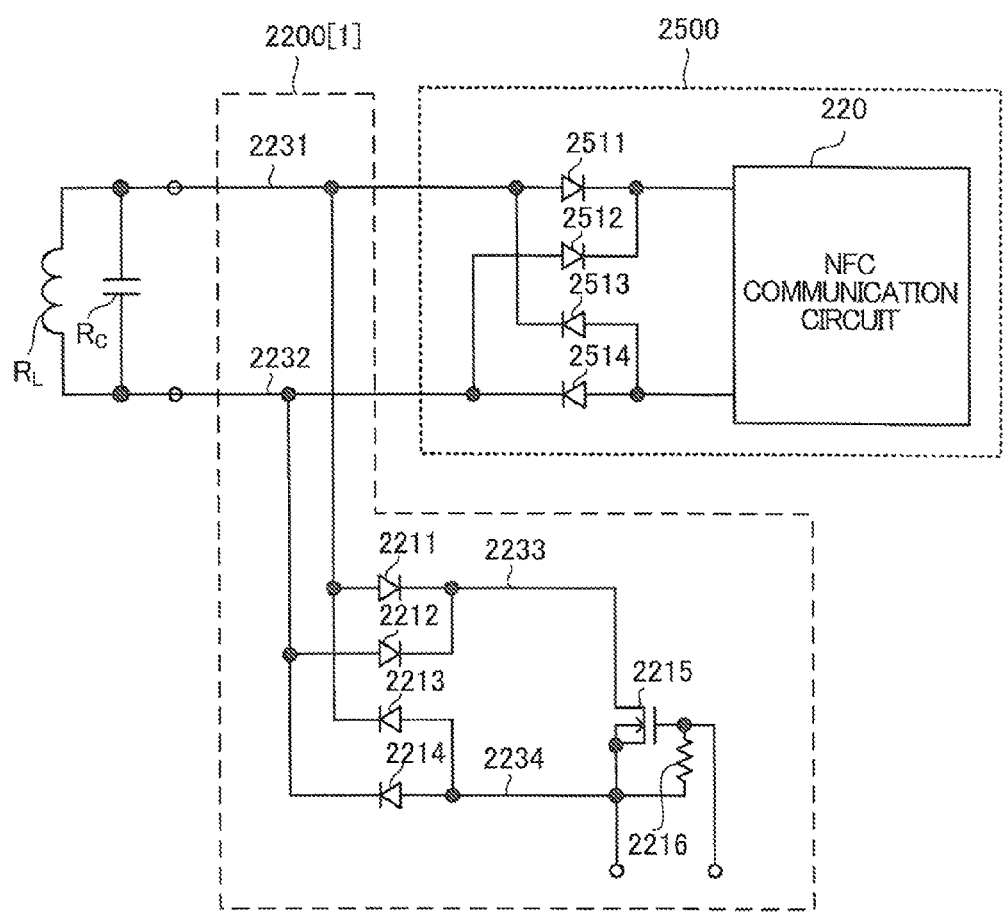
FIG. 48 is a diagram showing an example of the pre-stage circuit of the communication circuit in the electronic equipment according to a ninth embodiment of the present invention.

With reference to FIG. 48, a specific example is described. FIG. 48 shows a circuit example in which the switch circuit 2200[1] is applied to an existing (namely, commercial) NFC communication IC 2500. It is possible to constitute the switch circuit 210B[1] and the NFC communication circuit 220 shown in FIG. 41 or the like using the switch circuit 2200[1] and the NFC communication IC 2500 shown in FIG. 48.

In FIG. 48, the switch circuit 2200[1] is connected to the parallel power reception side resonance circuit. The connection relationship thereof and the connection relationship between the components and the lines in the switch circuit 2200[1] are as described above. The NFC communication IC 2500 includes the NFC communication circuit 220 and includes a rectifying circuit constituted of diodes 2511-2514. Specifically, the anode of the diode 2511 and the cathode of the diode 2513 are commonly connected to the line 2231, while the anode of the diode 2512 and the cathode of the diode 2514 are commonly connected to the line 2232. The NFC communication circuit 220 in the NFC communication IC 2500 is connected to the line to which the cathodes of the diodes 2511 and 2512 are commonly connected and is connected the line to which the anodes of the diodes 2513 and 2514 are commonly connected. In the communication period, the NFC communication circuit 220 can extract the information signal from the amplitude variation of the voltage signal between those lines. The transistor 2215 of FIG. 48 is off in the communication period and is turned on in the power transfer period and the test period so that the coil short-circuiting operation is realized.

Tenth Embodiment

A tenth embodiment of the present invention is described. The non-contact power supply system of the tenth embodiment may include the power supply equipment 1, 1A or 1B described above as the power supply equipment 1 and the electronic equipment 2, 2A or 2B described above as the electronic equipment 2. However, in the following description, for specific description of the technique related to the tenth embodiment, it is supposed that the non-contact power supply system of the tenth embodiment is constituted of the power supply equipment 1 and the electronic equipment 2 described above in the first to the fourth embodiments.

The operation of the power supply equipment 1 and the electronic equipment 2 in the communication period and the test period are as described above. In this embodiment, characteristic operations of the power supply equipment 1 and the electronic equipment 2 in the power transfer period are described noting the structures related to the operations.

Figure 49:
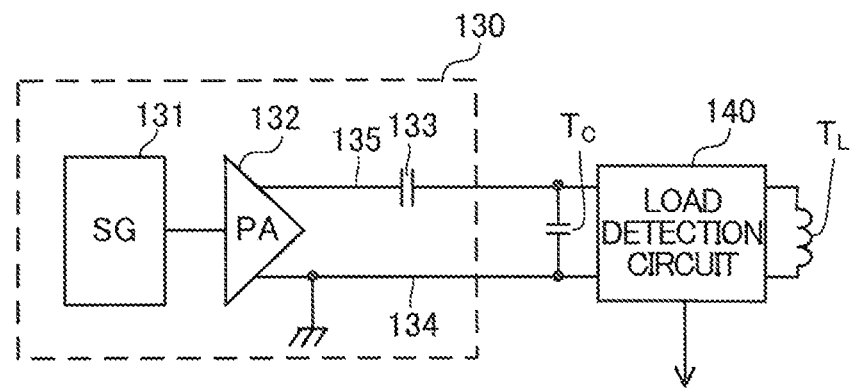
FIG. 49 is a structure diagram of a part of the power supply equipment according to a tenth embodiment of the present invention.

FIG. 49 is a block diagram of a part related to the characteristic operation of this embodiment among the structure elements of the power supply equipment 1. The NFC power transmission circuit 130 of FIG. 49 is the same as that shown in FIG. 7. FIG. 49 shows the parallel resonance circuit TT (see FIG. 2) as the power transmission side resonance circuit disposed in the power supply equipment 1. The power transmission side resonance circuit disposed in the power supply equipment 1 may be the series resonance circuit TT'. The power supply equipment 1 according to the tenth embodiment is supposed to include the power transmission side IC 100 and the power transmission side resonance circuit (TT or TT') shown in FIGS. 2 and 4.

Figure 50:
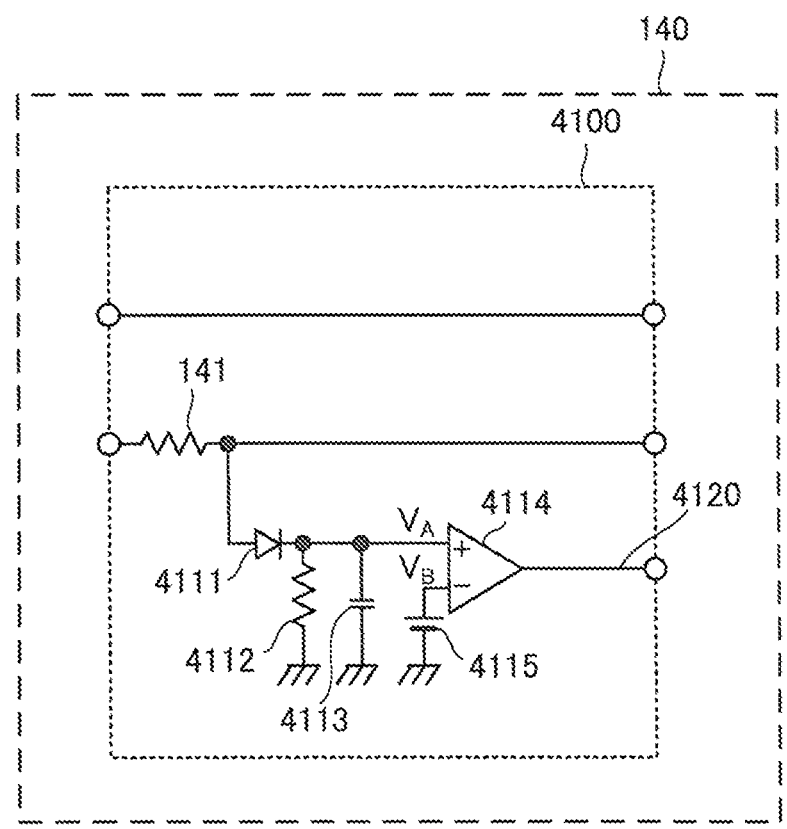
FIG. 50 is a circuit diagram of a circuit included in the load detection circuit according to the tenth embodiment of the present invention.

A circuit 4100 shown in FIG. 50 can be included in the load detection circuit 140. The circuit 4100 can detect amplitude of current flowing in the power transmission side coil $T_L$ and includes components 141 and 4111-4115. The sense resistor 141 of FIG. 50 is the same as the sense resistor 141 of FIG. 7, and current flowing in the power transmission side coil $T_L$ also flows in the sense resistor 141. A voltage generated by the sense resistor 141 viewed from a reference potential of zero volts is applied to the anode of the diode 4111, and a voltage at the cathode of the diode 4111 is smoothed by a low pass filter constituted of a parallel circuit of a resistor 4112 and a capacitor 4113 and is supplied to a noninverting input terminal of a comparator 4114. In other words, a DC voltage $V_A$ having a value proportional to the amplitude of the current flowing in the power transmission side coil $T_L$ is applied to the noninverting input terminal of the comparator 4114. A DC voltage $V_B$ generated by the DC voltage source 4115 is applied to the inverting input terminal of the comparator 4114. An output signal 4120 of the comparator 4114 becomes a high level voltage signal when "$V_A > V_B$" is satisfied and becomes a low level voltage signal when "$V_A < V_B$" is satisfied. Note that the load detection circuit 140 of the power supply equipment 1 may include the amplifier 142, the envelope detector 143, and the A/D converter 144 shown in FIG. 7. The voltage signal applied to the noninverting input terminal of the comparator 4114 of FIG. 50 corresponds to the output signal of the envelope detector 143 of FIG. 7.

Figure 51:
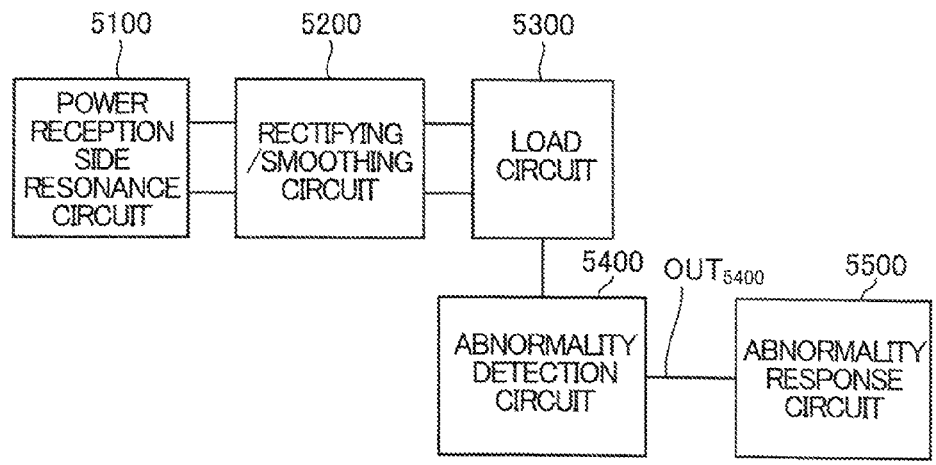
FIG. 51 is a block diagram of a part of the electronic equipment according to the tenth embodiment of the present invention.

FIG. 51 is a block diagram of a part related to the characteristic operation of this embodiment among the structure elements of the electronic equipment 2. The electronic equipment 2 according to the tenth embodiment includes circuits 5100, 5200, 5300, 5400 and 5500. The power reception side resonance circuit 5100 is the parallel resonance circuit RR or the series resonance circuit RR'.

The electronic equipment 2 in the tenth embodiment is supposed to include the power reception side IC 200 shown in FIGS. 2 and 5 or the power reception side IC 200' shown in FIG. 30. Under this supposition (see FIGS. 5, 30 and 51), the rectifying smoothing circuit 5200 can be considered to be inserted between the switch circuit 210 and the NFC power receiving circuit 230 or to be included in the NFC power receiving circuit 230. The load circuit 5300 can be considered to be included in the NFC power receiving circuit 230 or to be disposed after the NFC power receiving circuit 230 (corresponding to the function circuit 22 of FIG. 2 or including the function circuit 22, for example). In the tenth embodiment, the abnormality detection circuit 5400 and the abnormality response circuit 5500 are added to the power reception side IC 200 or 200'.

The rectifying smoothing circuit 5200 generates a DC power by rectifying and smoothing the AC power received by the power reception side coil $R_L$ of the power reception side resonance circuit 5100 in the power transfer. The load circuit 5300 consumes the DC power generated by the rectifying smoothing circuit 5200 so as to perform any electric operation.

Figure 52:
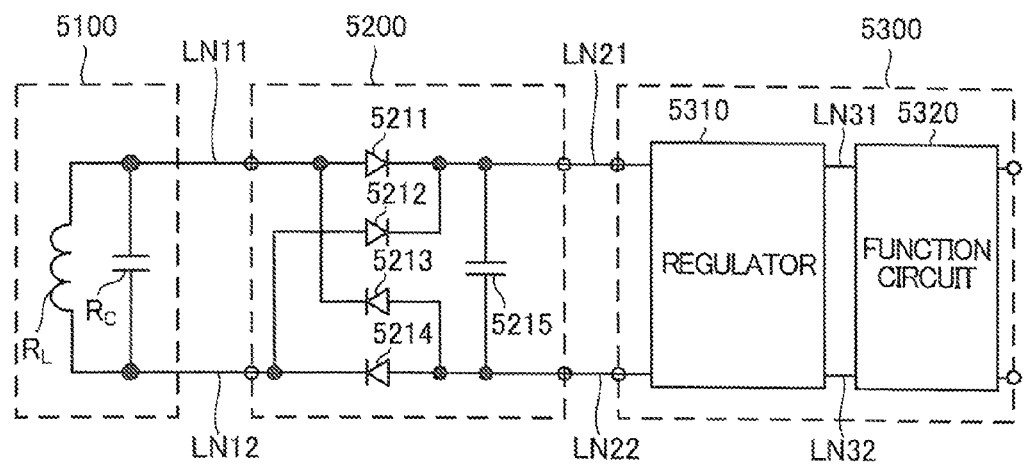
FIG. 52 is a structure diagram of a power reception side resonance circuit, a rectifying smoothing circuit, and a load circuit according to the tenth embodiment of the present invention.

FIG. 52 shows a specific structure example of the circuit 5100, 5200 and 5300. FIG. 52 shows an example in the case where the power reception side resonance circuit 5100 is the parallel resonance circuit, but the power reception side resonance circuit 5100 may be the series resonance circuit as described above. The rectifying smoothing circuit 5200 includes diodes 5211-5214 and a smoothing capacitor 5215. The load circuit 5300 includes a regulator 5310 and a function circuit 5320. The function circuit 5320 may correspond to the function circuit 22 shown in FIG. 2.

In FIG. 52, one end of the power reception side coil $R_L$ and one end of the power reception side capacitor $R_C$ in the power reception side resonance circuit 5100 are commonly connected to the anode of the diode 5211 and the cathode of the diode 5213 via a line LN11, while the other end of the power reception side coil $R_L$ and the other end of the power reception side capacitor $R_C$ in the power reception side resonance circuit 5100 are commonly connected to the anode of the diode 5212 and the cathode of the diode 5214 via a line LN12. The cathodes of the diodes 5211 and 5212 are commonly connected to the positive electrode of the smoothing capacitor 5215, while the anodes of the diodes 5213 and 5214 are commonly connected to the negative electrode of the smoothing capacitor 5215. Therefore, alternating current flows in the power reception side coil $R_L$ based on the alternating magnetic field generated by the power transmission side coil $T_L$ in the power transfer, and a power based on the alternating current is rectified by the rectifying circuits (5211-5214) in the rectifying smoothing circuit 5200 so that charge is accumulated in the smoothing capacitor 5215. A voltage due to the accumulated charge of the smoothing capacitor 5215, namely a voltage between electrodes of the smoothing capacitor 5215 (that is ideally a DC voltage) is supplied as an output voltage of the rectifying smoothing circuit 5200 to the regulator 5310 via a pair of lines LN21 and LN22.

The regulator 5310 performs power conversion on the output voltage of the rectifying smoothing circuit 5200 so as to generate a DC voltage having a predetermined voltage value based on the output voltage of the rectifying smoothing circuit 5200, and outputs the generated DC voltage to the function circuit 5320 via a pair of power lines LN31 and LN32. The function circuit 5320 is an arbitrary load that operates using the output voltage of the regulator 5310. For instance, if the electronic equipment 2 is a smart phone, the function circuit 5320 includes a call processing portion for realizing call communication with a device on the other side, a communication processing portion for transmission and reception of information with other equipment via a network, and the like. Alternatively, for example, if the electronic equipment 2 is a digital camera, the function circuit 5320 includes a driving circuit for driving an image sensor, an image processing circuit for generating image data from an output signal of the image sensor, and the like.

The abnormality detection circuit 5400 detects presence or absence of an abnormality in the load circuit 5300 (namely, detects whether or not an abnormality has occurred in the load circuit 5300), and output a signal $OUT_{5400}$ indicating a result of detection. The output signal $OUT_{5400}$ is supplied to the abnormality response circuit 5500. Here, it is supposed that when it is determined that there is an abnormality in the load circuit 5300, the high level voltage signal $OUT_{5400}$ is output as the signal $OUT_{5400}$ having a first logical value, and that when it is determined that there is no abnormality in the load circuit 5300, the low level voltage signal $OUT_{5400}$ is output as the signal $OUT_{5400}$ having a second logical value. Note that the abnormality in the following description means an abnormality of the load circuit 5300, unless otherwise specified.

When a magnitude of a physical quantity indicating a state of the load circuit 5300 is beyond a predetermined normal range, the abnormality detection circuit 5400 determines that there is an abnormality in the load circuit 5300 and outputs the signal $OUT_{5400}$ of the first logical value. Otherwise, the abnormality detection circuit 5400 determines that there is no abnormality in the load circuit 5300 and outputs the signal $OUT_{5400}$ of the second logical value. The physical quantity indicating a state of the load circuit 5300 is, for example, voltage, current, or temperature. The voltage, current, and temperature used for determining presence or absence of an abnormality are respectively referred to as target voltage, target current, and target temperature.

The target voltage can be a voltage applied to a predetermined electronic component or node in the load circuit 5300 and includes an input voltage and an output voltage of the load circuit 5300. In other words, for example, the target voltage can be a voltage input from a circuit other than the load circuit 5300 in the electronic equipment 2 (for example, from the circuit 5200) to the load circuit 5300, or a voltage output from the load circuit 5300 to a circuit other than the load circuit 5300 in the electronic equipment 2. Alternatively, for example, the target voltage can be a voltage generated in the load circuit 5300 (for example, the output voltage of the regulator 5310).

The target current can be current flowing in a predetermined electronic component or node in the load circuit 5300 and includes input current and output current of the load circuit 5300. In other words, for example, the target current can be current input from a circuit other than the load circuit 5300 in the electronic equipment 2 (for example, from the circuit 5200) to the load circuit 5300, or current output from the load circuit 5300 to a circuit other than the load circuit 5300 in the electronic equipment 2. Alternatively, for example, the target current can be the current supplied from the regulator 5310 to the function circuit 5320 (namely current consumed by the function circuit 5320).

The target temperature can be temperature of a predetermined part in the load circuit 5300. For instance, the target temperature can be temperature of a transistor constituting the regulator 5310 (more specifically, temperature of a heat sink or a package of the transistor). Alternatively, for example, the target temperature can be temperature of an integrated circuit included in the function circuit 5320 (more specifically, temperature of a heat sink or a package of the integrated circuit).

The abnormality detection circuit 5400 includes at least one of a voltage abnormality detection circuit 5400V, a current abnormality detection circuit 5400I and a temperature abnormality detection circuit 5400T (circuit examples thereof will be described later).

When the target voltage is beyond a predetermined normal voltage range, for example when the target voltage is higher than a predetermined voltage $V_{TH}$ as an upper limit of the normal voltage range, the voltage abnormality detection circuit 5400V determines that there is a voltage abnormality in the load circuit 5300. Otherwise, the voltage abnormality detection circuit 5400V determines that there is no voltage abnormality.

When the target current is beyond a predetermined normal current range, for example, when the target current is larger than a predetermined current $I_{TH}$ as an upper limit of the normal current range, the current abnormality detection circuit 5400I determines that there is a current abnormality in the load circuit 5300. Otherwise, the current abnormality detection circuit 5400I determines that there is no current abnormality.

When the target temperature is beyond a predetermined normal temperature range, for example, when the target temperature is higher than a predetermined temperature $T_{TH}$ as an upper limit of the normal temperature range, the temperature abnormality detection circuit 5400T determines that there is a temperature abnormality in the load circuit 5300. Otherwise, the temperature abnormality detection circuit 5400T determines that there is no temperature abnormality.

When the abnormality detection circuit 5400 determines that there is an abnormality (voltage abnormality, current abnormality or temperature abnormality) in the load circuit 5300 by equipped one of the three detection circuits 5400V, 5400I and 5400T, the abnormality detection circuit 5400 outputs the signal $OUT_{5400}$ of the first logical value. When the abnormality detection circuit 5400 determines that there is no abnormality (voltage abnormality, current abnormality or temperature abnormality) in the load circuit 5300 by equipped one of the three detection circuits 5400V, 5400I and 5400T, the abnormality detection circuit 5400 outputs the signal $OUT_{5400}$ of the second logical value. For instance, when the abnormality detection circuit 5400 is equipped with the detection circuits 5400V, 5400I and 5400T, if it is determined that there is one or more of voltage abnormality, current abnormality and temperature abnormality in the load circuit 5300, the abnormality detection circuit 5400 outputs the signal $OUT_{5400}$ of the first logical value, while it outputs the signal $OUT_{5400}$ of the second logical value only when it is determined that there is none of voltage abnormality, current abnormality and temperature abnormality in the load circuit 5300.

Figure 53:
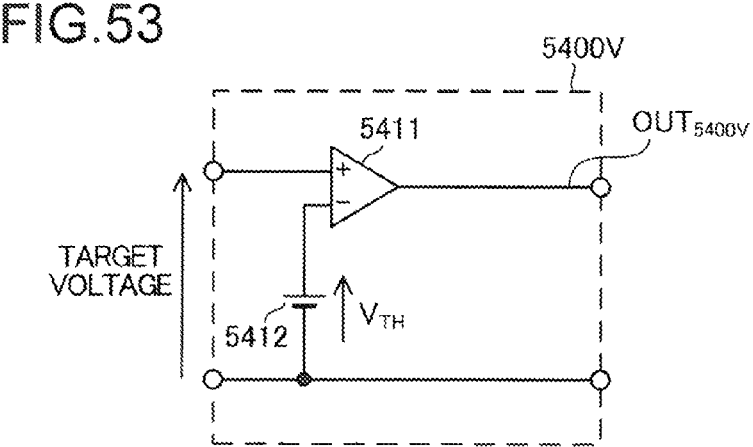
FIG. 53 is a circuit diagram of a voltage abnormality detection circuit according to the tenth embodiment of the present invention.

FIG. 53 shows a circuit example of the voltage abnormality detection circuit 5400V. The voltage abnormality detection circuit 5400V of FIG. 53 includes a comparator 5411 and a DC voltage source 5412. The target voltage and the output voltage $V_{TH}$ of the DC voltage source 5412 are respectively applied to the noninverting input terminal and the inverting input terminal of the comparator 5411. The comparator 5411 outputs a high level voltage signal $OUT_{5400V}$ if the target voltage is the voltage $V_{TH}$ or higher, and otherwise outputs a low level voltage signal $OUT_{5400V}$.

Figure 54:
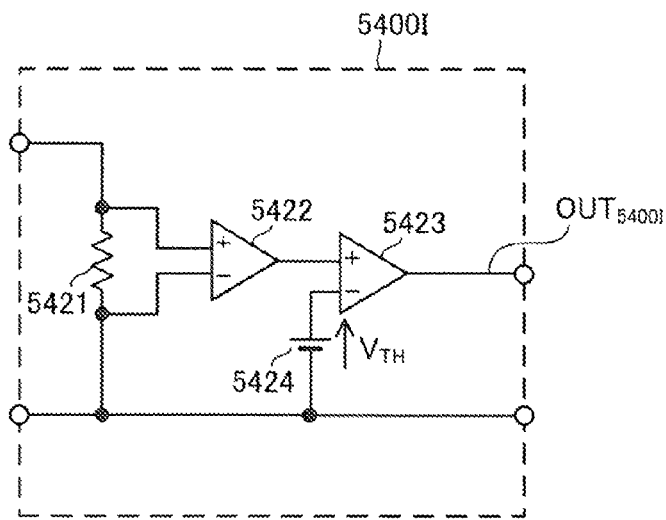
FIG. 54 is a circuit diagram of a current abnormality detection circuit according to the tenth embodiment of the present invention.

FIG. 54 shows a circuit example of the current abnormality detection circuit 5400I. The current abnormality detection circuit 5400I of FIG. 54 includes a resistor 5421 in which the target current flows, an amplifier 5422 that amplifies a voltage drop of the resistor 5421 and outputs the amplified voltage, a comparator 5423, and a DC voltage source 5424. An output voltage of the amplifier 5422 and an output voltage $V_{TH}$ of the DC voltage source 5424 are respectively applied to the noninverting input terminal and the inverting input terminal of the comparator 5423. A resistance of the resistor 5421, a value of the voltage $V_{TH}$, and the like are determined to satisfy the following conditions. When the target current (target current value) is the predetermined current $I_{TH}$ or larger, the output voltage of the amplifier 5422 becomes the voltage $V_{TH}$ or higher so that the comparator 5423 outputs a high level voltage signal OUT$_{5400I}$. When the target current (target current value) is smaller than the predetermined current I$_{TH}$, the output voltage of the amplifier 5422 becomes smaller than the voltage V$_{TH}$ so that the comparator 5423 outputs a low level voltage signal OUT$_{5400I}$.

Figure 55:
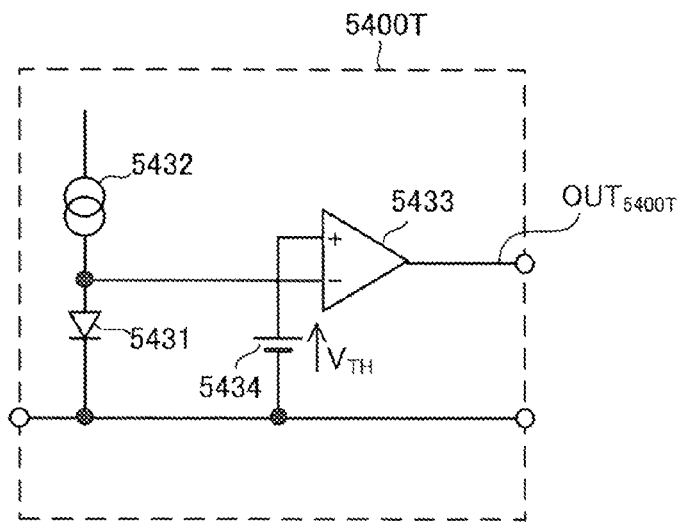
FIG. 55 is a circuit diagram of a temperature abnormality detection circuit according to the tenth embodiment of the present invention.

FIG. 55 shows a circuit example of the temperature abnormality detection circuit 5400T. The temperature abnormality detection circuit 5400T of FIG. 55 includes a diode 5431 that is thermally coupled to a component having the target temperature, a constant current circuit 5432 that supplies constant current to the diode 5431, a comparator 5433, and a DC voltage source 5434. An output voltage V$_{TH}$ of the DC voltage source 5434 and a forward voltage of the diode 5431 are respectively applied to the noninverting input terminal and the inverting input terminal of the comparator 5433. Because of dependence of the forward voltage of the diode 5431 on temperature, the forward voltage of the diode 5431 becomes smaller as the target temperature becomes higher. A value of the constant current, a value of the voltage V$_{TH}$, and the like are determined so as to satisfy the following conditions. When the target temperature is the predetermined temperature T$_{TH}$ or higher, the forward voltage of the diode 5431 becomes lower than the voltage V$_{TH}$ so that the comparator 5433 outputs a high level voltage signal OUT$_{5400T}$. When the target temperature is lower than the predetermined temperature T$_{TH}$, the forward voltage of the diode 5431 becomes the voltage V$_{TH}$ or higher so that the comparator 5433 outputs a low level voltage signal OUT$_{5400T}$.

The signals OUT$_{5400V}$, OUT$_{5400I}$ or OUT$_{5400T}$ can be the output signal OUT$_{5400}$ of the abnormality detection circuit 5400. However, it is possible to use a latch circuit so that the output signal OUT$_{5400}$ is maintained at high level for a predetermined period or longer when the signal OUT$_{5400V}$, OUT$_{5400I}$ or OUT$_{5400T}$ is switched from low level to high level. A logical sum of two or more signals among the signals OUT$_{5400V}$, OUT$_{5400I}$ and OUT$_{5400T}$ may be used as the output signal OUT$_{5400}$ of the abnormality detection circuit 5400. Here, it is possible to use a latch circuit so that the output signal OUT$_{5400}$ is maintained at high level for a predetermined period or longer when the logical sum signal is switched from low level to high level.

The abnormality response circuit 5500 is supplied with the output signal OUT$_{5400}$ of the abnormality detection circuit 5400. When the abnormality detection circuit 5400 detects that there is an abnormality in the load circuit 5300, namely when the signal OUT$_{5400}$ of the first logical value (here, the high level signal OUT$_{5400}$) is supplied from the abnormality detection circuit 5400 to the abnormality response circuit 5500, the abnormality response circuit 5500 performs an abnormality response operation. When the signal OUT$_{5400}$ of the second logical value (Here, the low level signal OUT$_{5400}$) is supplied from the abnormality detection circuit 5400 to the abnormality response circuit 5500, the abnormality response operation is not performed.

In the power transfer, the electronic equipment 2 that receives power from the power transmission side coil T$_L$ becomes a load on the power transmission side coil T$_L$. The abnormality response operation is an operation of changing the magnitude of the load of the electronic equipment 2 viewed from the power supply equipment 1 (power transmission side coil T$_L$) in the power transfer. Here, the change means to change the magnitude of the load before and after detection of the abnormality by the abnormality detection circuit 5400.

When the power transmission operation is being performed in the power transfer period, the control circuit 160 of the power supply equipment 1 monitors presence or absence of change of the magnitude of the load of the electronic equipment 2 viewed from the power supply equipment 1 (power transmission side coil T$_L$) and uses a result of the monitoring so as to perform the power transmission control (control to continue or stop the power transmission). This monitoring is realized based on a result of detecting amplitude of current flowing in the power transmission side coil T$_L$ by the load detection circuit 140.

Specific Example EX10_1

Figure 56:
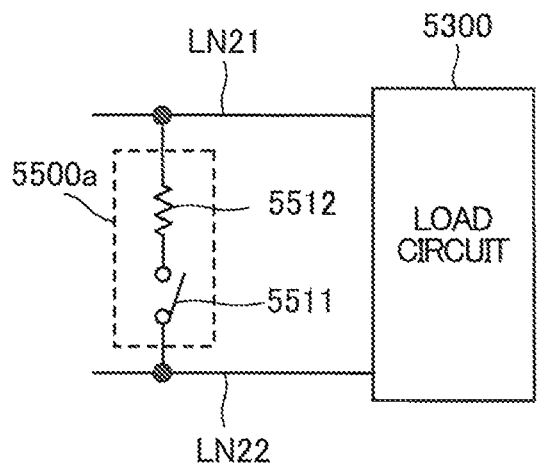
FIG. 56 is a diagram showing an example of an abnormality response circuit according to the tenth embodiment of the present invention.

A specific example EX10_1 belonging to the tenth embodiment is described. In the specific example EX10_1, a circuit 5500a of FIG. 56 is used as an example of the abnormality response circuit 5500. The circuit 5500a is constituted of a series circuit of a switch 5511 and a resistor 5512, and the series circuit is disposed between the lines LN21 and LN22. The switch 5511 is constituted of a semiconductor switching element such as a field-effect transistor and is turned on or off responding to the signal OUT$_{5400}$. When the signal OUT$_{5400}$ of the first logical value (high level) is supplied to the switch 5511, the switch 5511 is turned on so that the lines LN21 and LN22 are connected to each other via the resistor 5512. When the signal OUT$_{5400}$ of the second logical value (low level) is supplied to the switch 5511, the switch 5511 is turned off.

Figure 57:
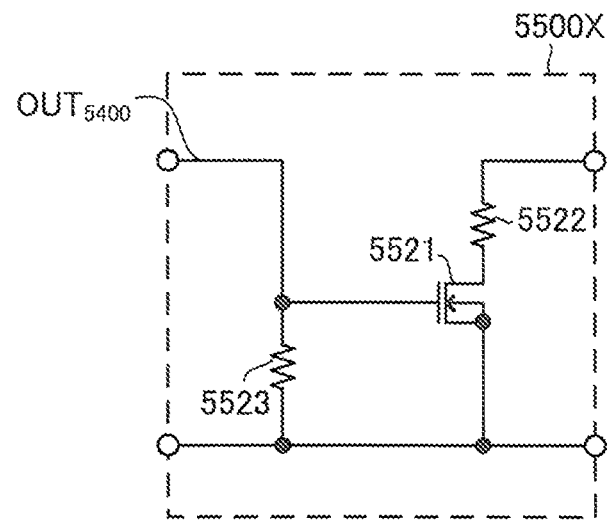
FIG. 57 is a diagram showing a specific circuit structure of the abnormality response circuit shown in FIG. 56.

A circuit 5500X of FIG. 57 is a diagram showing a specific structure example of the circuit 5500a. The circuit 5500X includes a transistor 5521 formed as an N-channel MOSFET and resistors 5522 and 5523. The transistor 5521 and the resistor 5522 can be used to function as the switch 5511 and the resistor 5512 of FIG. 56. In this case, the drain of the transistor 5521 is connected to the line LN21 via the resistor 5522, the source of the transistor 5521 is connected to the line LN22, and the gate of the transistor 5521 is supplied with the signal OUT$_{5400}$. The resistor 5523 is supplied with a gate voltage of the transistor 5521.

In the power transfer period, the power received by the power reception side resonance circuit 5100 is supplied to the load circuit 5300 via the pair of power lines (LN21 and LN22). In the power transfer period, when an abnormality of the load circuit 5300 is detected, the circuit 5500a decreases impedance between the pair of power lines (LN21 and LN22) viewed from the power reception side resonance circuit 5100 compared with before the abnormality is detected. The magnitude of the load of the electronic equipment 2 viewed from the power supply equipment 1 (power transmission side coil T$_L$) in the power transfer is increased when the impedance between the pair of power lines (LN21 and LN22) is decreased.

When the magnitude of the load of the electronic equipment 2 viewed from the power supply equipment 1 (power transmission side coil T$_L$) in the power transfer is increased, amplitude of current flowing in the power transmission side coil T$_L$ is decreased (see FIG. 8). Therefore, when the circuit 5500a that causes an increase of the magnitude of the load when an abnormality is detected (FIG. 56) is used as the abnormality response circuit 5500, the control circuit 160 recognizes occurrence of abnormality (hereinafter the recognition is referred to as power transmission side abnormality occurrence recognition) and stops the power transmission operation when the circuit 4100 of FIG. 50 outputs the signal 4120 indicating that "V$_A$<V$_B$" is satisfied during the power transmission operation. On the other hand, when the circuit 4100 of FIG. 50 outputs the signal 4120 indicating that "$V_A>V_B$" is satisfied during the power transmission operation, the power transmission operation may be continued. In the specific example EX10_1, a value of the voltage $V_B$ of FIG. 50, a value of the resistor 5512 of FIG. 56, and the like are determined in advance so that "$V_A<V_B$" is satisfied only when the switch 5511 of FIG. 56 is turned on during the power transmission operation.

After the power transmission operation is stopped based on the power transmission side abnormality occurrence recognition, the stop of the power transmission operation may be continued unless a predetermined cancel condition is satisfied (the same is true in the specific examples EX102, EX10_3 and EX10_4 described later). The cancel condition is satisfied when the power supply equipment 1 receives an input of a predetermined cancel operation by a user, for example.

Specific Example EX10_2

Figure 58:
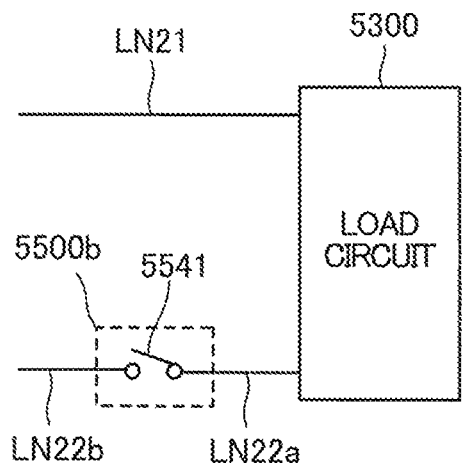
FIG. 58 is a diagram showing another example of the abnormality response circuit according to the tenth embodiment of the present invention.

The specific example EX10_2 belonging to the tenth embodiment is described. In the specific example EX10_2, a circuit 5500b of FIG. 58 is used as an example of the abnormality response circuit 5500. The circuit 5500b is constituted of a switch 5541 inserted in series on the line LN22. As to the line LN22, the line between the load circuit 5300 and the switch 5541 is referred to as a line LN22a, and the line between the rectifying smoothing circuit 5200 and the switch 5541 is referred to as a line LN22b. The switch 5541 is constituted of the semiconductor switching element such as a field-effect transistor and is turned on or off responding to the signal $OUT_{5400}$. When the signal $OUT_{5400}$ of the first logical value (high level) is supplied to the switch 5541, the switch 5541 is turned off, and the rectifying smoothing circuit 5200 and the load circuit 5300 are disconnected from each other. When the signal $OUT_{5400}$ of the second logical value (low level) is supplied to the switch 5541, the switch 5541 is turned on, and the rectifying smoothing circuit 5200 and the load circuit 5300 are connected to each other via the pair of power lines (LN21 and LN22).

Figure 59:
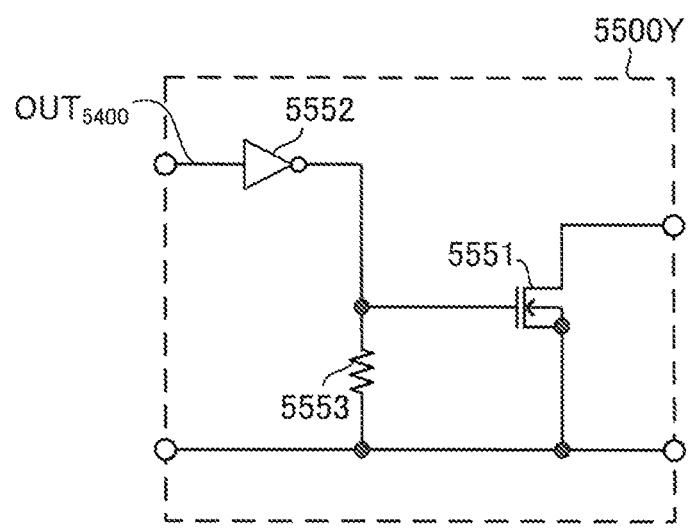
FIG. 59 is a diagram showing a specific circuit structure of the abnormality response circuit shown in FIG. 58.

A circuit 5500Y of FIG. 59 is a diagram showing a specific structure example of the circuit 5500b. The circuit 5500Y includes a transistor 5551 constituted as an N-channel MOSFET, an inverter 5552, and a resistor 5553. The transistor 5551 can be used to function as the switch 5541 of FIG. 58. In this case, the drain of the transistor 5551 is connected to the line LN22a, the source of the transistor 5551 is connected to the line LN22b, and the inverted signal of the signal $OUT_{5400}$ (in which logic of the signal $OUT_{5400}$ is inverted) can be supplied to the gate of the transistor 5551. The inverter 5552 supplies the inverted signal of the signal $OUT_{5400}$ to the gate of the transistor 5551. The gate voltage of the transistor 5551 is applied to the resistor 5553.

In the power transfer period, the power received by the power reception side resonance circuit 5100 is supplied to the load circuit 5300 via the pair of power lines (LN21 and LN22). In the power transfer period, when an abnormality in the load circuit 5300 is detected, the circuit 5500b increases impedance between the pair of power lines (LN21 and LN22) viewed from the power reception side resonance circuit 5100 compared with before the abnormality is detected. The magnitude of the load of the electronic equipment 2 viewed from the power supply equipment 1 (power transmission side coil $T_L$) in the power transfer is decreased when the impedance between the pair of power lines (LN21 and LN22) is increased.

When the magnitude of the load of the electronic equipment 2 viewed from the power supply equipment 1 (power transmission side coil $T_L$) in the power transfer is decreased, amplitude of current flowing in the power transmission side coil $T_L$ is increased (see FIG. 8). Therefore, when using the circuit 5500b that causes a decrease of the magnitude of the load when the abnormality is detected (FIG. 58) as the abnormality response circuit 5500, the control circuit 160 recognizes occurrence of abnormality (namely performs the power transmission side abnormality occurrence recognition) and stops the power transmission operation when the circuit 4100 of FIG. 50 outputs the signal 4120 indicating that "$V_A>V_B$" is satisfied during the power transmission operation. On the other hand, when the circuit 4100 of FIG. 50 outputs the signal 4120 indicating that "$V_A<V_B$" is satisfied during the power transmission operation, the power transmission operation may be continued. In the specific example EX10_2, a value of the voltage $V_B$ and the like of FIG. 50 are determined in advance so that "$V_A>V_B$" is satisfied only when the switch 5541 of FIG. 58 is turned off during the power transmission operation.

Specific Example EX10_3

The specific example EX10_3 according to the tenth embodiment is described. In the specific example EX10_3, it is supposed that the electronic equipment 2 includes the resonance frequency changing circuit 240 described above, and the resonance frequency changing circuit 240 (see FIG. 5 and the like) is used as the abnormality response circuit 5500. Note that it can be considered that the resonance frequency changing circuit 240 is controlled by the abnormality response circuit 5500.

In the power transfer period, when the abnormality detection circuit 5400 outputs the signal $OUT_{5400}$ of the second logical value, the resonance frequency changing circuit 240 as the abnormality response circuit 5500 does not perform the resonance frequency changing operation. As a result, the resonance frequency $f_O$ of the power reception side resonance circuit 5100 is set to the predetermined reference frequency so that the desired power reception operation is performed. On the other hand, in the power transfer period, when the abnormality detection circuit 5400 outputs the signal $OUT_{5400}$ of the first logical value, the resonance frequency changing circuit 240 as the abnormality response circuit 5500 performs the resonance frequency changing operation in which the resonance frequency $f_O$ of the power reception side resonance circuit 5100 is changed from the reference frequency to the predetermined frequency $f_M$. As to the method for realizing the resonance frequency changing operation and the specific circuit structure of the resonance frequency changing circuit 240, the method and the structure in any embodiment described above is applied to the specific example EX10_3.

The magnitude of the load of the electronic equipment 2 viewed from the power supply equipment 1 (power transmission side coil $T_L$) in the power transfer is decreased by performing the resonance frequency changing operation as described above.

When the magnitude of the load of the electronic equipment 2 viewed from the power supply equipment 1 (power transmission side coil $T_L$) in the power transfer is decreased, amplitude of current flowing in the power transmission side coil $T_L$ is increased (see FIG. 8). Therefore, when using the resonance frequency changing circuit 240 that causes a decrease of the magnitude of the load when an abnormality is detected as the abnormality response circuit 5500, the control circuit 160 recognizes occurrence of abnormality (namely performs the power transmission side abnormality occurrence recognition) and stops the power transmission operation when the circuit 4100 of FIG. 50 outputs the signal 4120 indicating that "$V_A>V_B$" is satisfied during the power transmission operation. On the other hand, when the circuit 4100 of FIG. 50 outputs the signal 4120 indicating that "$V_A<V_B$" is satisfied during the power transmission operation, the power transmission operation may be continued. In the specific example EX10_3, a value of the voltage $V_B$ and the like of FIG. 50 are determined in advance so that "$V_A>V_B$" is satisfied only when the resonance frequency changing operation is performed during the power transmission operation.

Specific Example EX10_4

The specific example EX10_4 according to the tenth embodiment is described. In the specific example EX104, it is supposed that the electronic equipment 2 includes the coil short-circuiting circuit 260 as described above, and the coil short-circuiting circuit 260 (see FIG. 30 and the like) is used as the abnormality response circuit 5500. Note that it is possible to consider that the coil short-circuiting circuit 260 is controlled by the abnormality response circuit 5500.

In the power transfer period, when the abnormality detection circuit 5400 outputs the signal $OUT_{5400}$ of the second logical value, the coil short-circuiting circuit 260 as the abnormality response circuit 5500 does not perform the coil short-circuiting operation. As a result, the desired power reception operation is performed. On the other hand, in the power transfer period, when the abnormality detection circuit 5400 outputs the signal $OUT_{5400}$ of the first logical value, the coil short-circuiting circuit 260 as the abnormality response circuit 5500 performs the coil short-circuiting operation in which the power reception side coil $R_L$ of the power reception side resonance circuit 5100 is short-circuited. As the method for realizing the coil short-circuiting operation and the specific circuit structure of the coil short-circuiting circuit 260, the method and the structure in any embodiment described above is applied to the specific example EX10_4.

The magnitude of the load of the electronic equipment 2 viewed from the power supply equipment 1 (power transmission side coil $T_L$) in the power transfer is decreased by performing the coil short-circuiting operation as described above.

When the magnitude of the load of the electronic equipment 2 viewed from the power supply equipment 1 (power transmission side coil $T_L$) in the power transfer is decreased, amplitude of current flowing in the power transmission side coil $T_L$ is increased (see FIG. 8). Therefore, when using the coil short-circuiting circuit 260 that causes a decrease of the magnitude of the load when an abnormality is detected as the abnormality response circuit 5500, the control circuit 160 recognizes occurrence of abnormality (namely performs the power transmission side abnormality occurrence recognition) and stops the power transmission operation when the circuit 4100 of FIG. 50 outputs the signal 4120 indicating that "$V_A>V_B$" is satisfied during the power transmission operation. On the other hand, when the circuit 4100 of FIG. 50 outputs the signal 4120 indicating that "$V_A<V_B$" is satisfied during the power transmission operation, the power transmission operation may be continued. In the specific example EX10_4, a value of the voltage $V_B$ and the like of FIG. 50 are determined in advance so that "$V_A>V_B$" is satisfied only when the coil short-circuiting operation is performed during the power transmission operation.

In the non-contact power supply system that can realize the power transfer using 13.56 MHz, when an abnormality occurs in the power reception side equipment (here, the electronic equipment 2) during the power transfer, stopping of the power transfer contributes to protection of the power reception side equipment. In order to stop the power transfer, it is considered to transmit the occurrence of abnormality to the power transmission side equipment (here, the power supply equipment 1) by communication. However, under law regulations, to perform such the communication may be difficult in reality in many cases. For instance, the Radio Law of Japan (see Article 100) specifies that the power transfer can be performed without being allowed by the public agency under a certain condition, and otherwise an allowance by the public agency is required for power transfer. Further, in order to satisfy this condition, it is necessary to keep the electromagnetic wave of 13.56 MHz used for the power transfer to be unmodulated. In other words, in the power transfer period, the above-mentioned condition cannot be satisfied unless the non-modulated wave of 13.56 MHz is generated by the power transmission side resonance circuit. However, modulation is essential for transmission and reception of information (for example, abnormality detect information) by communication. On the other hand, it is not realistic to request a user who intends to perform the power transfer between the equipments 1 and 2 at home or the like to apply for the allowance of the public agency.

Considering this, in this embodiment, when abnormality is detected by the power reception side equipment during power transfer, the occurrence of abnormality is informed to the power transmission side equipment by the change of the magnitude of the load. Thus, the occurrence of abnormality in the power reception side equipment can be informed to the power transmission side equipment without modulating the electromagnetic wave for power transfer during the power transfer, so that the power transmission side equipment can take a necessary measure (power transmission stop or the like).

Eleventh Embodiment

The eleventh embodiment of the present invention is described. In the eleventh embodiment, an example of the operation flow of the power supply equipment 1 and the electronic equipment 2 in the tenth embodiment is described.

FIG. 60 is an operation flowchart of the power supply equipment 1 after the initial setting process (see FIG. 12). On the basis of the operation flowchart of the power supply equipment 1 described above in the fourth embodiment (FIG. 35), Step S115 is replaced with Step S115a in the eleventh embodiment. Except for the replacement, the operation flowchart of the power supply equipment 1 is the same between the fourth and the eleventh embodiments. Description of the same part is omitted.

After the power transmission operation is started by the power transmission circuit 130 in Step S114, the process proceeds to Step S115a. In Step S115a, the control circuit 160 measures a lapse time from the start time point of the power transmission operation so as to compare the lapse time with the predetermined time $t_A$, and determines whether or not the power transmission side abnormality occurrence recognition is performed. For instance, in the example EX10_1, the power transmission side abnormality occurrence recognition is performed only when the signal 4120 indicating that "$V_A<V_B$" is satisfied is output from the circuit 4100 of FIG. 50. In the examples EX10_2-EX10_4, the power transmission side abnormality occurrence recognition is performed only when the signal 4120 indicating that "$V_A>V_B$" is satisfied is output from the circuit 4100 of FIG. 50. Further, if the lapse time has not reached the time $t_A$ and the power transmission side abnormality occurrence recognition is not performed, the process does not proceed to Step S116, but the power transmission operation is continued. When the lapse time has reached the time $t_A$ or when the power transmission side abnormality occurrence recognition is performed, the process proceeds to Step S116, in which the control circuit 160 stops the power transmission operation by the power transmission circuit 130. After that, the process returns to Step S101.

FIG. 61 is an operation flowchart of the electronic equipment 2. On the basis of the operation flowchart of the electronic equipment 2 described above in the fourth embodiment (FIG. 36), Step S213 is replaced with Step S213*a* in the eleventh embodiment. Except for the replacement, the operation flowchart of the electronic equipment 2 is the same between the fourth and the eleventh embodiment. Description of the same part is omitted.

After starting the power reception operation by the power receiving circuit 230 in Step S212, the process proceeds to Step S213*a*. In Step S213*a*, the control circuit 250 measures a lapse time from the start time point of the power reception operation so as to compare the lapse time with the predetermined time $t_B$. On the other hand, the abnormality detection circuit 5400 detects presence or absence of an abnormality in the load circuit 5300. If the lapse time has does not reached the time $t_B$ yet and no abnormality is detected in the load circuit 5300 (namely, the signal OUT$_{5400}$ of the second logical value is output from the abnormality detection circuit 5400), the power reception operation is continued without proceeding to Step S214. If the lapse time has reached the time $t_B$ or an abnormality of the load circuit 5300 is detected (namely, when the signal OUT$_{5400}$ of the first logical value is output from the abnormality detection circuit 5400), the process proceeds to Step S214 in which the power reception operation is stopped. After that, the process returns to Step S201.

<<Second Consideration of the Present Invention>>

The present invention embodied by the first to the eleventh embodiments described above is considered.

The power reception apparatus according to one aspect of the present invention includes a power receiving circuit (230) to be connected to a power reception side resonance circuit including a power reception side coil and a power reception side capacitance, for generating an output power based on power received by the power reception side coil utilizing magnetic resonance, and a changing/short-circuiting circuit (240, 260) configured to change a resonance frequency of the power reception side resonance circuit from a reference frequency that is the resonance frequency when receiving the power or to short-circuit the power reception side coil, before receiving the power.

The power reception apparatus can receive power transmitted from a power transmission side coil corresponding to the power reception side coil utilizing magnetic resonance. On the other hand, a foreign object different from the power reception apparatus can exist. Here, the foreign object means equipment that includes the resonance circuit having the reference frequency as the resonance frequency but does not have ability to receive power. In the state where the foreign object exists in a place responding to the magnetic field generated by the power transmission side coil, the foreign object may be broken down when the magnetic field for transmitting power is generated by the power transmission side coil. In order to avoid this, it is necessary to detect presence or absence of the foreign object.

For this detection, the changing/short-circuiting circuit is disposed in the power reception apparatus. Then, the following action is obtained. Specifically, in the first case where only the power reception apparatus exists, when the resonance frequency of the power reception side resonance circuit is changed from the reference frequency or when the power reception side coil is short-circuited, the power reception side resonance circuit does not resonate to the magnetic field generated by the power transmission side coil so that the magnitude of the load of the power transmission side coil becomes relatively small. On the other hand, in the second case where the power reception apparatus and the foreign object exist, the load on the power transmission side coil is partially decreased by changing the resonance frequency of the power reception side resonance circuit or by short-circuiting the power reception side coil. However, because the resonance circuit of the foreign object resonates to the magnetic field generated by the power transmission side coil, the magnitude of the load of the power transmission side coil becomes larger than that in the first case.

Thus, by evaluating the magnitude of the load, it is possible to discriminate between the first case and the second case, and it is possible to control so that the power transmission is not performed in the second case. In other words, according to the power reception apparatus having the above-mentioned structure, in the non-contact power supply system including the power reception apparatus and the power transmission apparatus, it is possible to determine presence or absence of the foreign object and to determine whether or not to perform the power transmission. Thus, a breakdown of the foreign object can be avoided.

The transmission apparatus according to another aspect of the present invention includes a power transmission circuit (130) to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method, a detection circuit (140) configured to output a value corresponding to amplitude of current flowing in the power transmission side coil, and a control circuit (160) configured to control the power transmission circuit. The control circuit (160) includes a first processing portion configured to control to transmit a specific signal from the power transmission side coil to the power reception side coil, a second processing portion configured to control the power transmission circuit so that the power transmission side coil generates a predetermined test magnetic field oscillating at the reference frequency after transmission of the specific signal, and a third processing portion configured to determine whether or not the power transmission can be performed by comparing an output value of the detection circuit when the test magnetic field is generated with a predetermined reference value. The specific signal is a signal as a trigger for changing a resonance frequency of a power reception side resonance circuit including a power reception side coil capable of receiving power from the power transmission side coil and a power reception side capacitance from the reference frequency that is the resonance frequency when receiving the power, or a signal as a trigger for short-circuiting the power reception side coil.

The power reception apparatus that is connected to the power reception side resonance circuit or includes the power reception side resonance circuit can receive power transmitted from the power transmission side coil utilizing magnetic resonance. On the other hand, a foreign object different from the power reception apparatus can exist. Here, the foreign object means equipment that includes the resonance circuit having the reference frequency as the resonance frequency but does not have ability to receive power. In the state where the foreign object exists in a place responding to the magnetic field generated by the power transmission side coil, the foreign object may be broken down when the magnetic field for transmitting power is generated by the power transmission side coil. In order to avoid this, it is necessary to detect presence or absence of the foreign object.

For this detection, first the first processing portion is utilized. The power reception apparatus corresponding to the power transmission apparatus can change the resonance frequency from the reference frequency or short-circuit the power reception side coil in accordance with specific signal by the first processing portion. In contrast, the foreign object that does not corresponds to the power transmission apparatus does not respond to the specific signal, does not or cannot change the resonance frequency from the reference frequency, and does not short-circuit the power reception side coil. The action of changing the resonance frequency or short-circuiting the power reception side coil is considered for each of the first and the second cases.

In the first case where only the power reception apparatus exists, when the resonance frequency of the power reception side resonance circuit is changed from the reference frequency or the power reception side coil is short-circuited, the power reception side resonance circuit does not resonate to the magnetic field generated by the power transmission side coil so that the magnitude of the load of the power transmission side coil becomes relatively small. On the other hand, in the second case where the power reception apparatus and the foreign object exist, the load on the power transmission side coil is partially decreased by changing the resonance frequency of the power reception side resonance circuit or by short-circuiting the power reception side coil. However, because the foreign object resonates to the magnetic field generated by the power transmission side coil, the magnitude of the load of the power transmission side coil becomes larger than that in the first case.

Here, because amplitude of current flowing in the power transmission side coil depends on the magnitude of the load of the power transmission side coil, it is possible to discriminate the magnitude of the load, namely between the first and the second case by evaluating the amplitude. Considering this, the second and the third processing portion are disposed in the power transmission apparatus. Thus, it is possible to control execution or non-execution of the power transmission by determining presence or absence of the foreign object. Thus, a breakdown of the foreign object can be avoided.

Note that in the embodiments described above, the transmission of the change signal 530, the short-circuiting signal 530*a*, or the specific request signal 530*b* using the communication circuit 120 corresponds to the transmission of the specific signal. Because these signals are transmitted under control of the control circuit 160, it is considered that the control circuit 160 includes the first processing portion. However, the communication circuit 120 performs the transmission of the signal 530, 530*a* or 530*b*. In addition, in the example of FIG. 20, the process of Steps S131 to S133 corresponds to the process of the second processing portion, and the process of Steps S134 to S138 corresponds to the process of the third processing portion.

The non-contact power supply system according to another aspect of the present invention (for example, see FIGS. 49 to 51) includes a power transmission apparatus including a power transmission side resonance circuit and a power reception apparatus including a power reception side resonance circuit. The non-contact power supply system can transmit power from the power transmission apparatus to the power reception apparatus by a magnetic resonance method. The power reception apparatus includes a load circuit (5300) that consumes power received by the power reception side resonance circuit, an abnormality detection circuit (5400) that detects presence or absence of an abnormality in the load circuit, and an abnormality response circuit (5500) that changes a magnitude of the load of the power reception apparatus viewed from the power transmission apparatus when the abnormality is detected. The power transmission apparatus monitors presence or absence of the change while the power transmission is performed (4100), so as to perform the power transmission control.

When an abnormality occurs on the power reception apparatus side during the power transmission, the power transmission stop or other measure contributes to protection of the power reception apparatus. In order to perform the power transmission stop or the like, it is considered to inform the power transmission apparatus about the occurrence of abnormality by communication. However, performing such the communication requires modulation of the electromagnetic wave and is difficult in reality in many cases. Considering this, when an abnormality is detected in the power reception apparatus, the magnitude of the load of the power reception apparatus viewed from the power transmission apparatus is changed, and the power transmission apparatus monitors presence or absence of the change. Thus, occurrence of abnormality in the power reception apparatus can be informed to the power transmission apparatus without modulating the electromagnetic wave for power transfer. Thus, the power transmission apparatus can perform necessary power transmission control (power transmission stop or the like).

Note that the power reception apparatus according to the present invention can be considered as an apparatus connected to the power reception side resonance circuit (for example, as the power reception side IC) or can be considered as an apparatus including the power reception side resonance circuit as a structure element (for example, as the electronic equipment 2). The power transmission apparatus according to the present invention can be considered as an apparatus connected to the power transmission side resonance circuit (for example, as the power transmission side IC) or can be considered as an apparatus including the power transmission side resonance circuit as a structure element (for example, as the power supply equipment 1).

<<Variations>>

The embodiments of the present invention can be appropriately modified variously within the scope of the technical concept described in the claims. The embodiments described above are merely examples of the embodiments of the present invention, and meanings of the terms of the present invention and the structure elements are not limited to those described above in the embodiments. The specific values specified in the above description are merely examples and can be changed to various values as a matter of course. As annotations that can be applied to the embodiments described above, Notes 1 to 3 are described below. The contents described in the Notes can be arbitrarily combined as long as no contradiction arises.

[Note 1]

In the embodiment described above, frequencies of various signals and the resonance frequency are set to 13.56 MHz as the reference frequency. However, 13.56 MHz is a target value of setting, and the frequencies in the real equipment have errors.

[Note 2]

Because cases in which the present invention is embodied according to the NFC standard are described in the embodiments, the reference frequency is 13.56 MHz. However, the reference frequency may be other than 13.56 MHz. Related to this, the communication and the power transfer between the power supply equipment and the electronic equipment, to which the present invention is applied, may be the communication and the power transfer according to a standard other than NFC.

[Note 3]

An target apparatus that is the power reception apparatus or the power transmission apparatus according to the present invention can be constituted of hardware such as an integrated circuit or a combination of hardware and software. Any specific function that is a whole or a part of the function realized by the target apparatus may be described as a program, and the program may be stored in a flash memory that can be mounted in the target apparatus. Then, a program execution device (for example, a microcomputer that can be mounted in the target apparatus) may execute the program so that the specific function can be realized. The program can be stored in and fixed to an arbitrary recording medium. The recording medium for storing or fixing the program may be mounted in or connected to equipment other than the target apparatus (such as a server).

What is claimed is:

1. A power reception apparatus comprising:
a power receiving circuit to be connected to a power reception side resonance circuit including a power reception side coil and a power reception side capacitance, for generating an output power based on power received by the power reception side coil utilizing magnetic resonance; and
a changing/short-circuiting circuit configured to change a resonance frequency of the power reception side resonance circuit from a reference frequency that is the resonance frequency when receiving the power or to short-circuit the power reception side coil, before receiving the power,
wherein the changing/short-circuiting circuit changes the resonance frequency from the reference frequency before receiving the power, and
wherein the resonance frequency is restored to the reference frequency when a predetermined period of time elapses after the change.

2. An electronic equipment comprising:
the power reception apparatus according to claim 1;
a battery that is charged based on an output power generated by the power receiving circuit in the power reception apparatus; and
a circuit that operates based on an output voltage of the battery.

3. A power reception apparatus comprising:
a power receiving circuit to be connected to a power reception side resonance circuit including a power reception side coil and a power reception side capacitance, for generating an output power based on power received by the power reception side coil utilizing magnetic resonance; and
a changing/short-circuiting circuit configured to change a resonance frequency of the power reception side resonance circuit from a reference frequency that is the resonance frequency when receiving the power or to short-circuit the power reception side coil, before receiving the power,
wherein the changing/short-circuiting circuit short-circuits the power reception side coil before receiving the power, and
wherein a short-circuited state is canceled after a predetermined period of time elapses after the short-circuiting.

4. An electronic equipment comprising:
the power reception apparatus according to claim 3;
a battery that is charged based on an output power generated by the power receiving circuit in the power reception apparatus; and
a circuit that operates based on an output voltage of the battery.

5. A power reception apparatus for constituting a non-contact power supply system together with a power transmission apparatus,
wherein the power reception apparatus comprises:
a power receiving circuit to be connected to a power reception side resonance circuit including a power reception side coil and a power reception side capacitance, for generating an output power based on power received by the power reception side coil utilizing magnetic resonance; and
a changing/short-circuiting circuit configured to change a resonance frequency of the power reception side resonance circuit from a reference frequency that is the resonance frequency when receiving the power or to short-circuit the power reception side coil, before receiving the power,
and wherein the power transmission apparatus comprises:
a power transmission circuit that is connected to a power transmission side resonance circuit including a power transmission side coil and a power transmission side capacitance, and transmits the power by magnetic resonance method from the power transmission side coil by supplying the power transmission side resonance circuit with an AC signal so that the power transmission side coil generates an alternating magnetic field of the reference frequency,
a detection circuit configured to output a value corresponding to amplitude of current flowing in the power transmission side coil, and
a control circuit including a first processing portion configured to transmit a specific signal to be a trigger for the change or the short-circuiting from the power transmission side coil to the power reception side coil, a second processing portion configured to control the power transmission circuit so that a predetermined test magnetic field is generated by the power transmission side coil after the specific signal is transmitted, and a third processing portion configured to determine whether or not the power transmission can be performed by comparing an output value of the detection circuit when the test magnetic field is generated with a predetermined reference value.

6. An electronic equipment comprising:
the power reception apparatus according to claim 5;
a battery that is charged based on an output power generated by the power receiving circuit in the power reception apparatus; and
a circuit that operates based on an output voltage of the battery.

7. A power transmission apparatus comprising:
a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method;
a detection circuit configured to output a value corresponding to amplitude of current flowing in the power transmission side coil; and
a control circuit configured to control the power transmission circuit, wherein the control circuit includes
a first processing portion configured to control to transmit a specific signal from the power transmission side coil to the power reception side coil,
a second processing portion configured to control the power transmission circuit so that the power transmission side coil generates a predetermined test magnetic field oscillating at the reference frequency after transmission of the specific signal, and
a third processing portion configured to determine whether or not the power transmission can be performed by comparing an output value of the detection circuit when the test magnetic field is generated with a predetermined reference value, and
the specific signal is a signal as a trigger for changing a resonance frequency of a power reception side resonance circuit including a power reception side coil capable of receiving power from the power transmission side coil and a power reception side capacitance from the reference frequency that is the resonance frequency when receiving the power, or a signal as a trigger for short-circuiting the power reception side coil.

8. The power transmission apparatus according to claim 7, wherein
the control circuit controls the power transmission circuit so that the power transmission side coil generates a predetermined magnetic field for power transmission when determining that power transmission can be performed, and
magnetic field intensity of the test magnetic field is smaller than magnetic field intensity of the magnetic field for power transmission.

9. The power transmission apparatus according to claim 7, wherein
the second processing portion controls the power transmission circuit so that the power transmission side coil sequentially generates first to n-th test magnetic fields as the test magnetic field after the specific signal is transmitted (n is an integer of two or larger), and
the third processing portion obtains an output value of the detection circuit when the i-th test magnetic field is generated as an i-th output value (i is a natural number of n or smaller) and compares first to n-th output values with predetermined first to n-th reference values so as to determine whether or not the power transmission can be performed.

10. The power transmission apparatus according to claim 7, for constituting a non-contact power supply system together with a power reception apparatus, wherein the power reception apparatus includes
a power receiving circuit that is connected to the power reception side resonance circuit and generates output power based on the power received by the power reception side coil utilizing magnetic resonance, and
a changing/short-circuiting circuit configured to change the resonance frequency of the power reception side resonance circuit from the reference frequency or to short-circuit the power reception side coil, responding to reception of the specific signal.

11. A non-contact power supply system comprising:
a power reception apparatus comprising:
a power receiving circuit to be connected to a power reception side resonance circuit including a power reception side coil and a power reception side capacitance, for generating an output power based on power received by the power reception side coil utilizing magnetic resonance; and
a changing/short-circuiting circuit configured to change a resonance frequency of the power reception side resonance circuit from a reference frequency that is the resonance frequency when receiving the power or to short-circuit the power reception side coil, before receiving the power;
the non-contact power supply system further comprising a power transmission apparatus according to claim 7.

12. A power transmission apparatus comprising:
a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method;
a detection circuit configured to output a value corresponding to amplitude of current flowing in the power transmission side coil; and
a control circuit configured to control the power transmission circuit, wherein the control circuit includes
a first processing portion configured to transmit a specific signal as a trigger for changing a resonance frequency of a power reception side resonance circuit including a power reception side coil capable of receiving power from the power transmission side coil and a power reception side capacitance from the reference frequency that is the resonance frequency when receiving the power from the power transmission side coil to the power reception side coil,
a second processing portion configured to control the power transmission circuit so that the power transmission side coil generates a predetermined test magnetic field oscillating at the reference frequency after transmission of the specific signal, and
a third processing portion configured to determine whether or not the power transmission can be performed by comparing an output value of the detection circuit when the test magnetic field is generated with a predetermined reference value.

13. A non-contact power supply system comprising:
a power reception apparatus comprising:
- a power receiving circuit to be connected to a power reception side resonance circuit including a power reception side coil and a power reception side capacitance, for generating an output power based on power received by the power reception side coil utilizing magnetic resonance; and
- a changing circuit configured to change a resonance frequency of the power reception side resonance circuit from a reference frequency that is a resonance frequency when receiving the power before receiving the power;

the non-contact power supply system further comprising a a power transmission apparatus according to claim 12.

14. A power transmission apparatus comprising:
a power transmission circuit to be connected to a power transmission side resonance circuit including a power transmission side coil and a power transmission side capacitance, for supplying an AC signal to the power transmission side resonance circuit so as to make the power transmission side coil generate alternating magnetic field of a reference frequency so that the power transmission side coil transmits power by magnetic resonance method;
a detection circuit configured to output a value corresponding to amplitude of current flowing in the power transmission side coil; and
a control circuit configured to control the power transmission circuit, wherein the control circuit includes
a first processing portion configured to transmit a specific signal as a trigger for short-circuiting a power reception side coil in a power reception side resonance circuit including the power reception side coil capable of receiving power from the power transmission side coil and a power reception side capacitance from the power transmission side coil to the power reception side coil,
a second processing portion configured to control the power transmission circuit so that the power transmission side coil generates a predetermined test magnetic field oscillating at the reference frequency after transmission of the specific signal, and
a third processing portion configured to determine whether or not the power transmission can be performed by comparing an output value of the detection circuit when the test magnetic field is generated with a predetermined reference value.

15. A non-contact power supply system comprising:
a power reception apparatus comprising:
- a power receiving circuit to be connected to a power reception side resonance circuit including a power reception side coil and a power reception side capacitance, for generating an output power based on power received by the power reception side coil utilizing magnetic resonance; and
- a short-circuiting circuit configured to short-circuit the power reception side coil before receiving the power;

the non-contact power supply system further comprising a power transmission apparatus according to claim 14.

16. A power transmission method comprising the steps of:
transmitting power by a power transmission circuit to be connected to a power transmission side resonance circuit including a power transmission side coil and a power transmission side capacitance, so as to supply the power transmission side resonance circuit with an AC signal, so that the power transmission side coil generates an alternating magnetic field of a reference frequency, for transmitting power from the power transmission side coil by a magnetic resonance method;
detecting and outputting a value corresponding to an amplitude of current flowing in the power transmission side coil; and
controlling the power transmission circuit, wherein
the controlling step includes a first processing step of transmitting a specific signal from the power transmission side coil to the power reception side coil, a second processing step of controlling the power transmission circuit so that the power transmission side coil generates a predetermined test magnetic field oscillating at the reference frequency after the transmission of the specific signal, and a third processing step of determining whether or not the power transmission can be performed by comparing an output value in the detecting step when the test magnetic field is generated with a predetermined reference value, and
the specific signal is a signal as a trigger for changing a resonance frequency of a power reception side resonance circuit including a power reception side coil capable of receiving power from the power transmission side coil and a power reception side capacitance from the reference frequency that is the resonance frequency when receiving the power, or a signal as a trigger for short-circuiting the power reception side coil.

17. A power reception method comprising:
a power receiving step of receiving power by a power receiving circuit to be connected to a power reception side resonance circuit including a power reception side coil and a power reception side capacitance, utilizing magnetic resonance, so as to generate an output power based on the power received by the power reception side coil; and
a changing/short-circuiting step of changing a resonance frequency of the power reception side resonance circuit from a reference frequency that is the resonance frequency when receiving the power, or short-circuiting the power reception side coil, before receiving the power,
wherein the changing/short-circuiting step includes:
changing the resonance frequency from the reference frequency before receiving the power; and
restoring the resonance frequency to the reference frequency when a predetermined period of time elapses after the change.

18. A power reception method comprising:
a power receiving step of receiving power by a power receiving circuit to be connected to a power reception side resonance circuit including a power reception side coil and a power reception side capacitance, utilizing magnetic resonance, so as to generate an output power based on the power received by the power reception side coil; and
a changing/short-circuiting step of changing a resonance frequency of the power reception side resonance circuit from a reference frequency that is the resonance frequency when receiving the power, or short-circuiting the power reception side coil, before receiving the power,
wherein the changing/short-circuiting step includes:
short-circuiting the power reception side coil before receiving the power; and cancelling the short-circuited state after a predetermined period of time elapses after the short-circuiting.

19. A power reception method for use in a power reception apparatus, the method comprising:
- a power receiving step of receiving power by a power receiving circuit to be connected to a power reception side resonance circuit including a power reception side coil and a power reception side capacitance, utilizing magnetic resonance, so as to generate an output power based on the power received by the power reception side coil; and
- a changing/short-circuiting step of changing a resonance frequency of the power reception side resonance circuit from a reference frequency that is the resonance frequency when receiving the power, or short-circuiting the power reception side coil, before receiving the power, wherein the power reception apparatus constitutes a non-contact power supply system together with a power transmission apparatus, and the power transmission apparatus includes:
- a power transmission circuit that is connected to a power transmission side resonance circuit including a power transmission side coil and a power transmission side capacitance, and transmits power by magnetic resonance method from the power transmission side coil by supplying the power transmission side resonance circuit with an AC signal so that the power transmission side coil generates an alternating magnetic field of the reference frequency;
- a detection circuit configured to output a value corresponding to amplitude of current flowing in the power transmission side coil; and
- a control circuit including a first processing portion configured to control to transmit a specific signal to be a trigger for the change or the short-circuiting from the power transmission side coil to the power reception side coil, a second processing portion configured to control the power transmission circuit so that a predetermined test magnetic field is generated by the power transmission side coil after the specific signal is transmitted, and a third processing portion configured to determine whether or not the power transmission can be performed by comparing an output value of the detection circuit when the test magnetic field is generated with a predetermined reference value.

* * * * *